United States Patent [19]
Wike, Jr. et al.

[11] Patent Number: 6,053,412
[45] Date of Patent: Apr. 25, 2000

[54] RETAIL TERMINAL WHICH IS CONFIGURED TO PROTECT ELECTRICAL CABLES INTERFACED THERETO AND ASSOCIATED METHOD

[75] Inventors: Charles K. Wike, Jr., Sugar Hill; Kevin L. Kamphuis, Cumming; Kurt J. Lippert, Snellville; Paul F. Nugent, Jr., Alpharetta; David M. Wright, Duluth, all of Ga.

[73] Assignee: NCR Corporation, Dayton, Ohio

[21] Appl. No.: 09/070,623

[22] Filed: Apr. 30, 1998

[51] Int. Cl.[7] .................................................... G06K 7/10
[52] U.S. Cl. ...................................... 235/462.43; 235/375
[58] Field of Search ......................... 235/462.43, 462.45, 235/462.47, 375, 383; 361/725, 731

[56] References Cited

U.S. PATENT DOCUMENTS

| Re. 35,117 | 12/1995 | Rando et al. | 235/375 |
|---|---|---|---|
| 3,757,037 | 9/1973 | Bialek | 178/6.6 A |
| 4,528,643 | 7/1985 | Freeney, Jr. | 364/900 |
| 4,996,642 | 2/1991 | Hey | 364/419 |
| 5,128,862 | 7/1992 | Mueller | 364/405 |
| 5,412,191 | 5/1995 | Baitz et al. | 235/383 |
| 5,426,282 | 6/1995 | Humble | 235/383 |
| 5,710,416 | 1/1998 | Belknap et al. | 235/383 |
| 5,834,751 | 11/1999 | Jager et al. | . |

Primary Examiner—Donald Hajec
Assistant Examiner—Mark Tremblay
Attorney, Agent, or Firm—Maginot, Addison & Moore

[57] ABSTRACT

A retail terminal includes a first base assembly secured to a first mounting surface. The first mounting surface has a first mounting opening defined therein out of which a first electrical cable segment extends. The retail terminal also includes a second base assembly secured to a second mounting surface. The second mounting surface has a second mounting opening defined therein out of which a second electrical cable segment extends. The retail terminal further includes a core module assembly which operates to perform retail functions in a first mode of operation and a second mode of operation. The core module assembly is electrically coupled to the first electrical cable segment and attached to the first base assembly when the core module assembly is operating in the first mode of operation. The core module assembly is electrically coupled to the second electrical cable segment and attached to the second base assembly when the core module assembly is operating in the second mode of operation. The core module assembly and the first base assembly cooperate to define a first protective housing which completely contains the first cable segment when the core module assembly is attached to the first base assembly and operating in the first mode of operation. The core module assembly and the second base assembly cooperate to define a second protective housing which completely contains the second cable segment when the core module assembly is attached to the second base assembly and operating in the second mode of operation.

20 Claims, 39 Drawing Sheets

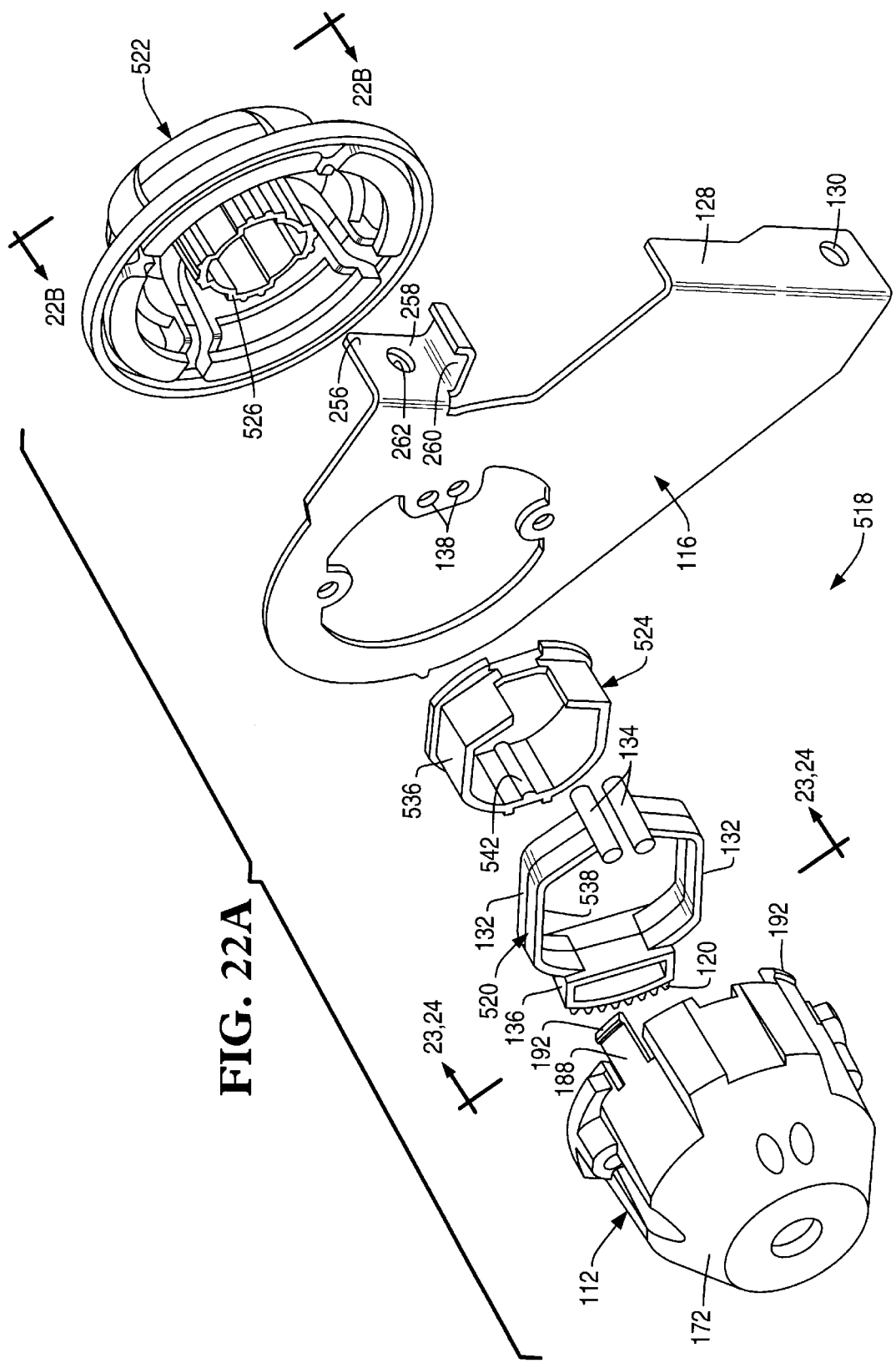

RETAIL TERMINAL WHICH IS CONFIGURED TO PROTECT ELECTRICAL CABLES INTERFACED THERETO AND ASSOCIATED METHOD

CROSS REFERENCE

Cross reference is made to copending U.S. patent applications Ser. No. 09/070,501 (NCR Docket No. 7510.1), entitled "Apparatus and Method of Operating a Retail Terminal Having a Single-Orientation Base Assembly and a Multiple-Orientation Base Assembly" by Charles K. Wike, Jr. and Nathaniel C. Herwig; Ser. No. 09/070,620 (NCR Docket No. 7516.1), entitled "Retail Terminal Having a Tilt Mechanism Which Includes a Ratchet Member for Positioning a Display Monitor Relative to a Stationary Base" by David M. Wright; Ser. No. 09/070,619 (NCR Docket No. 7510.2), entitled "Retail Terminal and Associated Mounting Method" by Paul F. Nugent, Jr., Charles K. Wike, Jr., and David M. Wright; Ser. No. 09/070,618 (NCR Docket No. 7510.3), entitled "Retail Terminal Having a Base Assembly Which is Mountable on Any One of a Plurality of Mounting Plates and Associated Method" by Kurt J. Lippert, Charles K. Wike, Jr., and Jose L. Izaguirre; Ser. No. 09/070,624 (NCR Docket No. 7510.4), entitled "Method of Operating a Retail Terminal Having a Core Module Assembly Which is Movable Between a Number of Base Assemblies" by Jose L. Izaguirre, Charles K. Wike, Jr., and Kurt J. Lippert; Ser. No. 09/070,622 (NCR Docket No. 7510.5), entitled "Apparatus and Method of Securing a Heat Dissipating Cover to a Thermally Conductive Housing Associated With a Retail Terminal" by Kevin L. Kamphuis; Ser. No. 09/070,621 (NCR Docket No. 7516.2), entitled "Apparatus and Method for Dissipating Heat from a Core Module Assembly of a Retail Terminal" by Kevin L. Kamphuis; and Ser. No. 09/070,502 (NCR Docket No. 7516.4), entitled "Retail Terminal Having a Plurality of Base Assemblies Each of Which Includes a Separate Power Supply and Associated Method" by Charles K. Wike, Jr. and Kurt J. Lippert, each of which is assigned to the same assignee as the present invention, and each of which is filed concurrently herewith.

TECHNICAL FIELD OF THE INVENTION

The present invention relates generally to a retail terminal, and more particularly to a retail terminal which is configured to protect electrical cables interfaced thereto and associated method.

BACKGROUND OF THE INVENTION

In the retail industry, a number of electronic retail terminals are used throughout a retail store. For example, the retail store may include a number of point-of-sale (POS) terminals such as traditional assisted (i.e. clerk-operated) checkout terminals. In addition to assisted point-of-sale terminals, the retail store may also include a number of unassisted point-of-sale terminals such as self-service checkout terminals. Self-service checkout terminals are terminals which are operated by a customer without the assistance of a retail clerk.

Moreover, in addition to point-of-sale terminals, the retail store may also include a number of information retail terminals such as kiosk-type devices. Such information retail terminals are generally located throughout the shopping area of the retail store and are provided to perform various information retail functions such as a product demonstration retail function. In particular, information retail terminals may be used to display product information to retail customers, or may be used as an interactive retail terminal which provides assistance to customers in response to a customer's input via a keypad or the like.

Retail terminals which have heretofore been designed have a number of drawbacks associated therewith. In particular, retail terminals which have heretofore been designed do not possess the flexibility to perform multiple types of retail functions. For example, retail terminals which have heretofore been designed generally may not possess the flexibility to perform both a product demonstration retail function and a point-of-sale retail function. Hence, it is desirable to provide a retail information terminal which, with minor modification thereof, also functions as a point-of-sale terminal during periods of peak demand.

Moreover, the housings associated with retail terminals which have heretofore been designed are relatively large thereby disadvantageously requiring relatively large amounts of usable surface area or floor space within the retail store. Hence, it is desirable to provide a retail terminal which is relatively compact and has a user-operable electronic module which can be easily moved and mounted at various locations throughout the retail store.

What is needed therefore is a retail terminal which overcomes one or more of the above-mentioned drawbacks. What is also needed is a retail information terminal which also functions as a point-of-sale terminal during periods of peak demand.

SUMMARY OF THE INVENTION

In accordance with a first embodiment of the present invention, there is provided a retail terminal. The retail terminal includes a first base assembly secured to a first mounting surface. The first mounting surface has a first mounting opening defined therein out of which a first electrical cable segment extends. The retail terminal also includes a second base assembly secured to a second mounting surface. The second mounting surface has a second mounting opening defined therein out of which a second electrical cable segment extends. The retail terminal further includes a core module assembly which operates to perform retail functions in a first mode of operation and a second mode of operation. The core module assembly is electrically coupled to the first electrical cable segment and attached to the first base assembly when the core module assembly is operating in the first mode of operation. The core module assembly is electrically coupled to the second electrical cable segment and attached to the second base assembly when the core module assembly is operating in the second mode of operation. The core module assembly and the first base assembly cooperate to define a first protective housing which completely contains the first cable segment when the core module assembly is attached to the first base assembly and operating in the first mode of operation. The core module assembly and the second base assembly cooperate to define a second protective housing which completely contains the second cable segment when the core module assembly is attached to the second base assembly and operating in the second mode of operation.

In accordance with a second embodiment of the present invention, there is provided a method of operating a retail terminal having a core module assembly, a first base assembly, and a second base assembly. The first base assembly is secured to a first mounting surface. The first mounting surface has a first mounting opening defined therein out of which a first electrical cable segment extends. The second base assembly is secured to a second mounting surface. The second mounting surface has a second mounting opening defined therein out of which a second electrical cable segment extends. The method includes the step of attaching the core module assembly to the first base assembly so that the core module assembly and the first base assembly cooperate to define a first protective housing which completely contains the first cable segment. The method also includes the step of operating the core module assembly for a first time period so as to perform retail functions while the first cable segment is completely contained by the first protective housing. The method further includes the step of detaching the core module assembly from the first base assembly after the first time period operating step. The method yet further includes the step of attaching the core module assembly to the second base assembly, after the detaching step, so that the core module assembly and the second base assembly cooperate to define a second protective housing which completely contains the second cable segment. Moreover, the method includes the step of operating the core module assembly for a second time period so as to perform retail functions while the second cable segment is completely contained by the second protective housing.

It is therefore an object of the present invention to provide a new and useful apparatus and method of operating a retail terminal.

It is moreover an object of the present invention to provide an improved apparatus and method of operating a retail terminal.

It is yet another object of the present invention to provide a retail terminal which possess the flexibility to perform multiple types of retail functions.

It is a further object of the present invention to provide a retail terminal which posses the flexibility to perform both a product demonstration retail function and a point-of-sale retail function.

It is also an object of the present invention to provide a retail terminal which is configured to protect electrical cables interfaced thereto.

The above and other objects, features, and advantages of the present invention will become apparent from the following description and the attached drawings.

BRIEF DESCRIPTION OF THE DRAWINGS

FIG. 22A is a view similar to FIG. 21, but showing the end cap in greater detail;

DETAILED DESCRIPTION OF THE INVENTION

Figure 1:
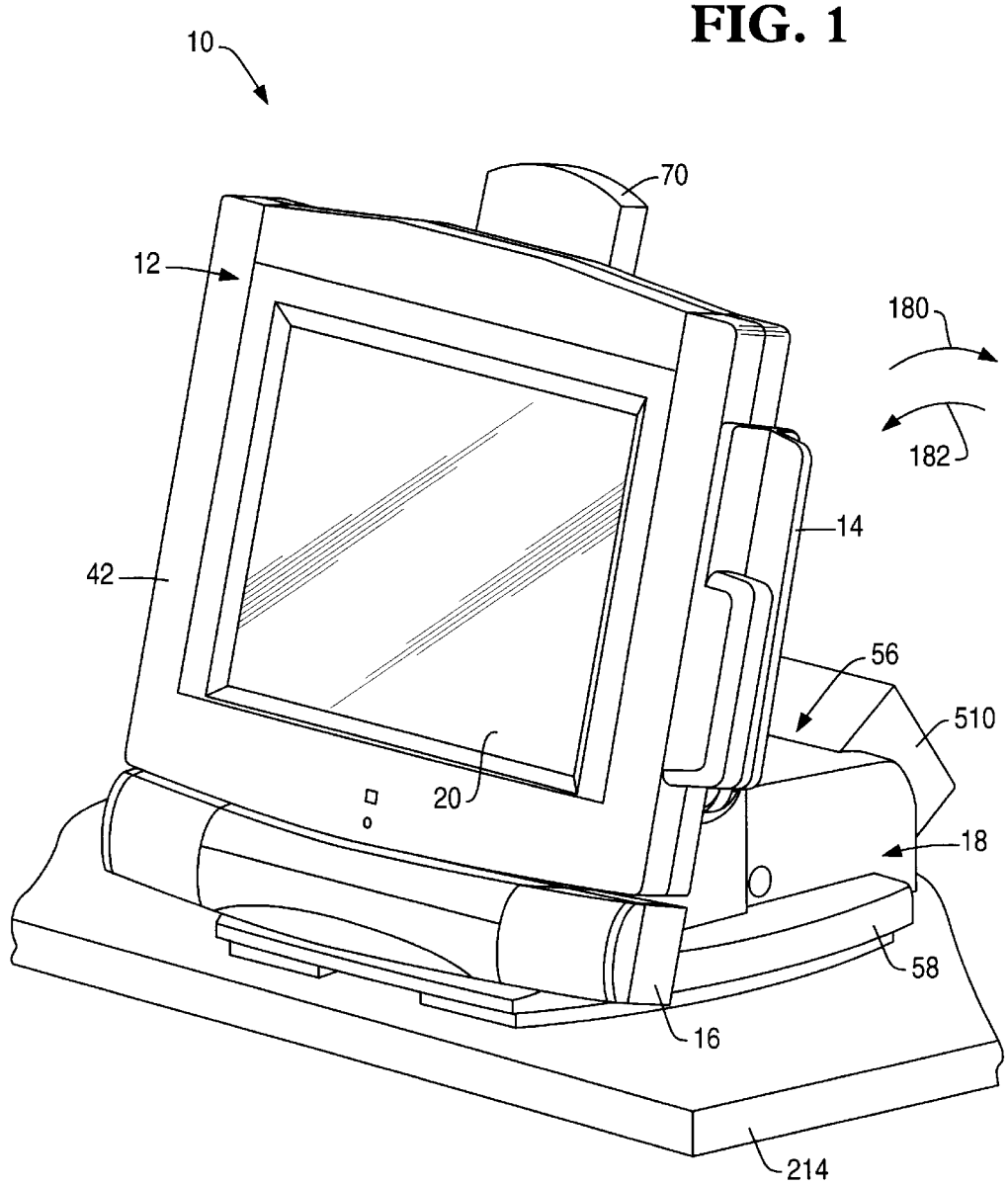
FIG. 1 is a perspective view of a consumer interactive retail terminal which incorporates the features of the present invention therein, note that the retail terminal includes a pivoting base assembly and is positioned on a tabletop.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Referring now to FIGS. 1–5, there is shown a consumer interactive retail terminal 10 which may be configured to perform a number of retail functions such as a point-of-sale retail function or a product demonstration retail function. The retail terminal 10 may be utilized to perform either assisted or unassisted retail functions.

What is meant herein by the term "point-of-sale retail function" is a function performed by a retail terminal when the retail terminal is being operated to check out items for purchase. Some examples of point-of-sale retail functions include (i) entering items into a memory of the retail terminal with a scanner device, (ii) entering items into a memory of the retail terminal with a touch screen input device, (iii) calculating cost of items entered into the retail terminal, and (iv) displaying transaction data including total cost of entered items on a display monitor.

Moreover, what is meant herein by the term "product demonstration retail function" is a function performed by a retail terminal when the retail terminal is being operated to provide retail information to a customer. Such retail information may include (i) product information such as item description or price, and (ii) store layout information such as product location within the store. Some examples of product demonstration retail functions include (i) entering a retail information query into a memory of the retail terminal with a scanner device, (ii) entering a retail information query into a memory of the retail terminal with a touch screen input device, (iii) comparing data of an retail information query to a product database, and (iv) displaying product information on a display monitor in response to retrieval of a retail information query.

What is meant herein by the term "assisted retail functions" are those retail functions performed by a retail terminal when the retail terminal is being operated by a clerk or associate which is employed by the retailer to operate the retail terminal. For example, an assisted retail function would be performed by the retail terminal 10 in response to a store-employed clerk scanning or otherwise entering a customer's items for purchase into the retail terminal, and thereafter depressing a payment-received key on the retail terminal which indicates that the customer paid for such items.

Moreover, what is meant herein by the term "unassisted retail functions" are those retail functions which are performed a retail terminal by the customer himself or herself without the assistance of a clerk or other personnel employed by the retailer. For example, an unassisted retail function would be performed by the retail terminal 10 in response to a customer himself or herself scanning or otherwise entering items for purchase into the retail terminal, and depressing a payment key on the retail terminal which indicates that the customer paid for such items (e.g. by interaction with a credit/debit card reader or a cash acceptor). Another unassisted retail function would be performed by the retail terminal 10 in response to a customer himself or herself entering an information query into the retail terminal, such as a kiosk-type terminal, in order to retrieve product information from the retail terminal.

The retail terminal 10 includes a core module assembly 12, a card reader 14, and a stereo speaker assembly 16. The retail terminal 10 further includes a multiple-orientation or pivoting base assembly 18 to which the core module assembly 12 is secured. What is meant herein by the terms "multiple-orientation base assembly" or "pivoting base assembly" is a base assembly which allows the core module assembly 12 to be positioned at any one of numerous orientations or angles relative to the base assembly 18.

The core module assembly 12 includes a display screen 20, a main board assembly 48, and a wireless local area network (LAN) card 66. The display screen 20 and the main board assembly 48 are both secured within a housing 40, whereas the LAN card 66 extends out of the housing 40 and is enveloped by a cover 70. It should be appreciated that the cover 70 is constructed of a material suitable to allow the cover 70 to function as an antenna thereby facilitating signal transmission to and from the LAN card 66.

Figure 5:
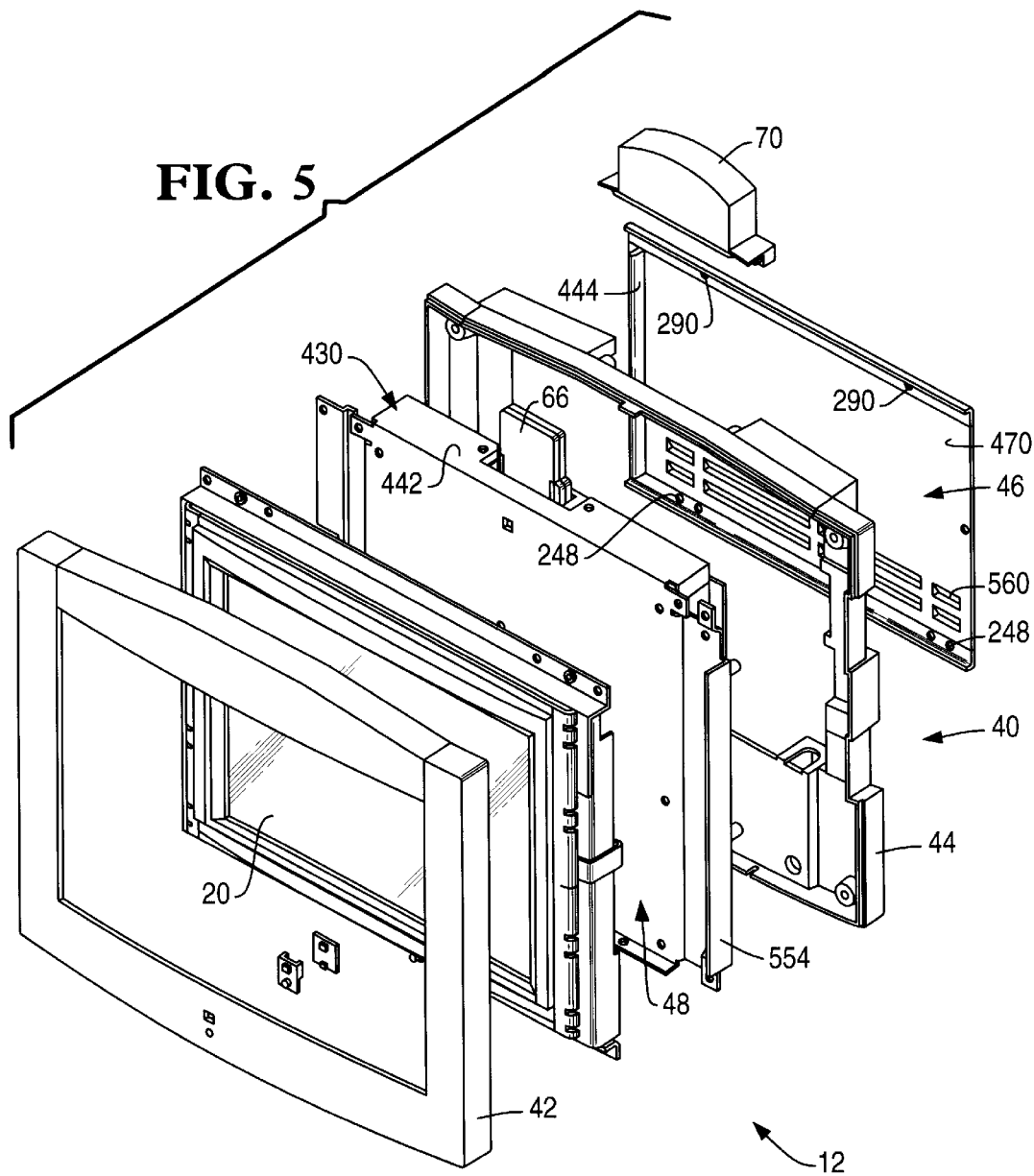
FIG. 5 is an exploded perspective view of the core module assembly of FIG. 4.

As shown in FIG. 5, the housing 40 includes a front enclosure 42, a rear enclosure 44, and a heat dissipating rear cover 46. The pivoting base assembly 18 includes a tilt mechanism 56 and a stationary base 58. The tilt mechanism 56 couples the housing 40 of the core module assembly 12 to the stationary base 58. Hence, as shall be discussed below in more detail, the tilt mechanism 56 allows the core module assembly 12 and hence the display monitor 20 to be positioned at any one of numerous orientations or angles relative to the stationary base 58. Such pivoting of the core module assembly 12 is particularly useful for facilitating use of the retail terminal 10 by various users (such as a checkout clerk in the case of when the retail terminal 10 is operating as an assisted retail terminal) each of which may prefer the display monitor 20 to be positioned at a different angle relative to the stationary base 58.

Figure 4:
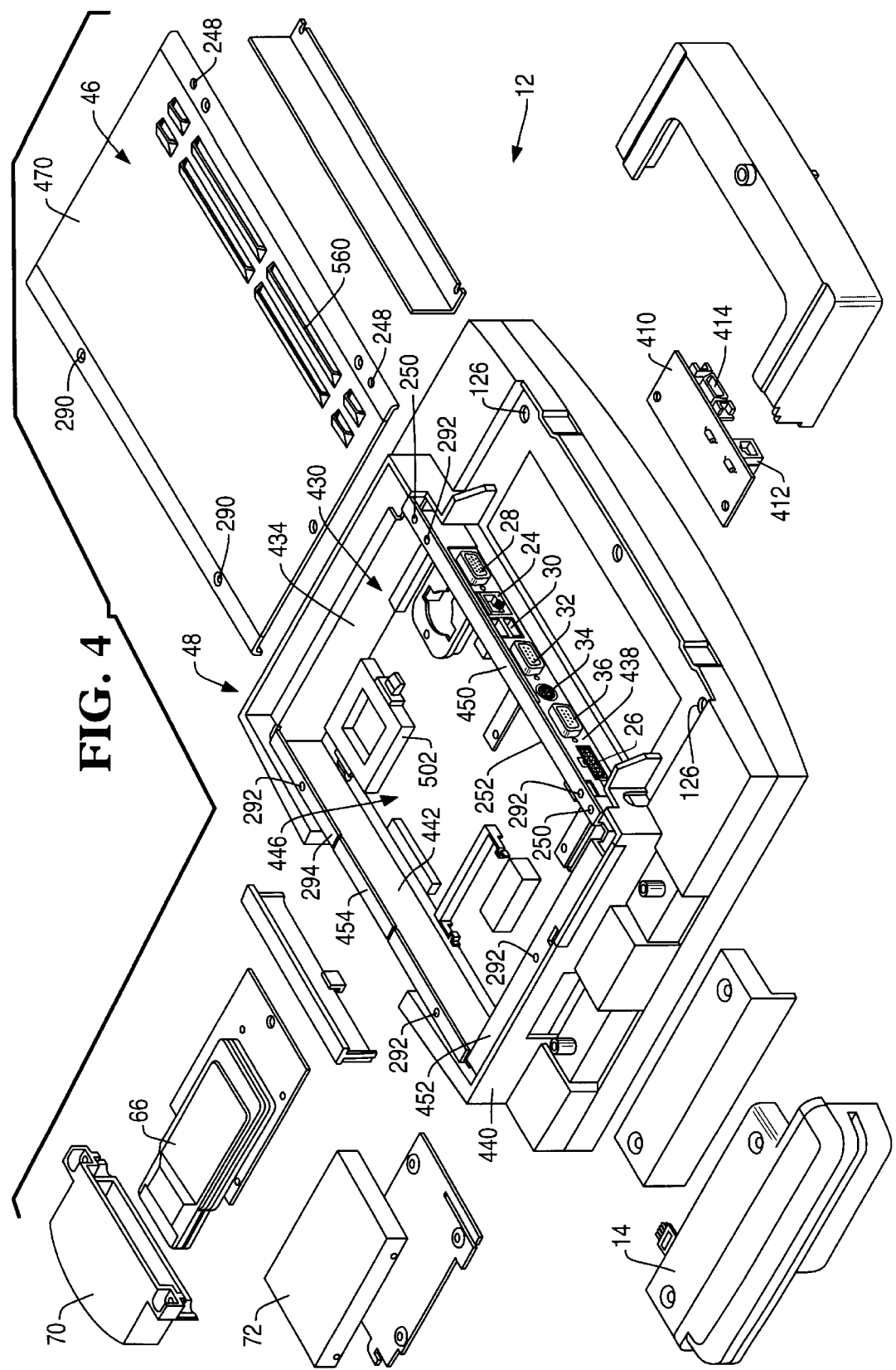
FIG. 4 is an exploded rear perspective view of the core module assembly of the retail terminal of FIG. 1.
Figure 6:
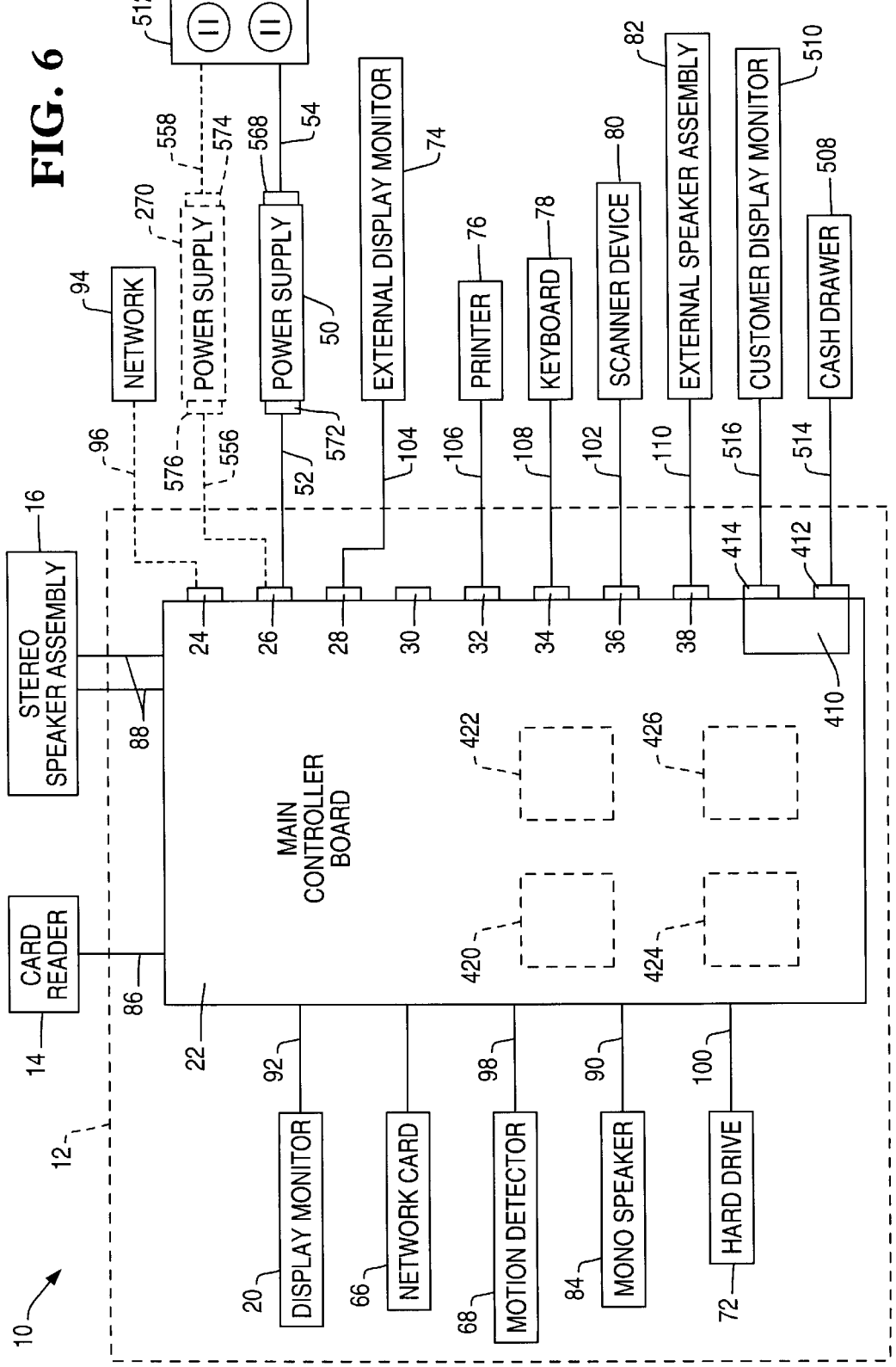
FIG. 6 is a simplified block diagram of the retail terminal of FIG. 1.

As shown in FIGS. 4 and 6, the main board assembly 48 includes a main controller board 22 which has a number of electrical connectors 24, 26, 28, 30, 32, 34, 36, and 38. As will be discussed below in more detail, a number of peripheral devices may be electrically coupled to the main controller board 22 via the electrical connectors 24, 26, 28, 30, 32, 34, 36, and 38 in order to allow the retail terminal 10 to perform a number of retail functions. The main controller board 22 may be configured to include a point-of-sale (POS) card 410 in order to increase the number of peripherals which may be coupled to the main board assembly 48. In particular, the point-of-sale card 410 includes a pair of electrical connectors 412 and 414 which may be used to couple peripherals which are commonly included in a point-of-sale system to the main controller board 22. For example, the electrical connector 412 may be used to couple a cash drawer 508 (see FIG. 6) the main controller board 22, whereas the electrical connector 414 may be used to couple a customer display monitor 510 (see FIGS. 1, 2, and 6) to the main controller board 22. Moreover, the main board assembly 48 includes a monophonic speaker 84 which is provided to produce audible tones and sounds associated with operation of the retail terminal 10.

Figure 3:
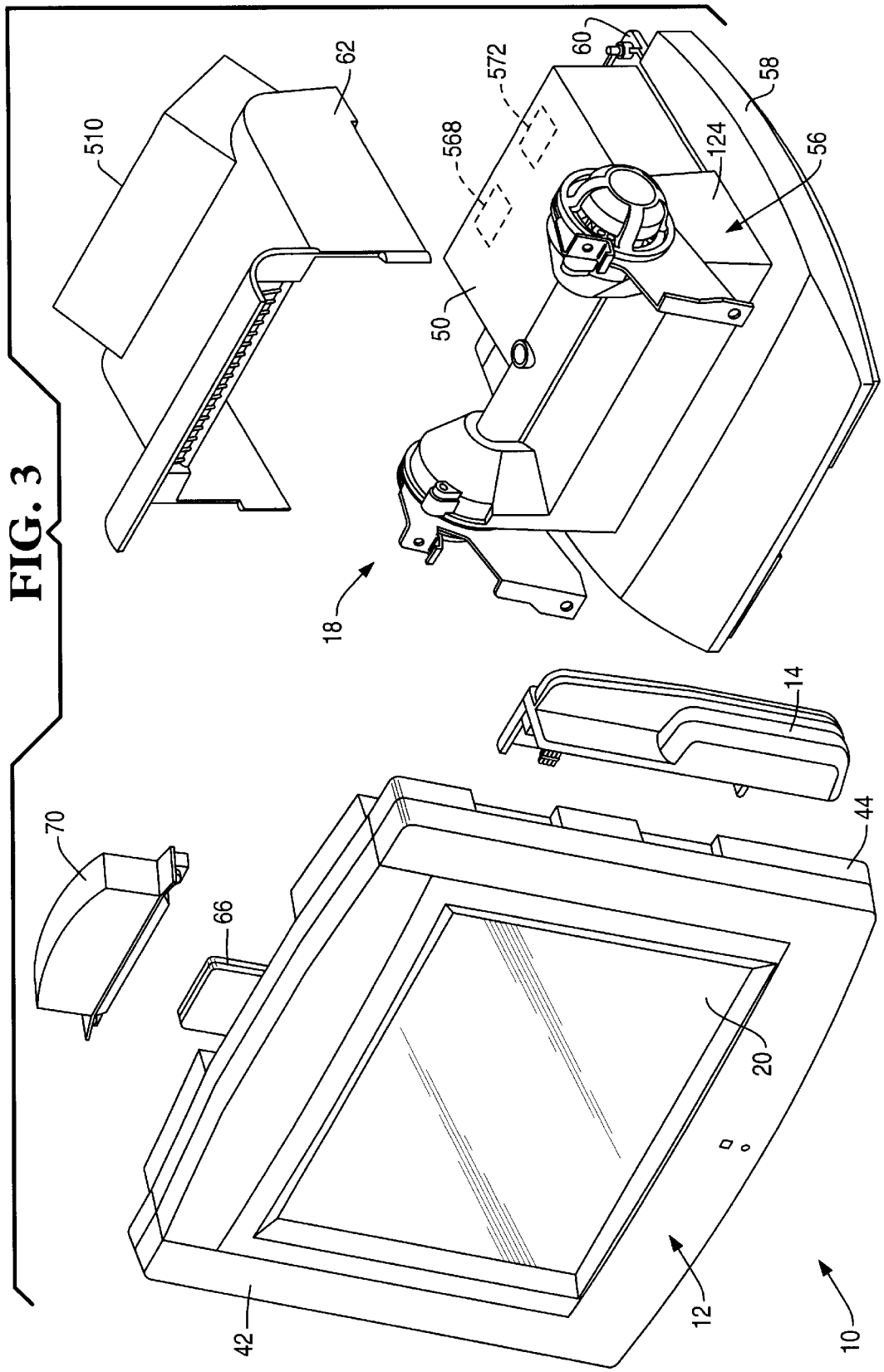
FIG. 3 is an exploded perspective view of the retail terminal of FIG. 1.

The retail terminal 10 also includes a power supply 50, as shown in FIG. 3. The power supply 50 is electrically coupled to the main controller board 22 via an intermediate power cable 52 (see FIG. 6). A source power cable 54 (see FIG. 6) couples the power supply 50 to a power source such as a standard 110 VAC outlet 512 in order to provide electrical power to the retail terminal 10.

The power supply 50 is housed in the stationary base 58 of the pivoting base assembly 18. In particular, the power supply 50 is secured to a bottom structure 60 of the stationary base 58 and is covered by a shroud 62. It should be appreciated that such a configuration enhances the cable management associated with the retail terminal 10. In particular, the stationary base 58 has a number of cable access openings 64 defined therein (see FIG. 2). With a first end of the source power cable 54 coupled to the outlet 512, a second end of the source power cable 54 may be advanced through any one of the access openings 64 and thereafter connected to the power supply 50. Moreover, such a configuration allows the intermediate power cable 52 to be advanced from the power supply to the power connector 26 (see FIGS. 4 and 6) while being covered by the shroud 62 thereby preventing a portion of the intermediate power cable 52 from dangling or otherwise hanging from the retail terminal 10. It should also be appreciated that such a configuration of the pivoting base assembly 18 also allows other cables associated with the retail terminal 10, such as a LAN cable or speaker cable, to be advanced through the access openings 64 and thereafter connected to a corresponding electrical connector 24, 28, 30, 32, 34, 36, 38, 412, 414 without dangling or otherwise hanging from the retail terminal 10.

Referring now to FIG. 6, there is shown a block diagram of the core module assembly 12. The main controller board 22 of the core module assembly 12 is, in essence, a modified flat panel personal computer (PC), and includes a number of components commonly associated therewith such as a microprocessor 420, a number of memory modules 422, an Ethernet controller 424, a number of video and audio devices 426, and a hard drive device 72. Moreover, the main controller board 22 is electrically coupled to the card reader 14, the stereo speaker assembly 16, the display screen 20, the LAN card 66, a motion detector 68, and the monophonic speaker 84. In addition, the main controller board 22 may also be electrically coupled to an external display monitor 74, a printer 76, a keyboard 78, a scanner device 80, an additional external speaker assembly 82 such as headphones, the cash drawer 508, and the customer display monitor 510.

It should be appreciated that the term "core module assembly" is used herein to mean a computing device which includes at least the following components: (i) a display monitor, such as a touch screen LCD display monitor, (ii) a processing unit such as a personal computer which processes retail data input thereto, and (iii) a plurality of connectors for electrically coupling a number of retail peripheral devices to the processing unit.

The card reader 14 is coupled to the main controller board 22 via a data communication line 86. The card reader 14 may be any known magnetic strip reader including a credit and/or debit card reader, or a smart card reader.

Figure 32:
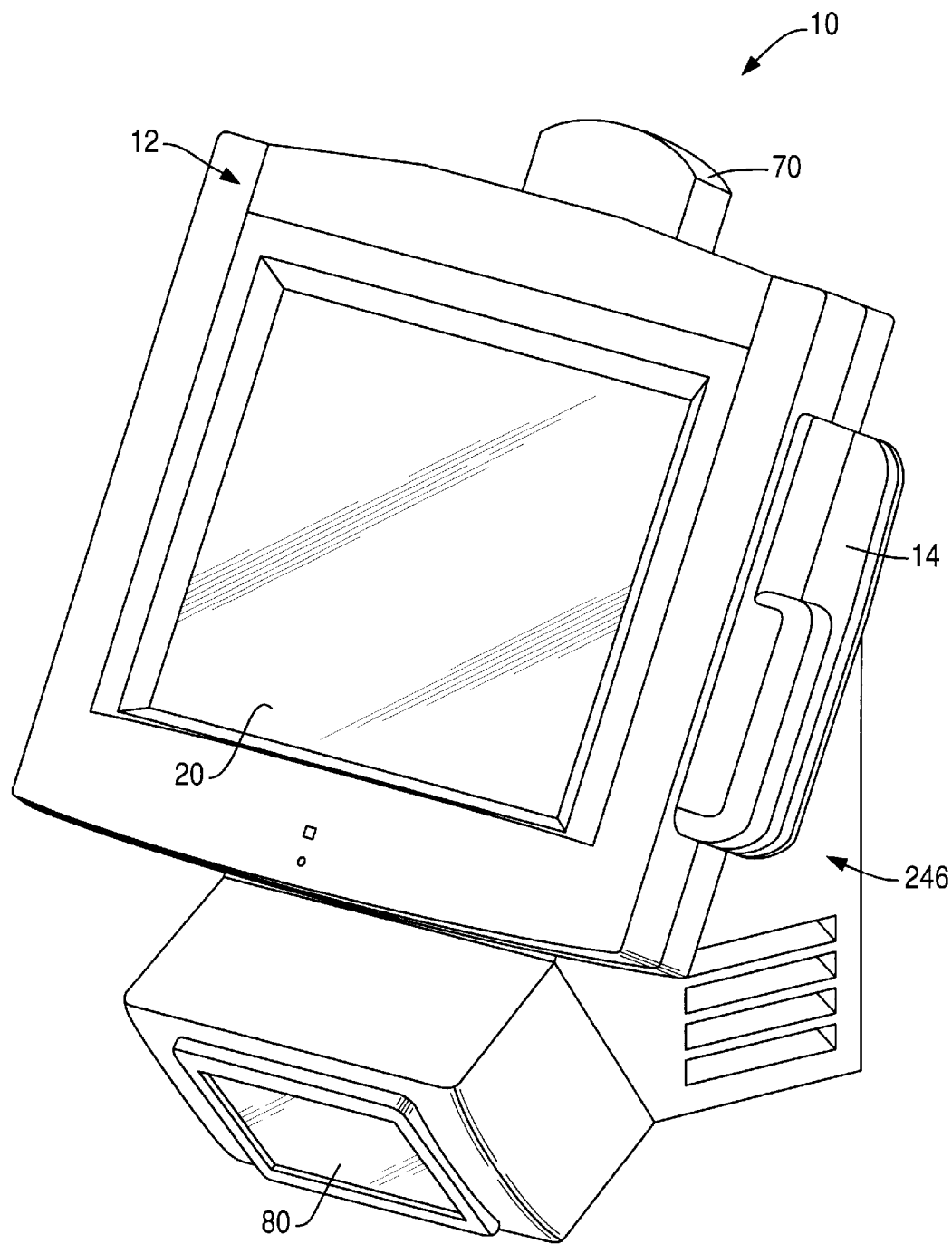
FIG. 32 is a view similar to FIG. 30, but showing the retail terminal configured without the stereo speaker assembly.
Figure 33:
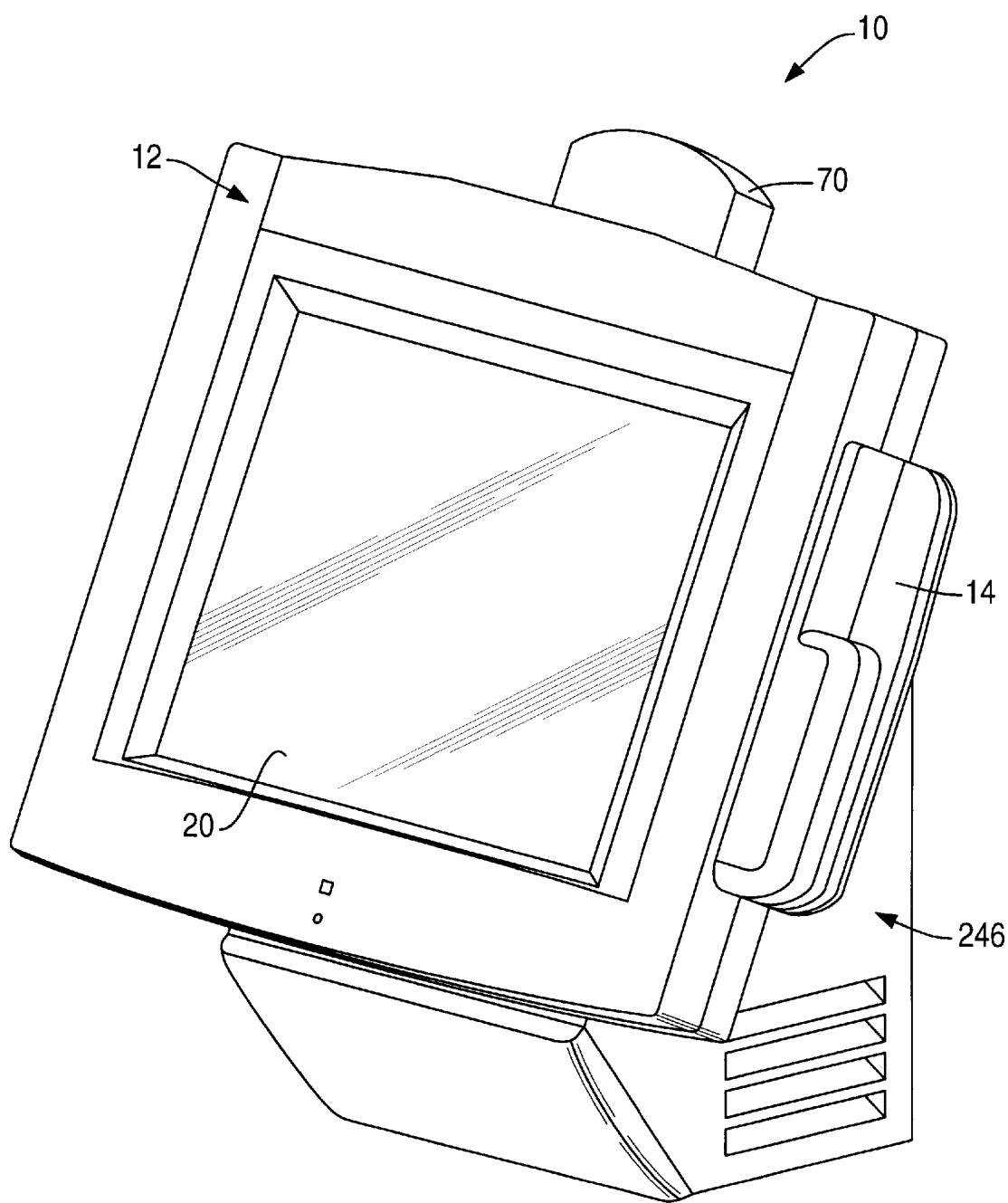
FIG. 33 is a view similar to FIG. 30, but showing the retail terminal configured with neither the stereo speaker assembly nor the scanner device.

The stereo speaker assembly 16 is coupled to the main controller board 22 via a pair of stereo cables 88. The stereo speaker assembly 16 may include any known pair of stereo loudspeakers. It should be appreciated that as shown in FIGS. 32 and 33, the retail terminal 10 may be configured without use of the stereo speaker assembly 16 to fit the needs of a particular retail function. When configured in such a manner, the monophonic speaker 84, which is coupled to the main controller board via a speaker line 90, produces the audible sounds and tones associated with operation of the retail terminal 10.

The display monitor 20 is coupled to the main controller board 22 via a data communication line 92. The display monitor 20 may be any one of numerous known liquid crystal display (LCD) monitors. The display monitor 20 is provided to display various visual messages such as video product demonstrations, product advertisements, employee training videos, or the like. In addition, if the retail terminal 10 is configured so as to function as a point-of-sale (POS) terminal (as discussed in more detail below) the display monitor 20 may be used to display information associated with a checkout transaction such as item cost, transaction total, or the like.

Moreover, the display monitor 20 may be a known touch screen monitor which can generate data signals when certain areas of the screen are touched by a user. Such data signals are transmitted to the main controller board 22 via the data communication line 92. It should be appreciated that such a configuration enables interactive operation of the retail terminal 10. For example, the retail terminal 10 may be configured as an interactive customer assistance terminal in which a user touches a particular area of the touch screen associated with the display monitor 20 to enter an information request. The results of the request may then be displayed visually and/or audibly with the display monitor 20 and/or the speaker assembly 16.

The LAN card 66 is provided to enable wireless communication between the retail terminal 10 and the retailer's network system such as a local area network (LAN) 94. The LAN card 66 may be any one of numerous known wireless network cards such as a wireless PCMCIA card. It should be appreciated that the core module assembly 12 may also be coupled to the LAN 94 via a wired connection such as a known twisted pair connection. In particular, the main controller board 22 may be directly coupled to the LAN 94 via a wired connection such as a LAN cable 96 coupled to the LAN connector 24. It should be further appreciated that such a wired connection to the LAN 94 provides increased data transmission speed relative to the wireless connection via the LAN card 66.

The motion detector 68 is coupled to the main controller board 22 via a signal line 98. The motion detector 68 is provided to detect the presence of a user in the area proximate the retail terminal 10. In particular, when a user approaches the area proximate retail terminal 10, the motion detector 68 generates an output signal which is sent to the main controller board 22. The main controller board 22 may then cause a video and/or audio sequence to be executed on the display monitor 20 and/or the stereo speaker assembly 16, respectively, which draws the user's attention to the retail terminal 10. It should also be appreciated that the motion detector 68 may also be used to facilitate energy conservation by the retail terminal 10. In particular, the retail terminal 10 may be operated such that a number of components associated therewith are placed in a "sleep" mode after a period of nonuse. The motion detector 68 may be used to "wake" the retail terminal 10 when a user approaches the area proximate the retail terminal 10. The motion detector 68 may include any one of numerous known motion detectors such as photoelectric detectors.

The main controller board 22 is coupled to the hard drive device 72 via a data bus 100. It should be appreciated that the retail terminal 10 may be configured such that the data storage requirements thereof are provided for at a remote location such as one of the network components associated with the LAN 94. Such remote storage of data allows for removal of the hard drive device 72 from the main board assembly 48 thereby reducing the number of components included in the retail terminal 10. Such component reduction reduces costs associated with the retail terminal 10.

The main controller board 22 is coupled to the scanner device 80 via a data cable 102 which is coupled to the scanner connector 36. The scanner device 80 conventionally scans or reads an identification code such as a Universal Product Code (UPC), industrial symbol(s), alphanumeric character(s), or other indicia associated with an item to be purchased. The scanner 80 includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the identification code on an item is passed adjacent the scanner device 80, the scanning light beams scatter off the code and are returned to the scanner device 80 where they are collected and detected. The reflected light is then analyzed electronically in order to determine whether the reflected light contains a valid identification code pattern. If a valid code pattern is present, the identification code is then converted into pricing information which is then used to determine the cost of the item in a known manner.

The main controller board 22 may also be electrically coupled to the external display monitor 74 via a video cable 104 coupled to the video connector 28. The external display monitor 74 may be used to display video images for purposes such as product demonstrations or training films. Use of the external display monitor 74 allows the retail terminal 10 to display video images across a larger area relative to displaying such images with the display monitor 20 only. The external display monitor 74 may be any known display monitor such as a VGA or Super VGA monitor or a known television unit.

The main controller board 22 may also be electrically coupled to the printer 76 via a printer cable 106 coupled to the printer connector 32. The printer 76 may be used, for example, to print receipts or the like when the retail terminal 10 is configured as a point-of-sale terminal, or may be used to print coupons, recipes, or the like when the retail terminal 10 is configured as a retail information terminal. The printer 76 may be any known printer such as a laser, dot-matrix, or thermal printer.

The main controller board 22 may also be electrically coupled to the keyboard 78 via a data cable 108 coupled to the keyboard connector 34. The keyboard 78 may be used, for example, to enter data into the retail terminal 10 during programming or configuration thereof. Moreover, the keyboard 78 may be used to enter a user's response to a question that is displayed on the display monitor 20. The keyboard 78 may be any known PC keyboard such as a P/S2 keyboard.

The main controller board 22 may also be electrically coupled to the external speaker assembly 82 via a speaker cable 110 coupled to the external speaker connector 38. The external speaker assembly 82 may be embodied as a pair of headphones which would allow a user to privately listen to audio messages such as the audio portion of an employee training film. Moreover, the external speaker assembly 82 may alternatively be embodied as a pair of loudspeakers which may be positioned at locations remote from the retail terminal 10.

The connector 30 is provided to increase the flexibility of the main controller board 22. In particular, the connector 30 is preferably configured as a universal serial bus (USB) connector thereby allowing peripherals which support USB data transmission protocols to be coupled thereto. It should be appreciated that the main controller board 22 and the connector 30 may also be configured to support various other types of data communication protocols in lieu of a USB data communication protocol. For example, the connector 30 may be configured to support known serial or parallel data communication protocols.

The point-of-sale card 410 of the main controller board 22 is electrically coupled to the cash drawer 508 via a data cable 514 coupled to the cash drawer connector 412. The cash drawer 508 may be used, for example, to hold cash or the like when the retail terminal 10 is configured as a point-of-sale terminal. The cash drawer 508 may be any known electrically-controlled cash drawer.

The point-of-sale card 410 of the main controller board 22 may also be electrically coupled to the customer display monitor 510 (see also FIGS. 1 and 2) via a video cable 516 coupled to the customer display monitor connector 414. The customer display monitor 510 may be used, for example, to display retail information, such as the cost of an item being purchased by the customer, when the retail terminal 10 is configured as a point-of-sale terminal. Hence, when the retail terminal 10 is being used as an assisted point-of-sale terminal, transaction information may be displayed for the retail clerk on the display screen associated with the display monitor 20 of the core module assembly 12, whereas transaction information may displayed for the customer on the display screen associated with the customer display monitor 510. The customer display monitor 510 may be one of any known display monitors such as a cathode-ray tube (CRT) monitor or a liquid crystal display (LCD) monitor.

As shown in FIGS. 4, 5, and 7–15, the main controller board 22 is housed in a thermally conductive housing 430.

Figure 13:
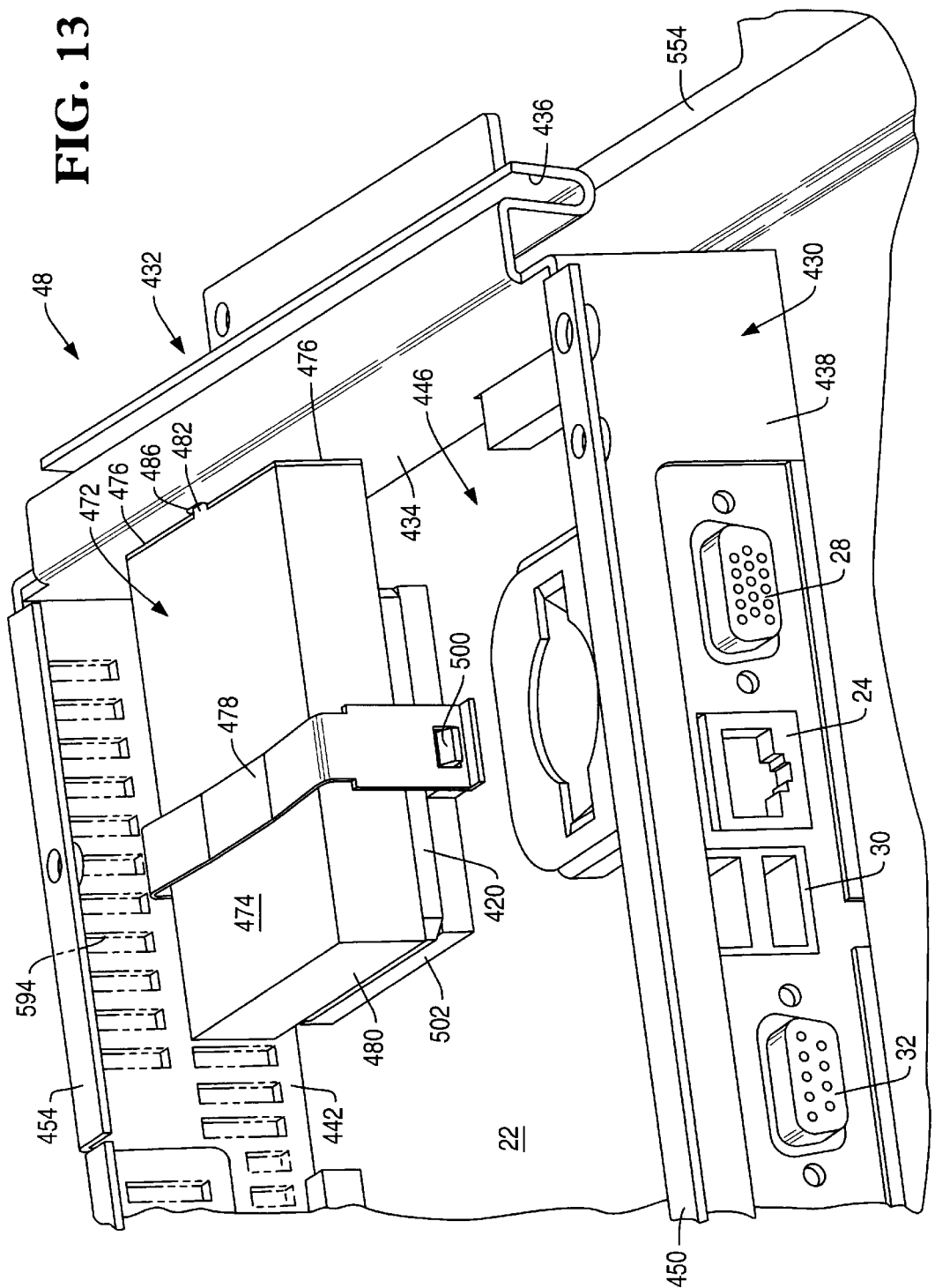
FIG. 13 is a view similar to FIG. 12, but showing the heat sink assembly secured within the housing of the main board assembly.
Figure 14:
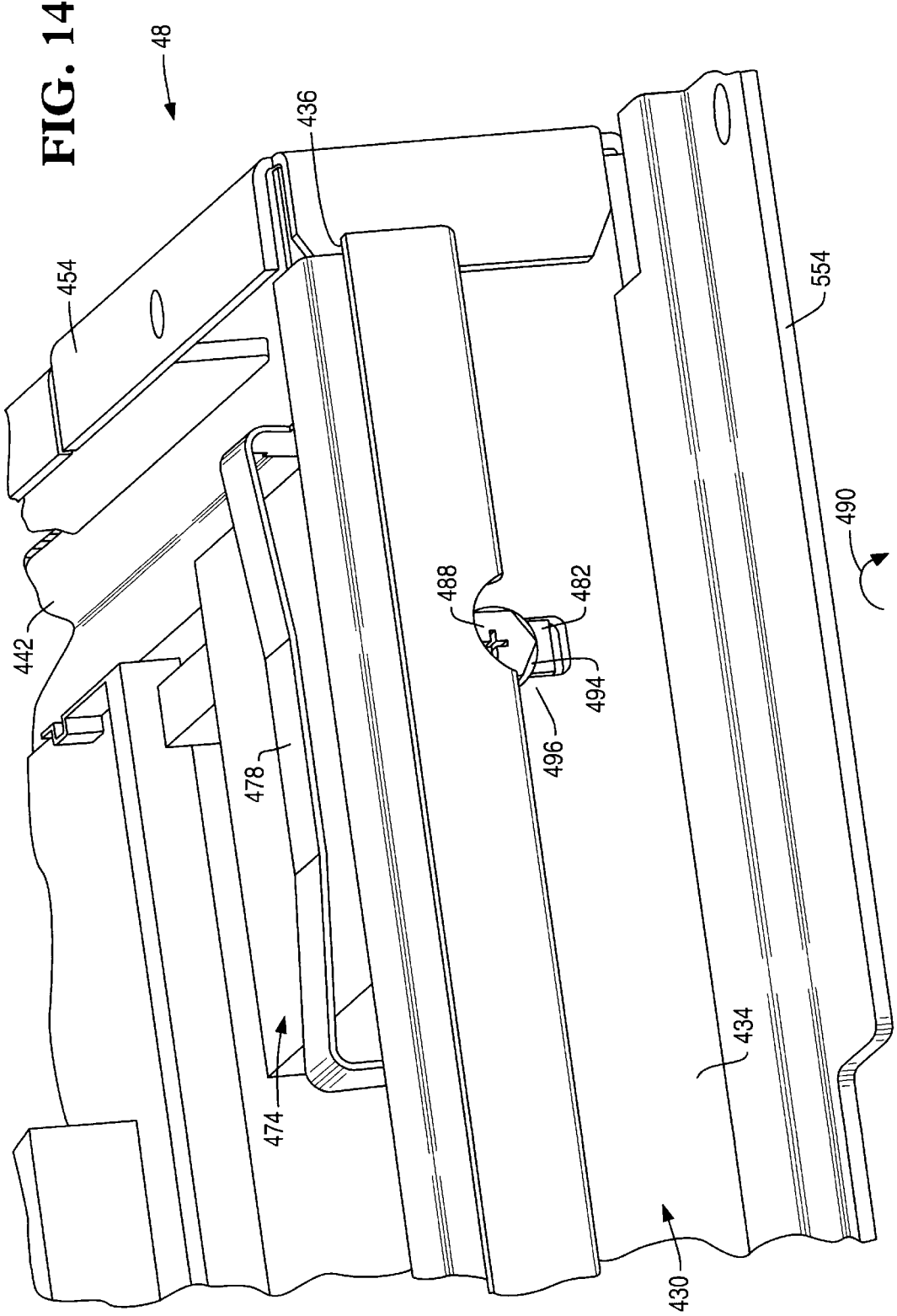
FIG. 14 is an enlarged fragmentary perspective view of the main board assembly of FIG. 7 which shows the bolt being received through the keying slot and into the key portion of the heat block.
Figure 15:
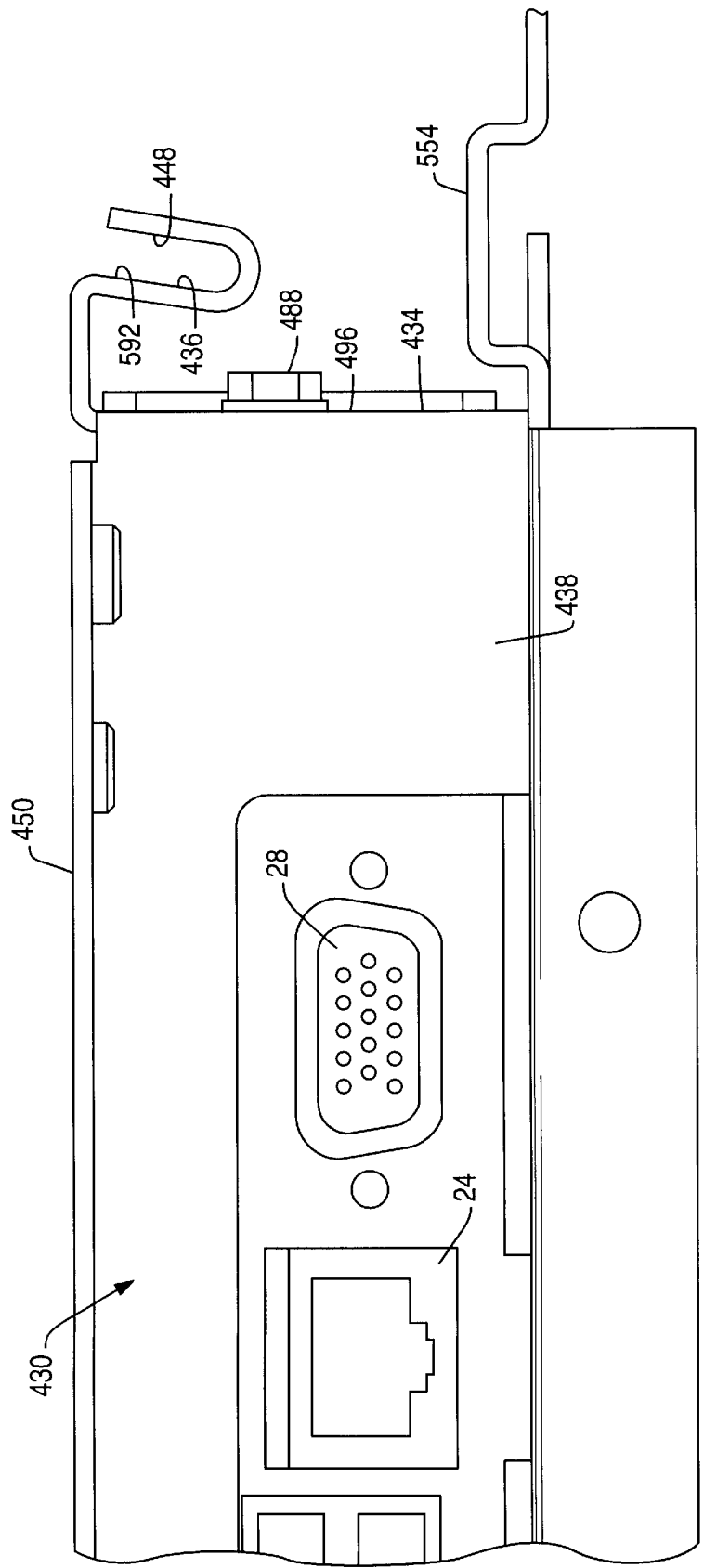
FIG. 15 is an enlarged fragmentary bottom elevational view of the main board assembly of FIG. 7.
Figure 16:
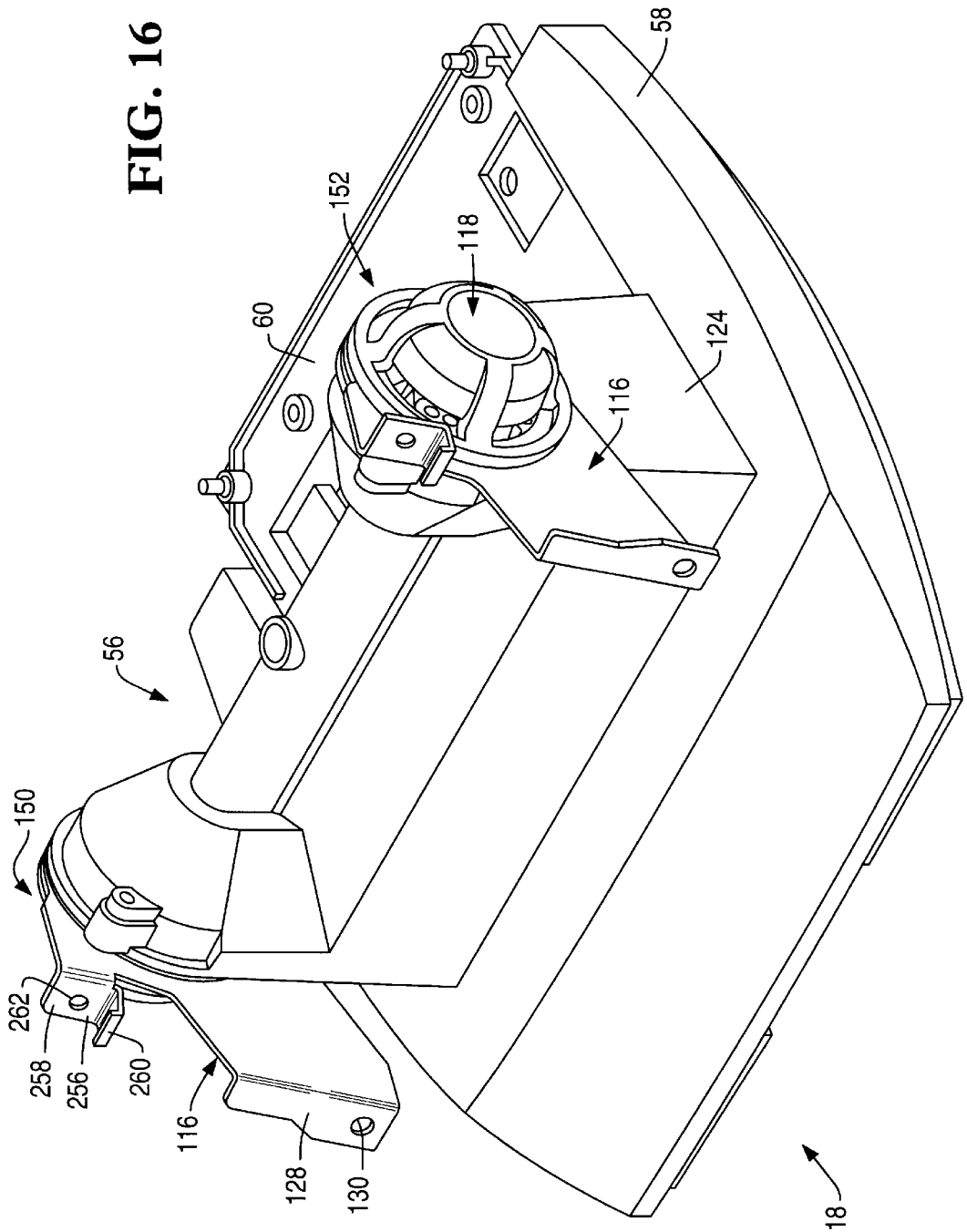
FIG. 16 is a perspective view of the pivoting base assembly of the retail terminal of FIG. 1.

The main board assembly 48 also includes a mounting plate 554. The mounting plate 554 is provided to secure the thermally conductive housing 430 to the display monitor 20. As shown in FIG. 13, the housing 430 includes a heat transfer structure 432. The heat transfer structure 432 includes a sidewall 434 and a U-shaped elongated channel 436. The sidewall 434 cooperates with a number of sidewalls 438, 440, and 442 to define an opening 446 through which a number of components contained within the housing 430, such as the microprocessor 420, are accessible. Moreover, each of the sidewalls 438, 440, and 442 has a fastening surface 450, 452, and 454, respectively, defined therein (see FIG. 4).

Figure 7:
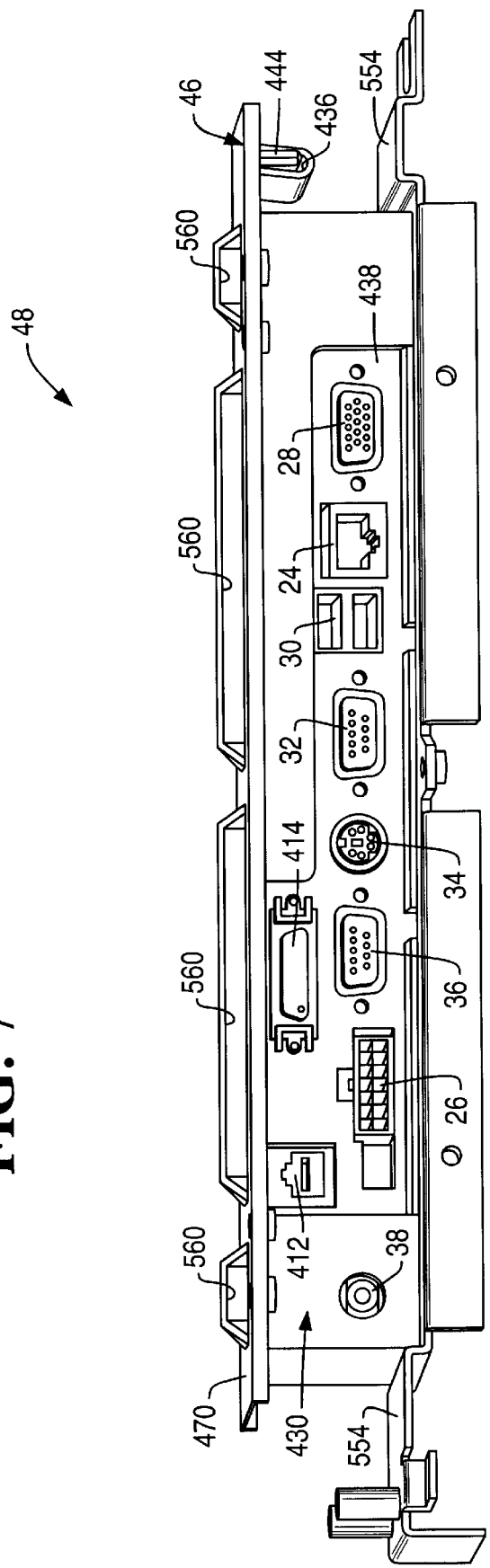
FIG. 7 is a bottom elevational view of the main board assembly of the core module assembly of FIG. 4.
Figure 8:
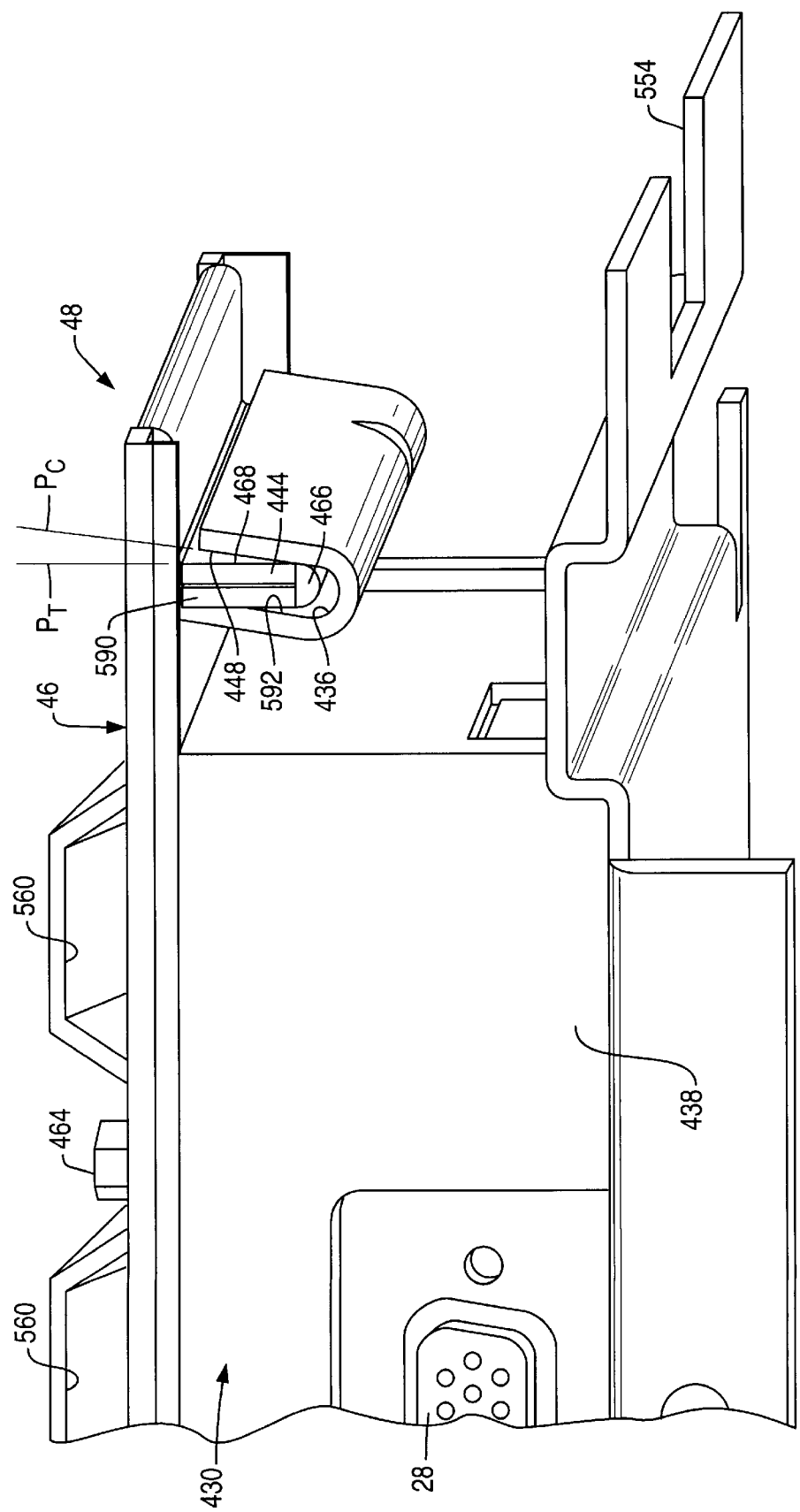
FIG. 8 is an enlarged fragmentary perspective view of the main board assembly of FIG. 7.
Figure 9:
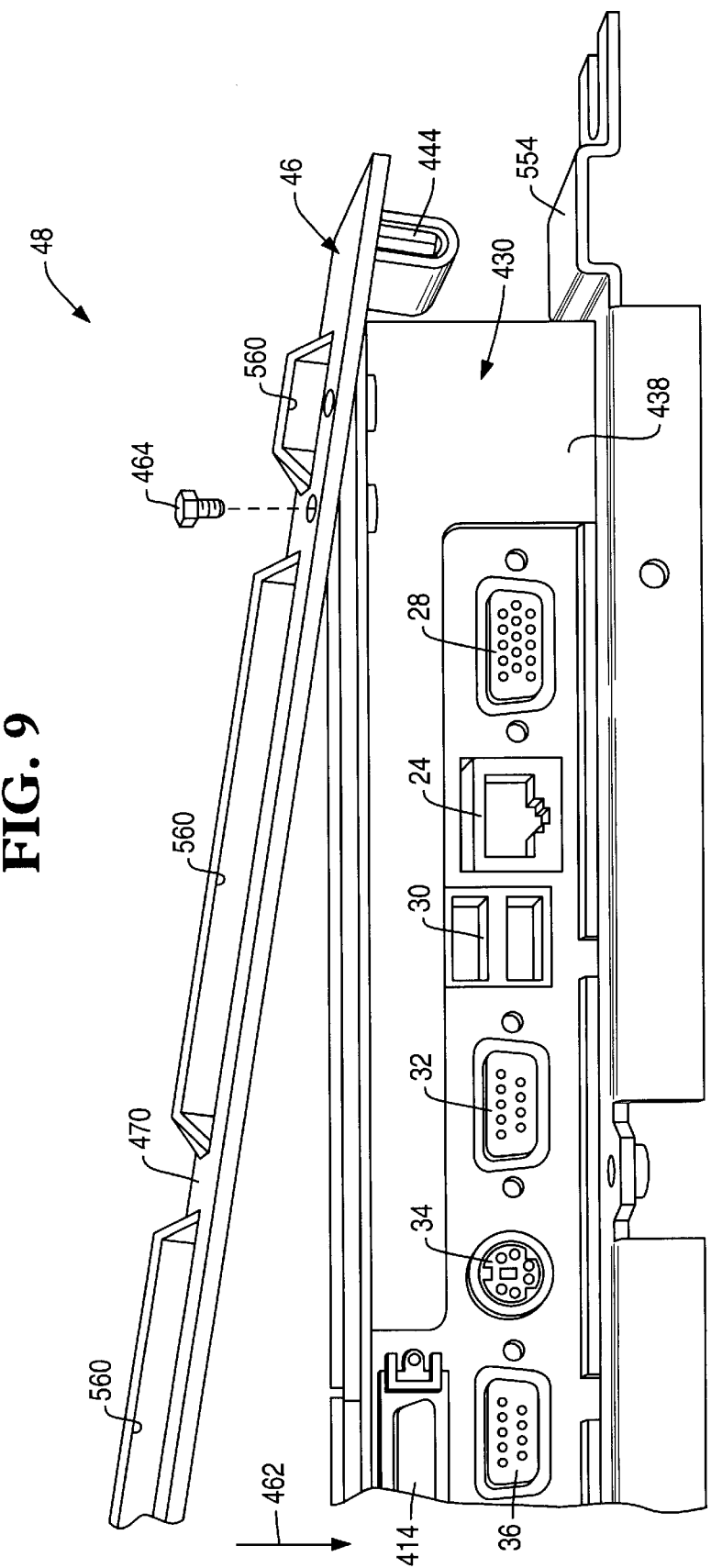
FIG. 9 is an enlarged fragmentary view similar to FIG. 7, but showing the rear cover positioned in its non-biased position.
Figure 10:
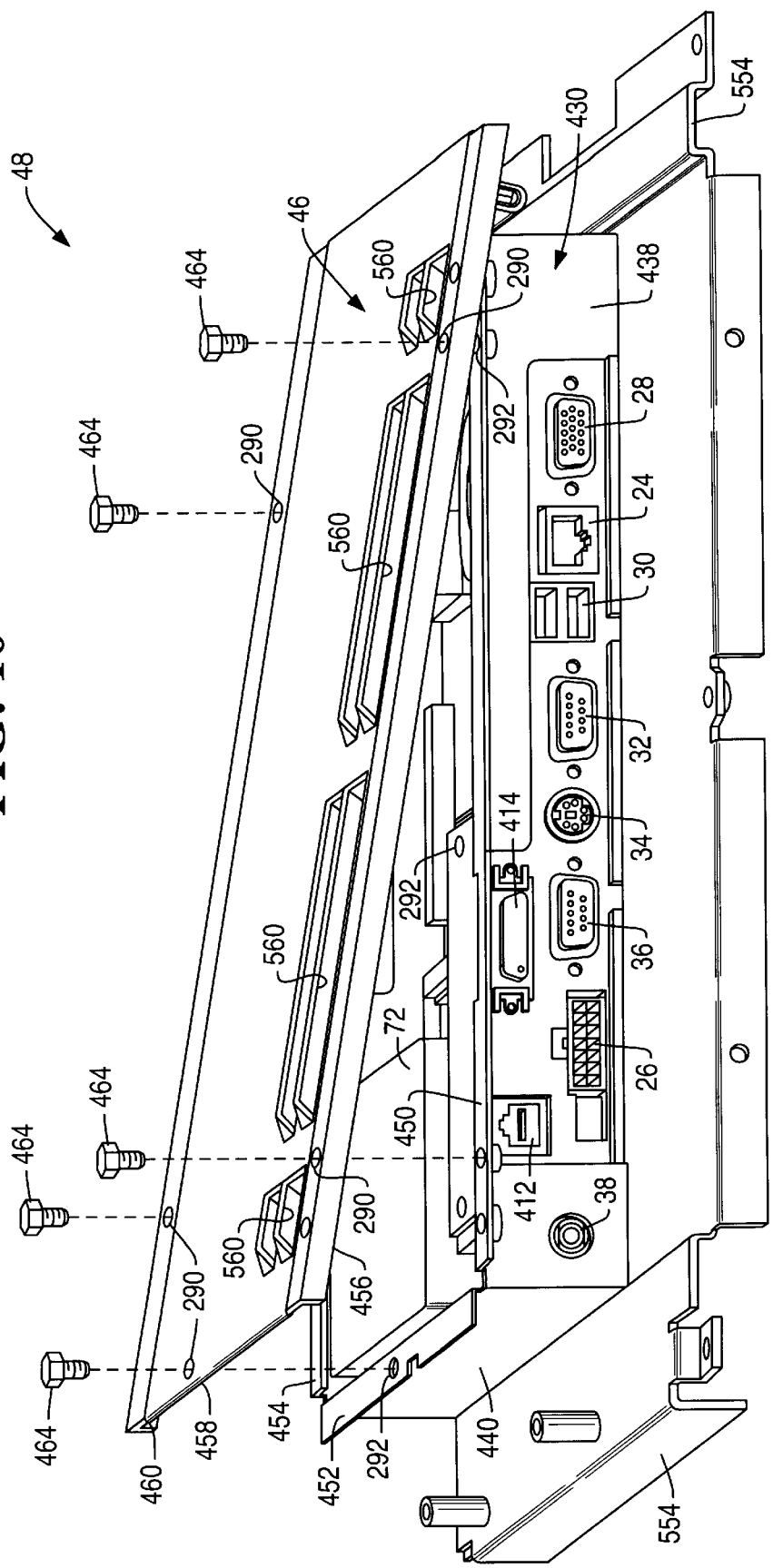
FIG. 10 is a perspective view showing the main board assembly of FIG. 7 with the rear cover positioned in its non-biased position.
Figure 11:
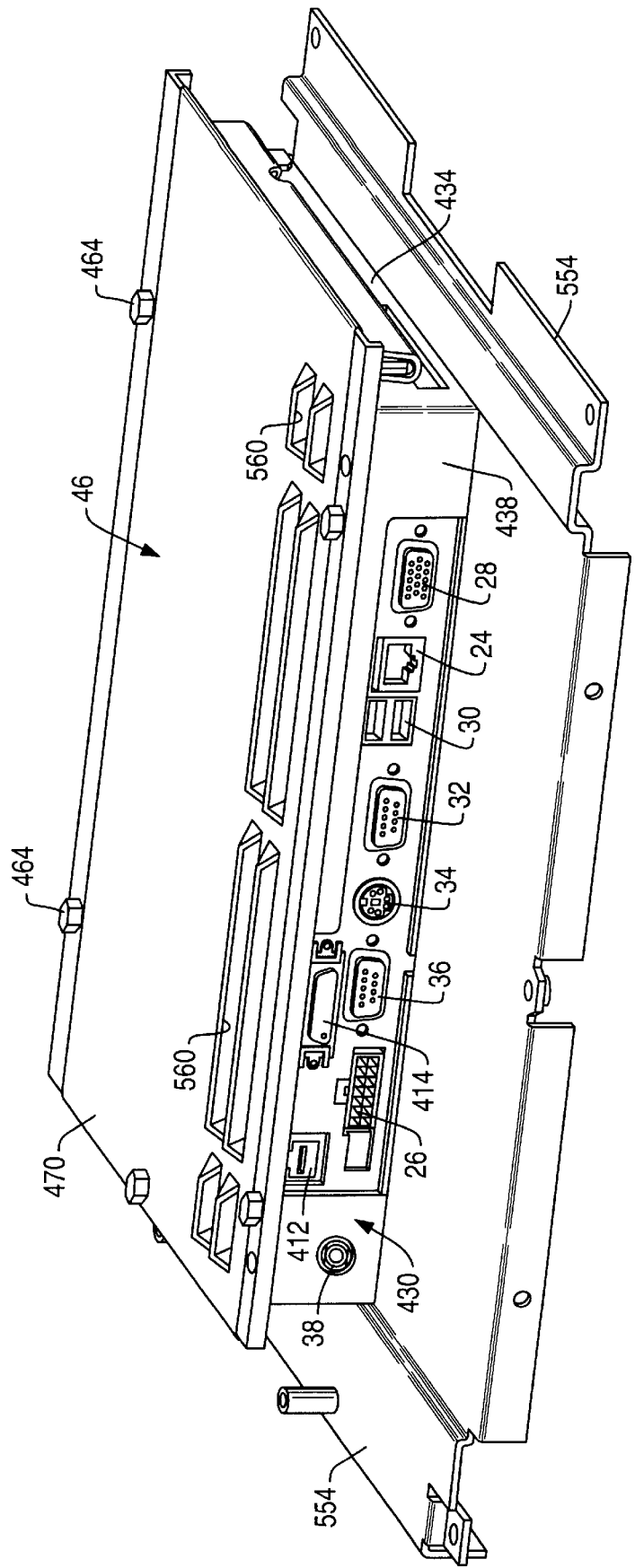
FIG. 11 is a view similar to FIG. 10, but showing the rear cover positioned in its biased position.

The rear cover 46 defines a heat dissipating member which has a heat dissipating plate 470. The heat dissipating plate 470 has an elongated tongue 444 extending therefrom. The tongue 444 is received into the elongated channel 436 in order to provide an efficient thermal path for dissipating heat generated by the microprocessor 420 or the various other integrated circuit devices associated with the main controller board 22. In particular, the rear cover 46 is positionable between a non-biased position (as shown in FIGS. 9 and 10) and a biased position (as shown in FIGS. 7, 8, and 11). When the rear cover 46 is positioned in the biased position, the tongue 444 is urged or otherwise biased toward and into contact with an inner wall 448 of the elongated channel 436 thereby creating an efficient thermal interface therebetween. More specifically, the elongated channel 436 is configured such that the inner wall 448 thereof is angled or otherwise in a non-parallel relationship with the sidewall 434 of the housing 430 (see FIG. 15). Hence, as shown in FIG. 8, an outer wall 468 of the tongue 444 defines a first plane $P_T$, whereas the inner wall 448 of the elongated channel defines a second plane $P_C$.

When the tongue 444 of the rear cover 46 is advanced into the elongated channel 436, the rear cover 46 is initially positioned in its non-biased position in which the plane $P_T$ defined by the tongue 444 is substantially parallel to the plane $P_C$ defined by the elongated channel 436. It should be appreciated that when the rear cover 46 is positioned in its non-biased position, the fastening surfaces 450, 452, 454 of the housing 430 are spaced apart from a number of corresponding fastening surfaces 456, 458, 460, respectively, defined in the rear cover 46 (see FIG. 10). However, when the rear cover 46 is urged or otherwise moved in the general direction of arrow 462 of FIG. 9, the tongue 444 is moved toward and urged into contact with the inner wall 448 of the elongated channel 436 such that the plane $P_T$ defined by the tongue 444 is substantially non-parallel to the plane $P_C$ defined by the elongated channel 436. Moreover, a number of fasteners such as bolts 464 may then be advanced through a number of apertures 290 defined in the fastening surfaces 456, 458, 460 of the rear cover 46 and a number of threaded apertures 292 defined in the fastening surfaces 450, 452, 454, respectively, of the housing 430 thereby securing the fastenings surfaces 456, 458, 460 of the rear cover 46 to the fastening surfaces 450, 452, 454, respectively, of the housing 430. When the rear cover 46 is moved into the biased position, a rounded terminal end 466 defined in the tongue 444 is biased into contact with the inner wall 448 of the elongated channel 436 (see FIG. 8). Moreover, when the rear cover 46 is moved into the biased position, a proximal end 590 defined in the tongue 444 is biased into contact with an inner wall 592 of the elongated channel 436 (see FIG. 8). Therefore, when the rear cover 46 is maintained in the biased position by use of the bolts 464, a portion of the rounded terminal end 466 and a portion of the outer wall 468 are maintained in contact with the inner wall 448 of the elongated channel 436, whereas a portion of the proximal end 590 is maintained in contact with the inner wall 592 of the elongated channel 436. It should be appreciated that such a configuration creates an efficient thermal path between the tongue 444 and the elongated channel 436 when the rear cover 46 is maintained in the biased position.

As described above, the rear cover 46 assumes its non-biased position unless the rear cover 46 is moved to its biased position and thereafter retained with the bolts 464. Such a configuration provides a fail safe to prevent operation of the retail terminal 10 without the rear cover 46 adequately secured to the housing 430. In particular, if a technician or the like removes the rear cover 46 from the housing 430 in order to gain access to the components contained within the housing 430, the rear cover 46 will not assume its biased position until the technician reinstalls the bolts 464 thereby producing a visual indicator for the technician which reduces or eliminates the number of occasions in which the core module assembly 12 may potentially be operated without adequate heat dissipating capability.

Moreover, the heat dissipating plate 470 of the rear cover 46 is located over the opening 446 so as to cover the components contained within the housing 430 when the rear cover 46 is positioned in its biased position. Moreover, the heat dissipating plate 470 has a number of vent apertures 560 defined therein, whereas the sidewall 442 has a number of vent slots 594 defined therein. Ambient air is able to pass through the vent apertures 560 in order to cool the components contained within the housing 430, such as the microprocessor 420. Thereafter, heated air is exhausted out of the housing 430 via the vent slots 594.

Figure 12:
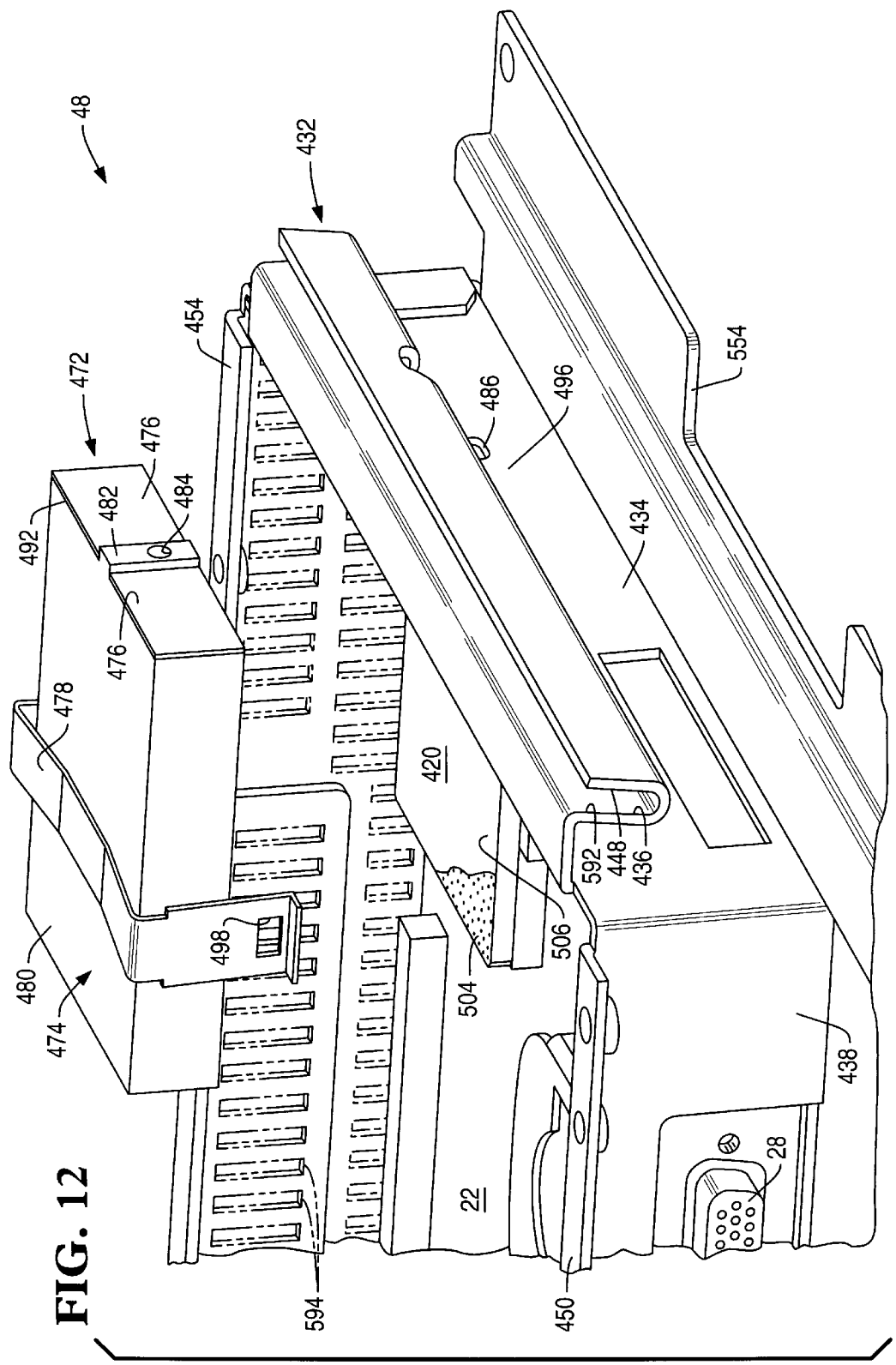
FIG. 12 is an enlarged exploded perspective view of the main board assembly of FIG. 7 with the rear cover removed therefrom for clarity of description, note that only a portion of the top surface of the microprocessor is shown covered with thermally conductive grease for clarity of description.

Heat generated by the microprocessor 420 during operation of the core module assembly 12 is transferred to the sidewall 434 via a heatsink assembly 472. The heatsink assembly 472 includes a heat transfer structure or block 474, a pair of thermally conductive pads 476, and a heat block clamp 478. The heat block 474 is preferably made of a thermally conductive material, such as an aluminum alloy, and includes a body portion 480 and a key portion 482. As shown in FIG. 12, the key portion 482 extends from the body portion 480 and has a fastener aperture 484 defined therein.

The key portion 482 of the heat block 474 cooperates with the sidewall 434 in order to limit relative movement therebetween. In particular, the sidewall 434 has a keying slot 486 defined therein. The key portion 482 is positionable within the keying slot 486 so as to limit relative movement between the heat block 474 and the sidewall 434. Moreover, a fastener such as a bolt 488 may be advanced through the keying slot 486 and thereafter threadingly engaged with the fastener aperture 484 defined in the key portion 484 of the heat block 474 (see FIG. 14). Rotation of the bolt 488 in the general direction of arrow 490 of FIG. 14 causes the heat block 474 to be pulled or otherwise advanced toward the sidewall 434.

As shown in FIGS. 12 and 13, the thermally conductive pads 476 are interposed between the heat block 474 and the sidewall 434. Moreover, each of the thermally conductive pads 476 has an adhesive disposed on one side thereof so as to facilitate securing thereof to an end portion 492 of the heat block 474. Rotation of the bolt 488 in the general direction of arrow 490 of FIG. 14 causes the thermally conductive pads 476 to be compressed between the end portion 492 of the heat block 474 and the sidewall 434. In particular, the thermally conductive pads 476 are made from an elastomeric material which is compressed between the end portion 492 of the heat block 474 and the sidewall 434 during rotation of the bolt 488. One type of elastomeric, thermally conductive pad which is suitable for use as the thermally conductive pads 476 of the present invention is a T-pli 220-A1 Thermally Conductive Interface Pad which is commercially available from Thermagon, Incorporated of Cleveland, Ohio.

During rotation of the bolt 488, the thermally conductive pads 476 are compressed to a predetermined limit in order to create an efficient thermal path between the heat block 474 and the sidewall 434 despite any variation in dimensional tolerances associated with the components of the main board assembly 48. In particular, during rotation of the bolt 488, the heat block 474 will continue to be advanced toward the sidewall 434 and until a head portion 494 of the bolt 488 contacts both the key portion 482 and an outer surface 496 of the sidewall 434. It should be appreciated that by compressing the thermally conductive pads 476 in such a manner, an efficient thermal path is created between the heat block 474 and the sidewall 434 despite variation in dimensional tolerances associated with the heat block 474 or the sidewall 434.

As shown in FIGS. 12 and 13, the clamp 478 urges the heat block 474 into contact with the microprocessor 420. In particular, the microprocessor 420 is secured within a mounting socket 502. The clamp 478 has a number of locking slots 498 defined therein which cooperate with a number of locking tabs 500 defined in the mounting socket 502 to urge the heat block 474 toward the socket 502 and hence the microprocessor 420. However, in order to facilitate lateral movement of the heat block 474 during rotation of the bolt 488, the microprocessor 420 has a thermally conductive grease 504 disposed on a top surface 506 thereof (see FIG. 12). The thermally conductive grease 504 allows the heat block 474 to slidably move relative to the top surface 506 of the microprocessor 420 while maintaining an efficient thermal interface therebetween. One type of thermal grease which is suitable for use as the thermal grease 504 of the present invention is Type 120 Thermal Joint Compound which is commercially available from Wakefield Engineering of Wakefield, Mass.

Hence, during operation of the core module assembly 12, heat generated by the microprocessor 420 is dissipated via a thermal path which includes the thermal grease 504, the heat block 474, the thermally conductive pads 476, the sidewall 434, the elongated channel 436, the tongue 444, and the heat dissipating plate 470 of the cover 46. Such a thermal path provides enhanced heat dissipating capabilities relative to heat dissipating assemblies which have heretofore been designed.

The retail terminal 10 may be configured in a number of different configurations in order to perform numerous different retail functions. Performance of certain of such retail functions requires selective tilting of the core module assembly 12. The tilt mechanism 56 enables such tilting of the core module assembly 12 and hence the display monitor 20 relative to the stationary base 58 of the base assembly 18. Hence, during operation of the retail terminal 10, the user (e.g. the retail clerk in the case of an assisted retail function) may move or otherwise alter the position of the core module assembly 12 relative to the stationary base 58 in order to facilitate use of the terminal 10.

As shown in FIGS. 16–20B, the tilt mechanism 56 includes a pair of conical shaped retainers 112, a pair of ratchet members 114, a pair of mounting brackets 116, and a pair of end caps 118. As shall be discussed in more detail below, a number of ratchet teeth 120 defined in the ratchet members 114 engages a number of ratchet teeth 122 defined in a support structure 124 of the tilt mechanism 56 in order to lock or otherwise secure the core module assembly 12 into one of a number of locations relative to the stationary base 58 of the base assembly 18.

The ratchet members 114 are interposed between the mounting brackets 116 and the retainers 112. In particular, each of the ratchet members 114 includes a pair of spring arms 132 having a mounting pin 134 on a first end thereof. A second end of the spring arms 132 is secured to a base portion 136 which has the ratchet teeth 120 defined therein. A first end of each of the mounting pins 134 is received into a respective pin aperture 138 defined in the mounting bracket 116, whereas a second end of each of the mounting pins 134 is received into a respective aperture 140 defined in the retainers 112. When the mounting pins 134 are secured in such a manner, the spring arms 132 are compressed so as to cause the base portion 136 and hence the ratchet teeth 120 to be urged through a notch 142 defined in the retainers 112 in the general direction of arrow 144.

Once assembled in such a manner, a pair of fasteners such as bolts or screws (not shown) are advanced through a pair of apertures 146 defined in the mounting brackets 116 and thereafter threading engaged with a pair of apertures 148 defined in the retainer 112 so as to secure the mounting brackets 116 to the retainers 112. Securing both mounting brackets 116 to both retainers 112, respectively, with a ratchet member 114 therebetween, defines a left mounting subassembly 150 and a right mounting subassembly 152.

Figure 17:
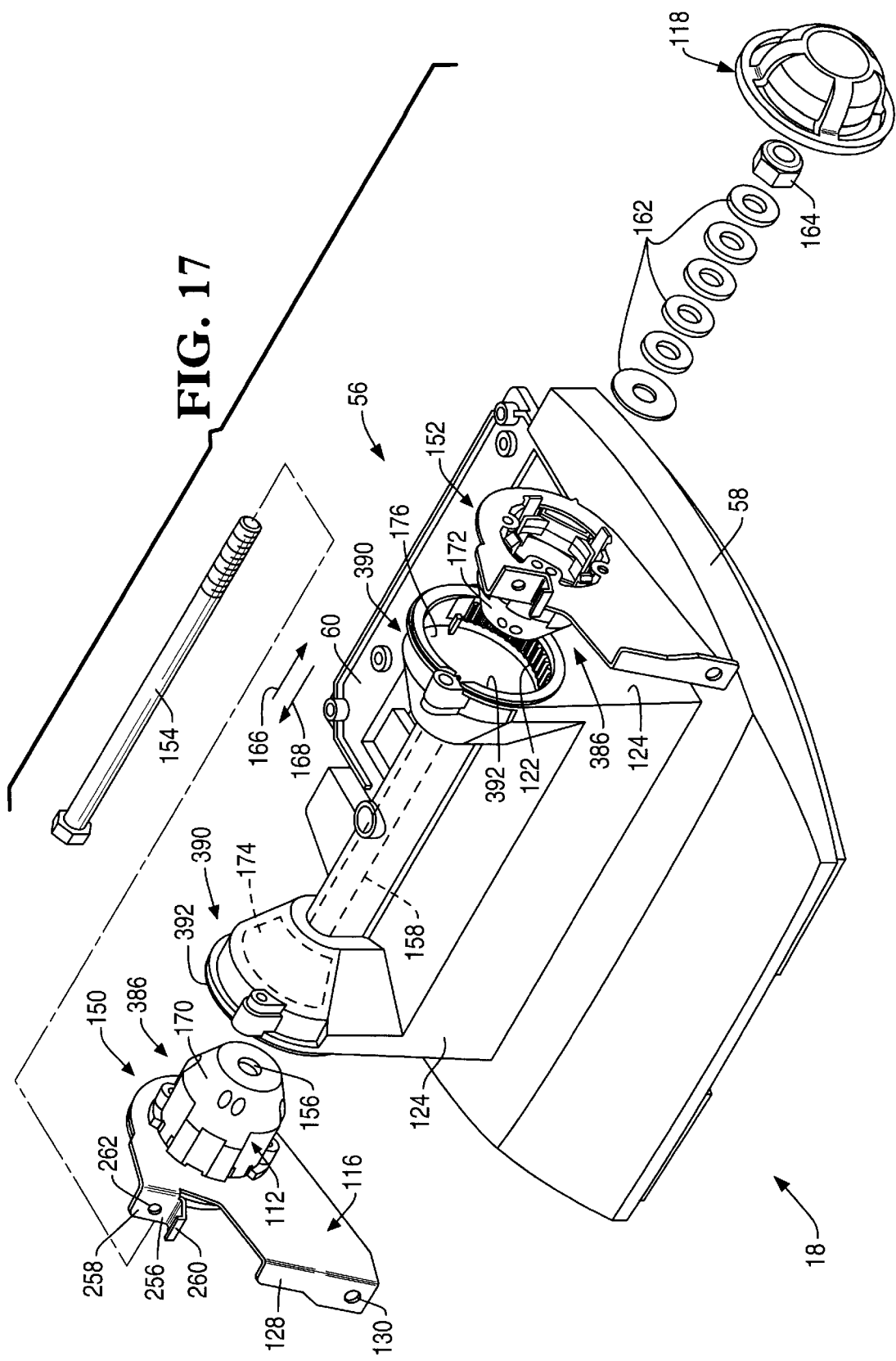
FIG. 17 is an exploded perspective view of the pivoting base assembly of FIG. 16.
Figure 18:
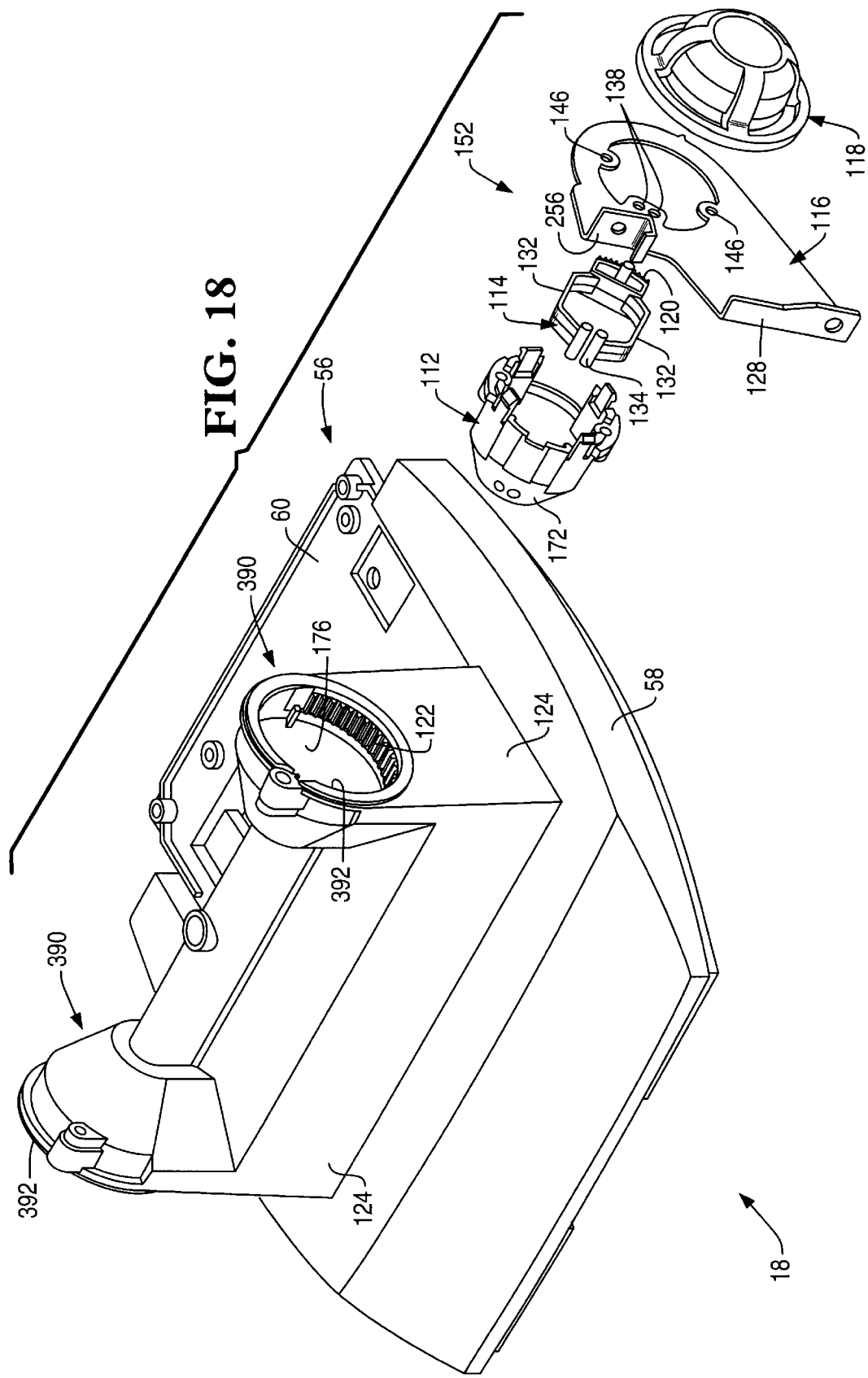
FIG. 18 is a view similar to FIG. 17, but also showing the retainer and the ratchet member of the right mounting subassembly.

As shown in FIG. 17, the structural support 124 is secured to the stationary base 58 and has a central passage 158 extending therethrough. A fastener such as a bolt 154 may be advanced through the central passage 158 in order to secure the left mounting subassembly 150 to the right mounting subassembly 152. In particular, the bolt 154 is first advanced through an aperture 156 defined in the retainer 112 of the left mounting subassembly 150, and thereafter advanced through the central passage 158. Once through the central passage 158, the bolt 154 is advanced through an aperture 160 (see FIG. 20A) defined in the retainer 112 of the right mounting assembly 152 and thereafter a number of washers 162. A nut 164 threadingly engages the bolt 154. It should be appreciated that as the nut 164 is tightened, the left mounting subassembly 150 is urged in the general direction of arrow 166 of FIG. 17, whereas the right mounting subassembly 152 is urged in the general direction of arrow 168 of FIG. 17.

Movement of the mounting subassemblies 150, 152 in the manner described above causes the respective retainers 112 thereof to be positioned so as to facilitate movement of the mounting subassemblies 150, 152 relative to the support structure 124. More specifically, each of the retainers 112 of the tilt mechanism 56 define a pivot structure 386. The retainer 112 of the left subassembly 150 has an outer bearing surface 170 defined therein, whereas the retainer 112 of the right subassembly 152 has an outer bearing surface 172 defined therein. The pivot structures 386 cooperate with a respective pivot structure 390 defined in the support structure 124. In particular, the support structure 124 has a pair of receptacles 392 defined therein. The receptacles 392 have a pair of inner bearing surfaces 174, 176, respectively, defined therein, as shown in FIG. 17. The outer bearing surfaces 170, 172 defined in the retainers 112 bear upon the inner bearing surfaces 174, 176, respectively, defined in the support structure 124 to facilitate movement of the retainers 112 and hence the mounting subassemblies 150, 152 relative to the support structure 124 and hence the stationary base 58. It should be appreciated that the nut 164 may be tightened a predetermined amount so as to create a predetermined amount of friction between the bearing surfaces 170, 172 of the retainers 112 and the bearing surfaces 174, 176, respectively, of the support structure 124.

Once the mounting subassemblies 150, 152 are secured to the support structure 124 in the manner previously described, the core module assembly 12 may be secured to the base assembly 18 by use of the mounting brackets 116. In particular, the rear enclosure 44 of the core module assembly 12 has a pair of threaded apertures 126 (see FIG. 4) defined therein, whereas the rear cover 46 has a pair of apertures 248 defined therein which align with a pair of apertures 250 defined in the fastening surface 450 of the thermally conductive housing 430 (see FIG. 4) when the rear cover 46 is attached thereto. Each of the mounting brackets 116 has a pair of flanges 128, 256 defined therein. The flange 256 includes a relatively flat portion 258 and a hook portion 260. An elongated slot 130 is defined in each of the flanges 128, whereas an aperture 262 is defined in the flat portion 258 of each of the flanges 256. In order to secure the core module assembly 12 to the brackets 116, the core module assembly 12 is positioned relative to the brackets 116 such that a lip portion 252 of the sidewall 438 rests on the hook portions 260 of the flanges 256 defined in the brackets 116. Thereafter, a first pair of fasteners such as bolts (not shown) are advanced through the elongated slots 130 and thereafter threadingly engaged with the threaded apertures 126. Moreover, a second pair of fasteners such as bolts (not shown) are then advanced through the apertures 262 and thereafter threadingly engaged with the apertures 248, 250 defined in the rear cover 46 and the fastening surface 450, respectively, in order to secure the core module assembly 12 to the mounting brackets 116 and hence the base assembly 18. Hence, as described above, it should be appreciated that the mounting brackets 116 collectively define a mounting structure for mounting the core module assembly 12 to the pivoting base assembly 18.

The core module assembly 12 may be positioned and retained in any one of a number of positions by use of the ratchet members 114. In particular, as discussed above, the nut 164 may be tightened a predetermined amount in order to create a predetermined amount of friction between the bearing surfaces 170, 172 of the retainers 112 and the bearing surfaces 174, 176, respectively, of the support structure 124. However, the weight of the core module assembly 12 is greater in magnitude than the friction created by the interaction between the bearing surfaces 170, 172 and 174, 176, respectively, thereby causing the core module assembly 12 to pivot or otherwise move relative to the support structure 124. However, the compression of the spring arms 132 of the ratchet members 114 during assembly the mounting subassemblies 150, 152 causes the base portion 136 and hence the ratchet teeth 120 to be urged in the general direction of arrow 144 of FIG. 19. When urged in such a manner, the ratchet teeth 120 engage the ratchet teeth 122 defined in the support structure 124.

It should be appreciated that the retaining force generated by (1) the force created by the compressed spring arms 132 of the ratchet members 114, and (2) the force associated with the friction created by the interaction between the bearing surfaces 170, 172 and 174, 176, respectively, is greater in magnitude than the weight of the core module assembly 12 thereby preventing the core module assembly 12 from pivoting or otherwise moving relative to the support structure 124 and hence the base assembly 18. However, if a user or the like desires to reposition the core module assembly 12, the user may push, pull, or otherwise urge the core module assembly 12 in the general direction of either arrow 180 or arrow 182 of FIG. 1. The force created by the user when urging the core module assembly 12 in such a manner is greater in magnitude than the retaining force created by the compressed spring arms 132 and the friction between the bearing surfaces 170, 172 and 174, 176, respectively, thereby urging the base portion 136 and hence the ratchet teeth 120 in the general direction of arrow 184 of FIG. 19. When the base portion 136 is urged in such a manner, the ratchet teeth 120 are disengaged from the ratchet teeth 122 thereby allowing the retainers 112 and hence the core module assembly 12 to be pivoted or otherwise moved relative to the base assembly 18. Once the user is no longer urging the core module assembly 12, the ratchet teeth 120 reengage the ratchet teeth 122 thereby locking the core module assembly 12 in its current position.

Figure 19:
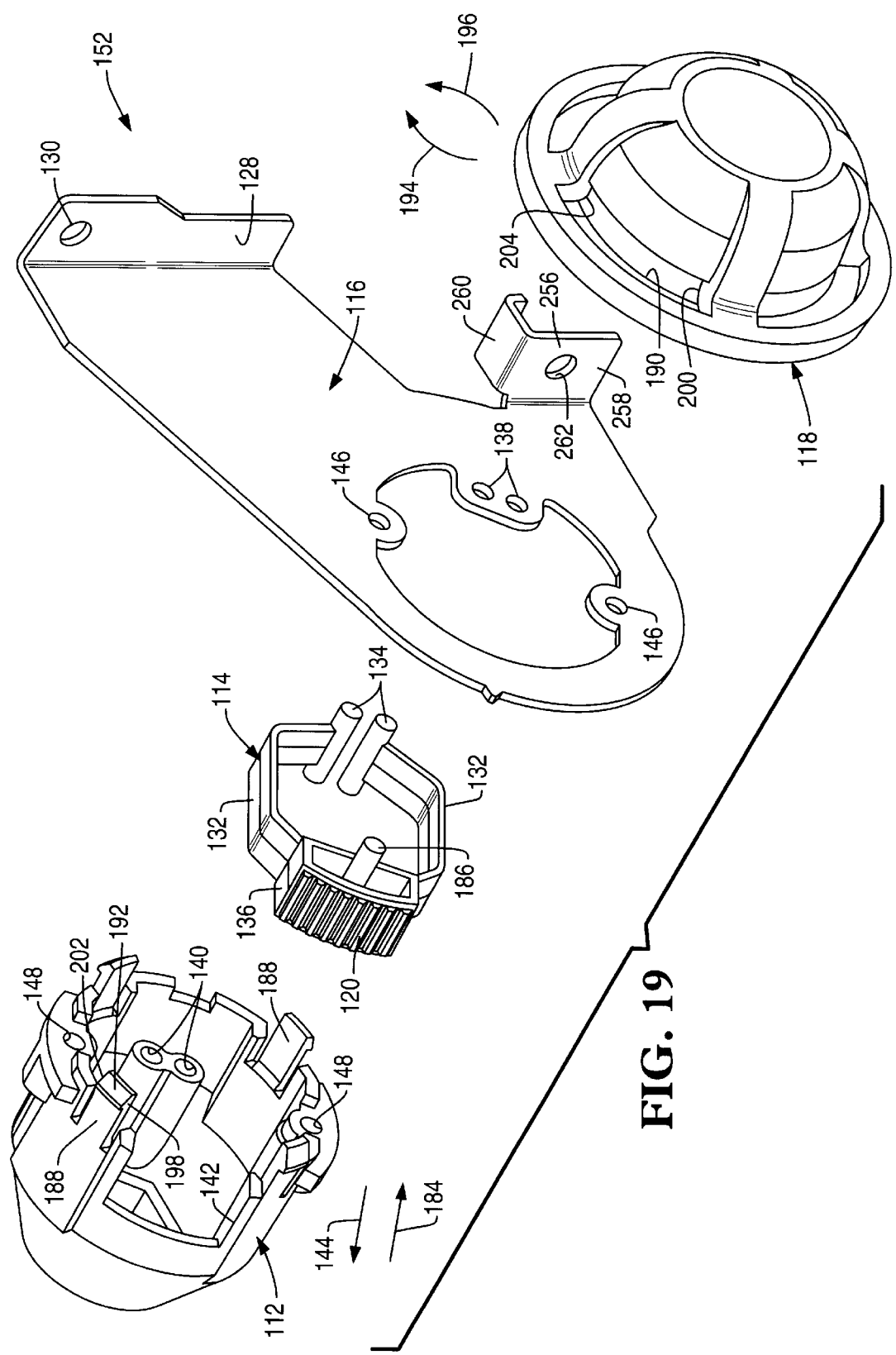
FIG. 19 is an enlarged exploded perspective view of the right mounting assembly of FIG. 18.
Figure 20A:
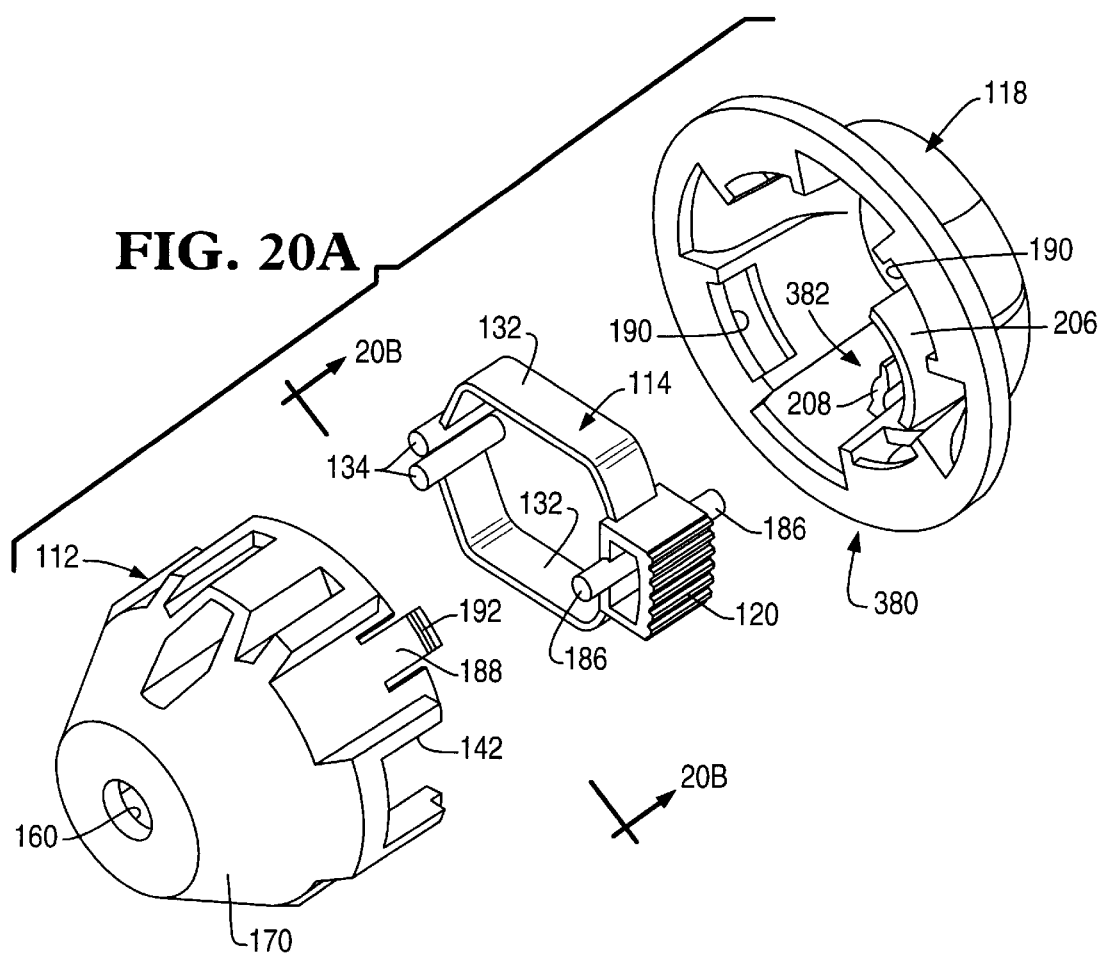
FIG. 20A is view similar to FIG. 19, but showing the retainer, the ratchet member, and the end cap in greater detail.

As shown in FIGS. 19–20A, each of the retainers 112 has a pair of locking tabs 188 defined therein, whereas each of the end caps 118 has a pair of elongated slots 190 defined therein. A barb 192 defined in each of the locking tabs 188 is received into the elongated slots 190. It should be appreciated that the locking tabs 188 are spring biased radially outward from the center of the retainers 112 thereby biasing the barbs 192 radially outwardly so as to movably secure the barbs 192 within the elongated slots 190. Hence, the end caps 118 are movably secured to the retainers 112. In particular, the end caps 118 may be rotated in the general direction of arrows 194 and 196 of FIG. 19 across a path of travel defined by the elongated slots 190. In particular, the end cap 118 of the right mounting subassembly 152 may be rotated in the general direction of arrow 194 of FIG. 19 to a point in which an edge 198 of the locking tab 188 contacts a sidewall 200 of the elongated slot 190. Conversely, the end cap 118 of the right mounting subassembly 152 may be rotated in the general direction of arrow 196 of FIG. 19 to a point in which an edge 202 of the locking tab 188 contacts a sidewall 204 of the elongated slot 190. It should be appreciated that the end cap 118 of the left mounting subassembly 150 may be rotated in a similar manner.

Figure 20B:
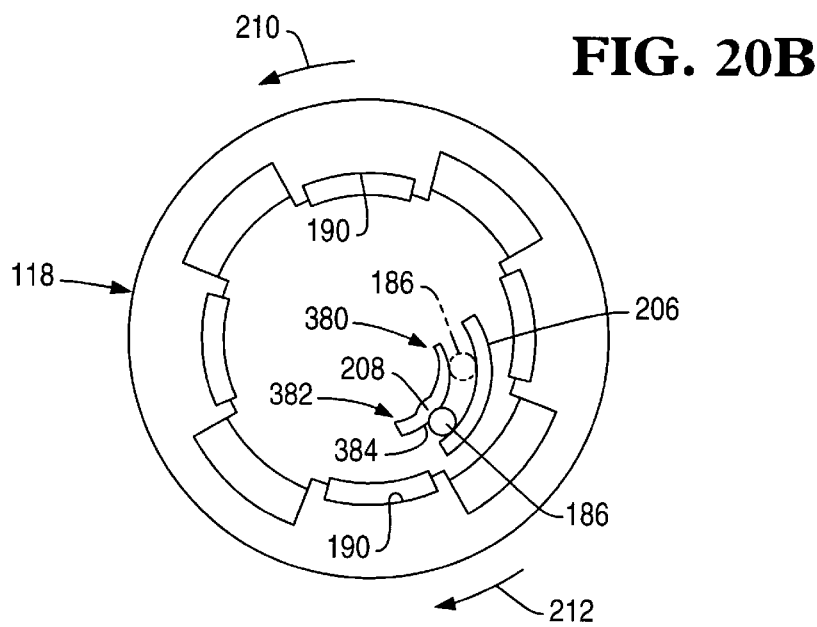
FIG. 20B is an elevational view as viewed in the direction of arrows 20B of FIG. 20A which shows the relationship between the end cap and the ratchet member of the right mounting assembly.

Such rotation of the end caps 118 selectively locks (or unlocks) the core module assembly 12 at a desired angle relative to the base assembly 18. In particular, the tilt mechanism 56 further includes a position locking mechanism 380 which is provided to selectively lock (or unlock) the core module assembly 12 and hence the display monitor 20 at a desired angle relative to the stationary base 58 of the base assembly 18. The position locking mechanism 380 includes a retaining structure 382 defined in each of the end caps 118. As shown in FIGS. 20A and 20B, the retaining structure 382 includes an outer guide member 206 and an inner guide member 208. Moreover, each of the ratchet members 114 has a locking pin 186 defined therein. Rotation of the end caps 118 selectively moves the retaining structure 382 between a lock position and a release position. In particular, rotation of the end cap 118 in the general direction of arrow 210 of FIG. 20B (i.e. in the general direction of arrow 194 of FIG. 19), places the retaining structure 382 in the lock position in which the locking pin 186 is retained or otherwise captured in a locking slot 384 defined by the outer guide member 206 and the inner guide member 208 (as shown in a solid line in FIG. 20B). It should be appreciated that when the locking pin 186 is retained in such a manner, the ratchet teeth 120 are firmly engaged with the ratchet teeth 122 thereby preventing movement of the mounting brackets 116 and hence the core module assembly 12 relative to the stationary base 58 of the base assembly 18. Conversely, rotation of the end cap 118 in the general direction of arrow 212 of FIG. 20B (i.e. in the general direction of arrow 196 of FIG. 19), places the retaining structure 382 in the release position in which the locking pin 186 is camed or otherwise urged radially inwardly toward the center of the end caps 118 thereby spacing the locking pin 186 apart from the locking slot 384 (as shown in phantom lines in FIG. 20B). It should be appreciated that such inward urging of the locking pin 186 causes the base portion 136 of the ratchet members 114 to likewise be urged inwardly toward the center of the end caps 118 thereby causing the ratchet teeth 120 to be disengaged from or otherwise spaced apart from the ratchet teeth 122. Disengagement of the ratchet teeth 120 from the ratchet teeth 122 facilitates movement of the mounting brackets 116 and hence the core module assembly 12 relative to the stationary base 58 of the base assembly 18.

Referring now to FIGS. 21–24, there is shown a right mounting subassembly 518 which is a second embodiment of the mounting subassemblies of the present invention. The right mounting subassembly 518 is somewhat similar to right mounting subassembly 152. Thus, the same reference numerals are used in FIGS. 21–24 to designate common components which were previously discussed in regard to FIGS. 1–20B. In addition, although only the right mounting subassembly 518 is shown in FIGS. 21–24 and herein described, it should be appreciated that a similar mounting subassembly is also used on the left side of the pivoting base assembly 18.

Figure 21:
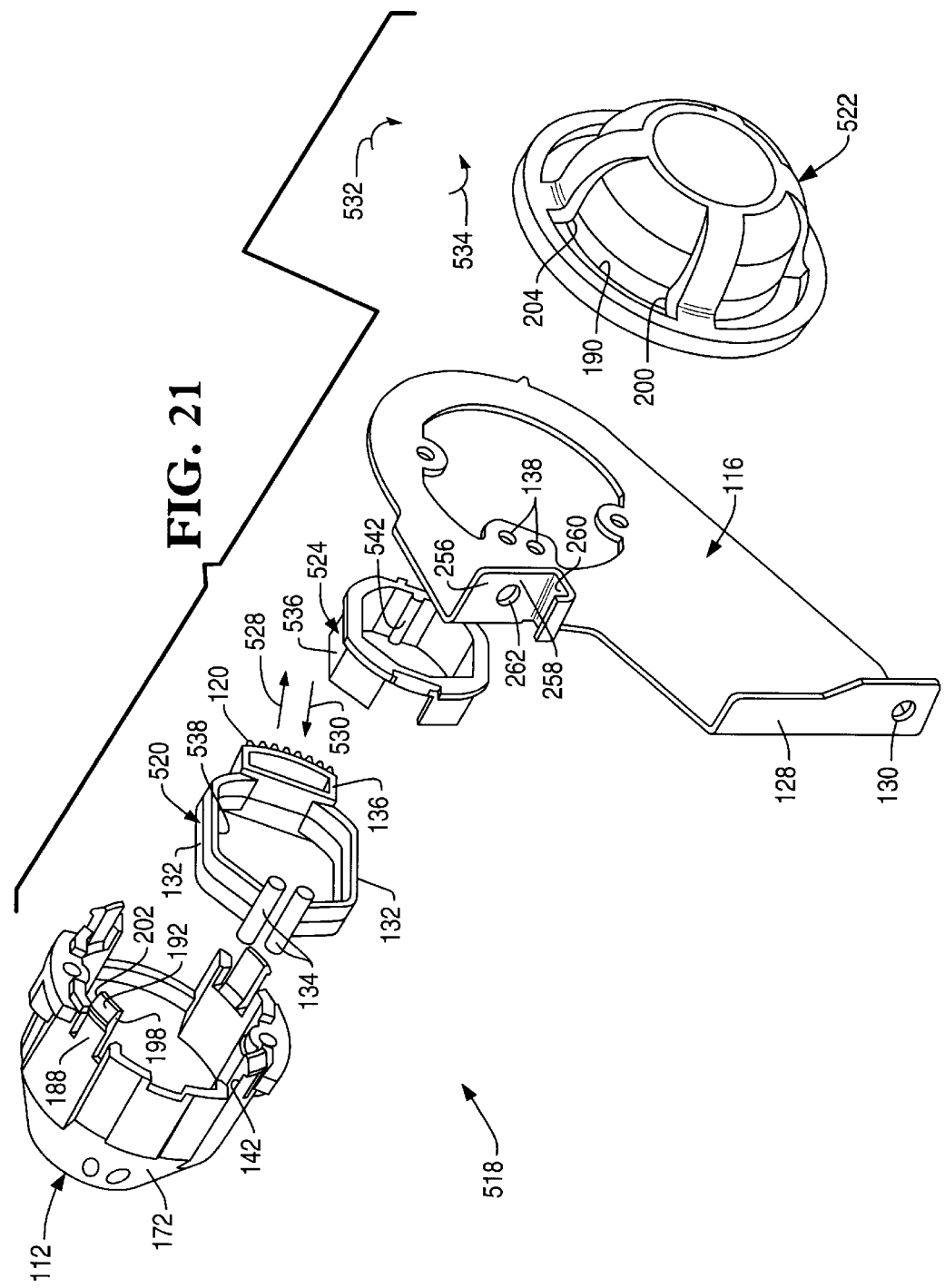
FIG. 21 is a view similar to FIG. 19, but showing a second embodiment of the right mounting subassembly.
Figure 22B:
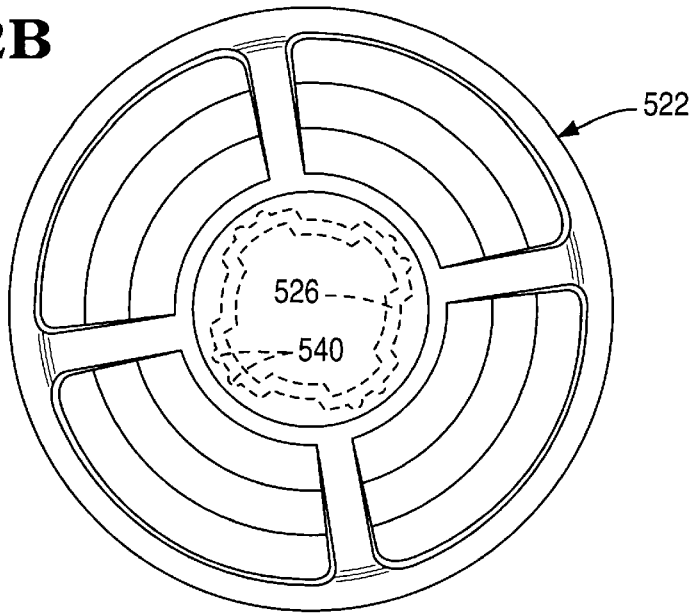
FIG. 22B is an elevational view of the end cap of the right mounting subassembly of FIG. 22A, as viewed in the direction of the arrows 22B of FIG. 22A.

In lieu of the ratchet member 114 and the end cap 118, the right mounting subassembly 518 includes a ratchet member 520 and an end cap 522. Moreover, the right mounting subassembly 518 includes a locking member 524. The ratchet members 520 are essentially the same as the ratchet members 114, except that the ratchet members 520 do not have the locking pin 186 defined therein. Moreover, the end caps 522 are essentially the same as the end caps 118, except that the end caps 522 have a locking hub 526 (see FIGS. 22A and 22B) defined therein in lieu of having the outer guide member 206 and the inner guide member 208 of the retaining structure 382 defined therein. As shown in FIGS. 21 and 22A, the locking member 524 is positioned such that an outer surface 536 thereof contacts the an inner surface 538 of each of the spring arms 132 of the ratchet member 520.

As with the right mounting subassembly 152, the core module assembly 12 may be positioned and retained in any one of a number of positions by use of the ratchet members 520. In particular, as discussed above, the nut 164 may be tightened a predetermined amount so as to create a predetermined amount of friction between the bearing surfaces 170, 172 of the retainers 112 and the bearing surfaces 174, 176, respectively, of the support structure 124. However, the weight of the core module assembly 12 is greater in magnitude than the friction created by the interaction between the bearing surfaces 170, 172 and 174, 176, respectively, thereby causing the core module assembly 12 to pivot or otherwise move relative to the support structure 124. However, compression of the spring arms 132 of the ratchet members 520 during assembly the mounting subassembly 518 causes the base portion 136 and hence the ratchet teeth 120 of the ratchet member 520 to be urged in the general direction of arrow 528 of FIG. 21. When urged in such a manner, the ratchet teeth 120 engage the ratchet teeth 122 defined in the support structure 124.

It should be appreciated that the retaining force generated by (1) the force created by the compressed spring arms 132 of the ratchet members 520, and (2) the force associated with the friction created by the interaction between the bearing surfaces 170, 172 and 174, 176, respectively, is greater in magnitude than the weight of the core module assembly 12 thereby preventing the core module assembly 12 from pivoting or otherwise moving relative to the support structure 124 and hence the stationary base 58 of the base assembly 18. However, if a user or the like desires to reposition the core module assembly 12, the user may push, pull, or otherwise urge the core module assembly 12 in the general direction of either arrow 180 or arrow 182 of FIG. 1. The force created by the user when urging the core module assembly 12 in such a manner is greater in magnitude than the retaining force created by the compressed spring arms 132 and the friction between the bearing surfaces 170, 172 and 174, 176, respectively, thereby urging the base portion 136 and hence the ratchet teeth 120 in the general direction of arrow 530 of FIG. 21. When the base portion 136 is urged in such a manner, the ratchet teeth 120 are disengaged from the ratchet teeth 122 thereby allowing the retainers 112 and hence the core module assembly 12 to be pivoted or otherwise moved relative to the stationary base 58 of the base assembly 18. Once the user is no longer urging the core module assembly 12, the ratchet teeth 120 reengage the ratchet teeth 122 thereby locking the core module assembly 12 in its current position.

As with the end caps 118, the end caps 522 have a pair of elongated slots 190 defined therein. The barb 192 defined in each of the locking tabs 188 of the retainers 112 is received into the elongated slots 190. It should be appreciated that the locking tabs 188 are spring biased radially outward from the center of the retainers 112 thereby biasing the barbs 192 radially outwardly so as to movably secure the barbs 192 within the elongated slots 190 of the end caps 522. Hence, the end caps 522 are movably secured to the retainers 112. In particular, the end caps 522 may be rotated in the general direction of arrows 532 and 534 of FIG. 21 across a path of travel defined by the elongated slots 190. In particular, the end cap 522 of the right mounting subassembly 518 may be rotated in the general direction of arrow 532 of FIG. 21 to a point in which an edge 198 of the locking tab 188 contacts a sidewall 200 of the elongated slot 190. Conversely, the end cap 522 of the right mounting subassembly 518 may be rotated in the general direction of arrow 534 of FIG. 21 to a point in which an edge 202 of the locking tab 188 contacts a sidewall 204 of the elongated slot 190. It should be appreciated that the end cap of the left mounting subassembly (not shown) may be rotated in a similar manner.

Such rotation of the end caps 522 selectively locks (or unlocks) the core module assembly 12 at a desired angle relative to the base assembly 18. In particular, the locking hub 526 cooperates with the locking member 524 to selectively lock (or unlock) the core module assembly 12 and hence the display monitor 20 at a desired angle relative to the stationary base 58 of the base assembly 18. In particular, the locking hub 526 has a number of protrusions 540 defined therein (see FIG. 22B). The locking member 524 has a protrusion 542 defined therein (see FIG. 21). Rotation of the end caps 522 selectively moves the locking member 524 between a lock position and a release position. In particular, rotation of the end cap 522 in the general direction of arrow 544 of FIGS. 23 and 24 (i.e. in the general direction of arrow 532 of FIG. 21) or arrow 546 of FIGS. 23 and 24 (i.e. in the general direction of arrow 534 of FIG. 21), selectively places the locking member 524 in the lock position in which the protrusion 542 is retained or otherwise captured between the protrusions 540 of the locking hub 526 (as shown in FIG.

Figure 23:
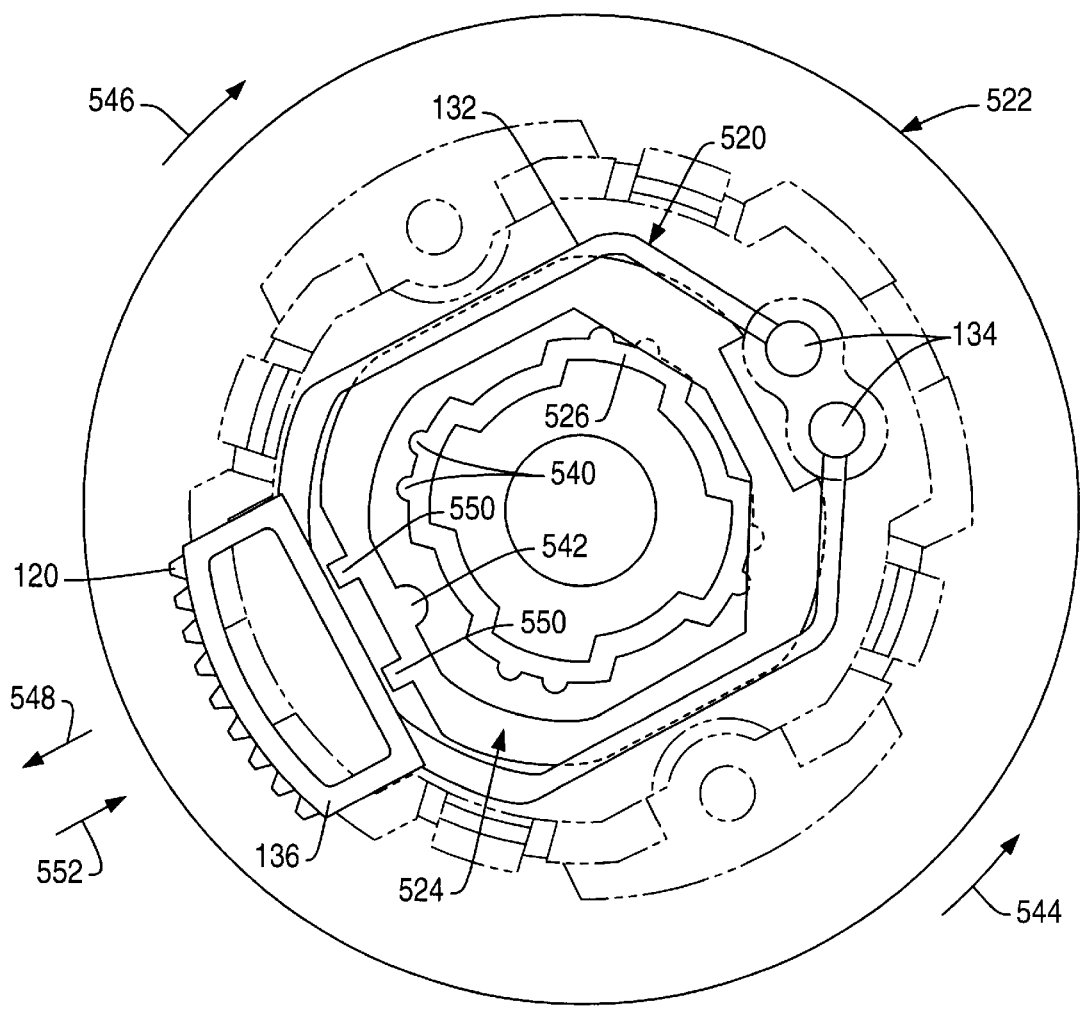
FIG. 23 is an enlarged elevational view of the right mounting subassembly of FIG. 21 (with the mounting bracket having been removed for clarity of description), as viewed in the direction of the arrows 23 of FIG. 22A, note that the locking member is shown in phantom lines for clarity of description.
Figure 24:
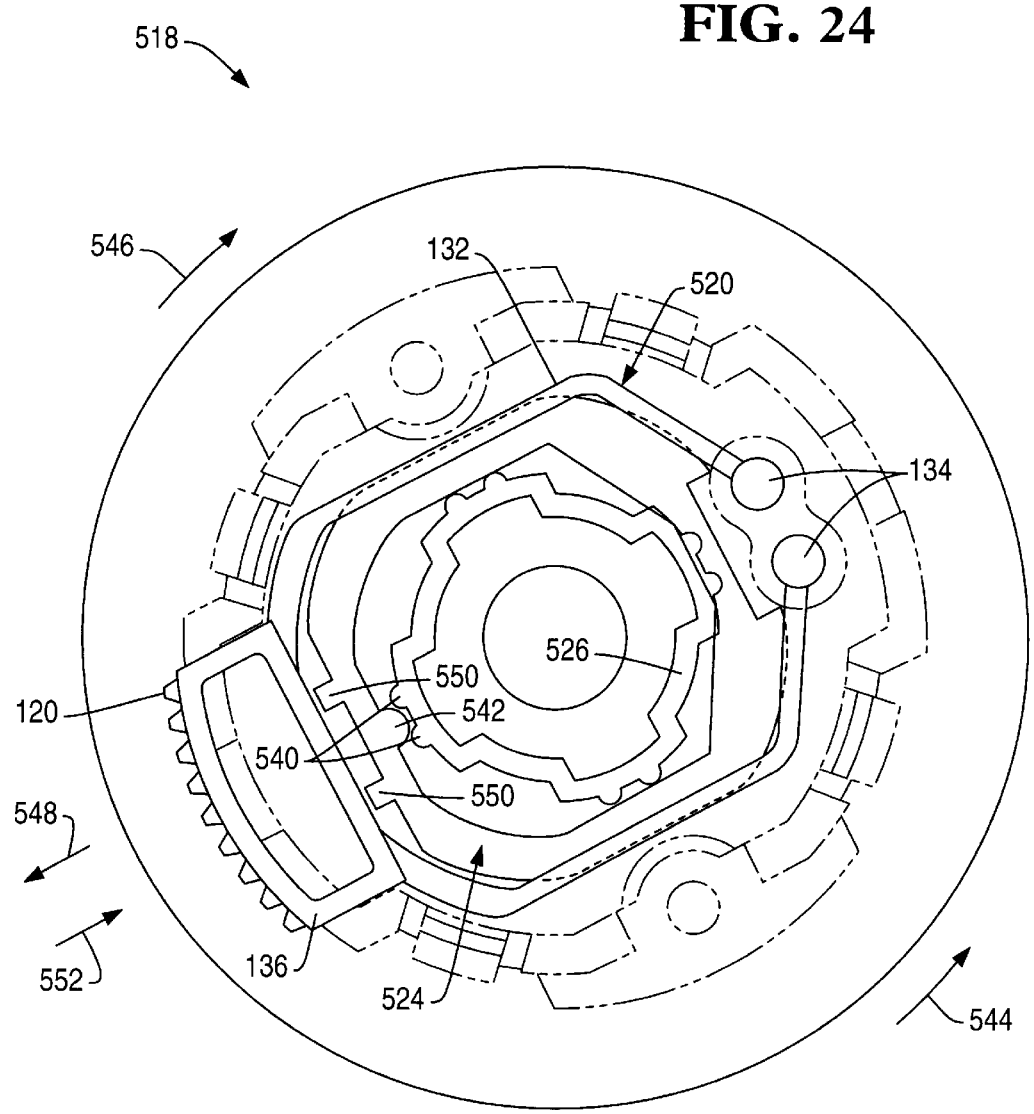
FIG. 24 is view similar to FIG. 23, but showing the locking member in the locked position.
Figure 25:
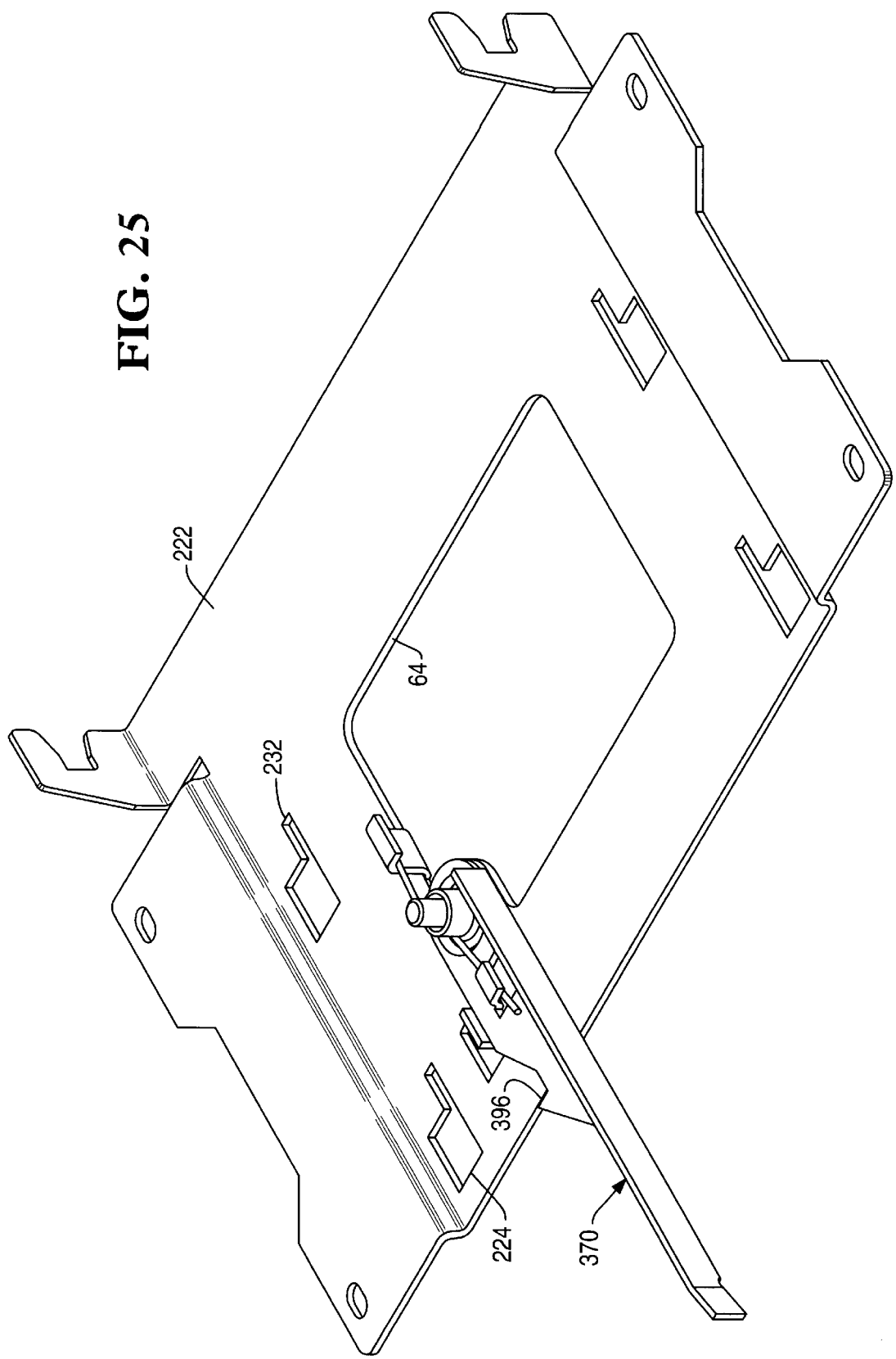
FIG. 25 is an enlarged perspective view of the base mounting plate of the pivoting base assembly of FIG. 16 which shows the locking lever pivotally secured thereto.

24). It should be appreciated that when the protrusion 542 is retained in such a manner, the locking member 524 is biased or otherwise urged in the general direction of arrow 548 of FIGS. 23 and 24 thereby causing a pair of contact members 550 defined therein to contact the base portion 136 of the ratchet member 520. Such contact of the base portion 136 causes the ratchet teeth 120 to be firmly engaged with the ratchet teeth 122 of the support structure 124 thereby preventing movement of the mounting brackets 116 and hence the core module assembly 12 relative to the stationary base 58 of the base assembly 18. Conversely, rotation of the end cap 522 in the general direction of either arrow 544 or arrow 546 of FIGS. 23 and 24, selectively places the locking member 524 in the release position in which the protrusion 542 is spaced apart or otherwise released from the area between the protrusions 540 of the locking hub 526 (as shown in FIG. 23). It should be appreciated that when the protrusion 542 is released in such a manner, the locking member 524 is free to move in the general direction of arrow 552 of FIGS. 23 and 24 thereby allowing the ratchet teeth 120 to be disengaged from or otherwise spaced apart from the ratchet teeth 122. Disengagement of the ratchet teeth 120 from the ratchet teeth 122 facilitates movement of the mounting brackets 116 and hence the core module assembly 12 relative to the stationary base 58 of the base assembly 18.

Referring now to FIGS. 1–2 and 25–39, there is shown various configurations of the retail terminal 10. The pivoting base assembly 18 may be used to pivotally secure the core module assembly 12 to either a substantially horizontal mounting surface such as a tabletop 214 (see FIG. 1) or a substantially vertical mounting surface such as a wall 216 (see FIG. 26). In particular, the retail terminal 10 may be secured to the tabletop 214 with a mounting plate 218. The mounting plate 218 has a number of mounting tabs 220, whereas a base mounting structure or plate 222 of the base assembly 18 has a number of mounting slots 224 defined therein. Moreover, the mounting plate 218 further has a number of fastening apertures 226 defined therein. The fastening apertures 226 are provided to facilitate securing the mounting plate 218 to the tabletop 214. In particular, a fastener such as a bolt or screw 408 is advanced through each of the fastening apertures 226 and thereafter threadingly engaged in a corresponding fastening aperture 402 defined in the tabletop 214 so as to secure the mounting plate 218 to the tabletop 214.

Thereafter, the mounting tabs 220 cooperate with the mounting slots 224 in order to secure the base plate 222 of the base assembly 18 to the mounting plate 218. In particular, the base assembly 18 (with the core module assembly 12 secured thereto) is advanced in the general direction of arrow 228 of FIG. 2 toward the mounting plate 218 (which is bolted to the tabletop 214) such that the mounting tabs 220 are aligned with the mounting slots 224. Thereafter, the base assembly 18 is further advanced in the general direction of arrow 228 such that the mounting tabs 220 are received into the mounting slots 224. Once the mounting tabs 220 are received into the mounting slots 224, the base assembly 18 is urged or otherwise slid in the general direction of arrow 230 such that the mounting tabs 220 are advanced into a locking portion 232 of the mounting slots 224 so as to lock the mounting tabs 220 therein.

Figure 2:
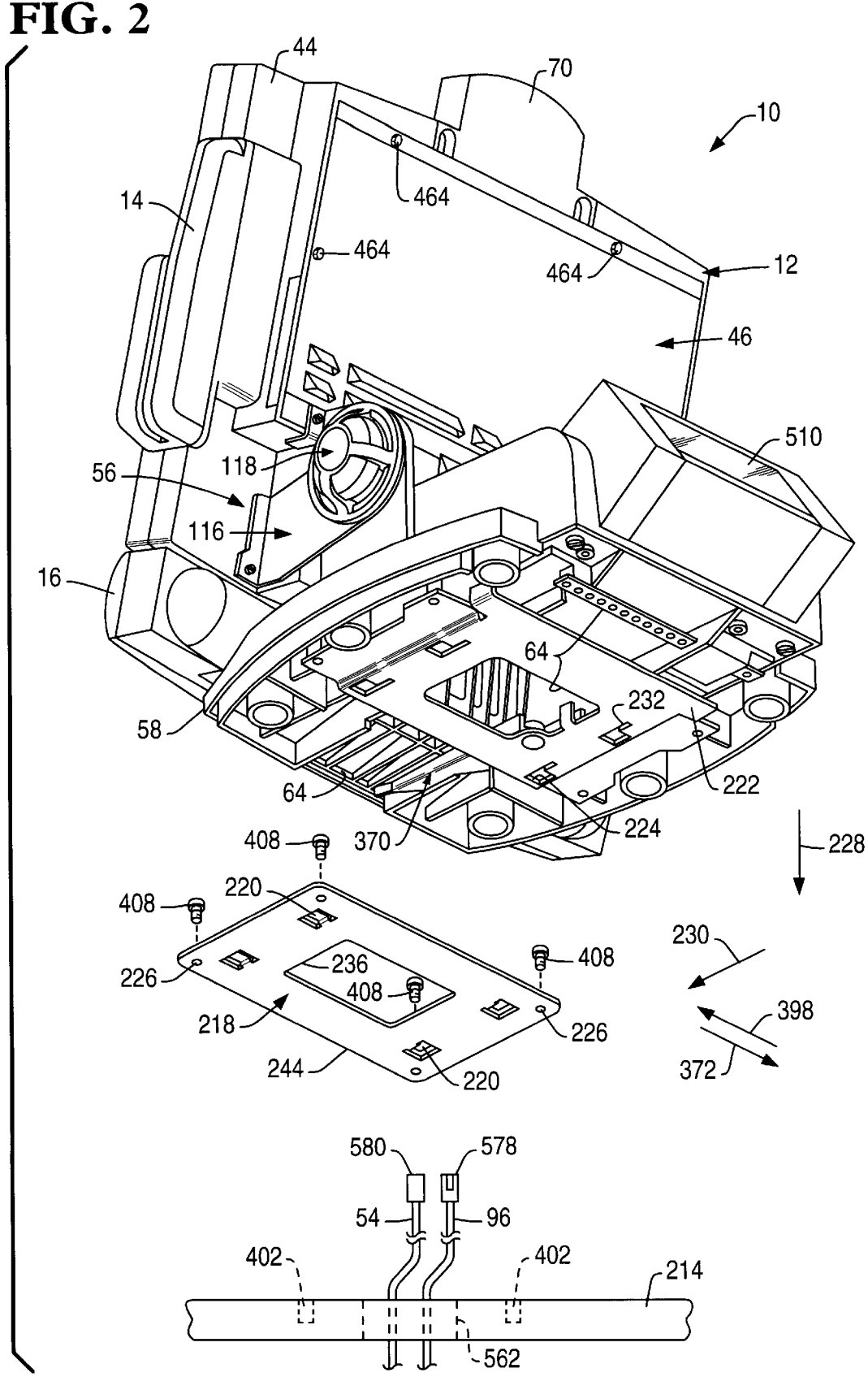
FIG. 2 is a rear perspective view which shows the retail terminal of FIG. 1 and the mounting bracket which is used to secure the retail terminal to the tabletop.
Figure 27:
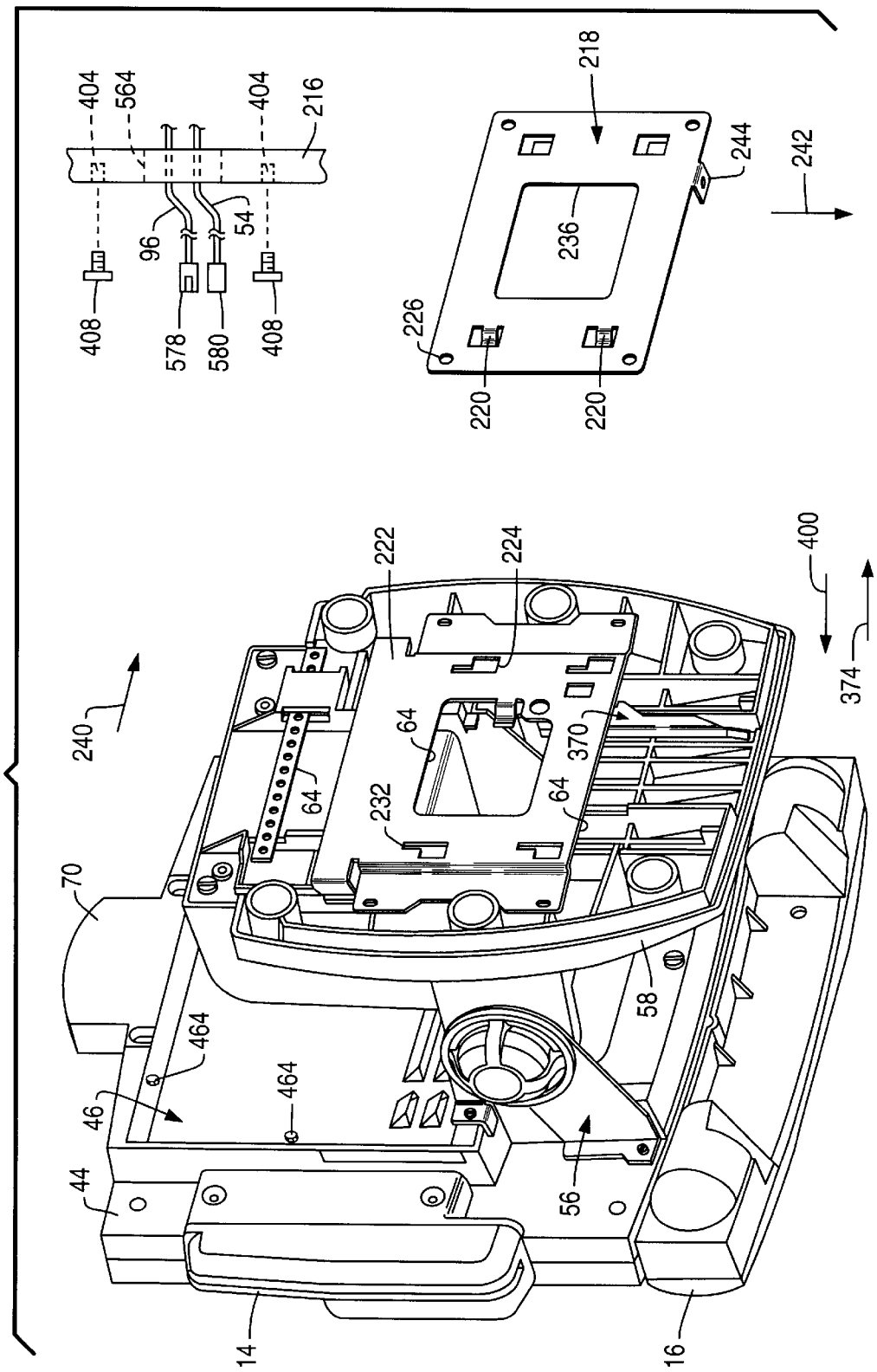
FIG. 27 is a rear perspective view of the retail terminal of FIG. 26 which shows the relationship between the pivoting base assembly of the retail terminal and the mounting bracket which is used to secure the retail terminal to the wall.

The mounting plate 218 further has a locking flange 244 defined therein (see FIG. 27). Moreover, the base assembly 18 has a spring biased locking lever 370 pivotally secured to the base plate 222 (see FIG. 25). The locking lever 370 prevents the base assembly 18 from inadvertently moving relative to the mounting plate 218. In particular, the locking lever 370 is spring biased in the general direction of arrow 372 of FIG. 2 into a locked position as shown in FIG. 2. The locking lever 370 has a locking notch 396 defined therein (see FIG. 25). When the locking lever 370 is positioned in its locked position, the locking flange 244 is captured or otherwise retained in the locking notch 396 so as to prevent the base assembly 18 from inadvertently being slid or otherwise moved in a manner that would allow the mounting tabs 220 to be inadvertently removed from the mounting slots 224. Conversely, when the locking lever 370 is moved by a user or the like in the general direction of arrow 398 of FIG. 2, the locking lever 370 assumes an unlocked position thereby allowing the locking flange 244 to be spaced apart or otherwise removed from the locking notch 396.

Moreover, the mounting plate 218 further has a cable access opening 236 defined therein. Numerous electrical cables associated with the retail terminal 10 (e.g. the source power cable 54 or the LAN cable 96) may be advanced through an opening 562 defined in the tabletop 214, and thereafter the cable access opening 236. Once received through the cable access opening 236 defined in the mounting plate 218, the electrical cables may be advanced through one of the cable access openings 64 associated with the base assembly 18 and thereafter coupled to one of the electrical connectors 24, 26, 28, 30, 32, 34, 36, 38, 412, 414 (see FIG. 4) associated with the core module assembly 12. For example, the LAN cable 96 includes a data connector 578 (see FIG. 2). The LAN cable 96 may be advanced through the opening 562 defined in the tabletop 214, the cable access opening 236 defined in the mounting plate 218, and one of the cable access openings 64 defined in the base assembly 18. Once received through the cable access opening 64, the data connector 578 is connected to the LAN connector 24 thereby electrically coupling the core module assembly 12 to the LAN 94. Moreover, the source power cable 54 includes a power connector 580 (see FIG. 2). The source power cable 54 may be advanced through the opening 562 defined in the tabletop 214, the cable access opening 236 defined in the mounting plate 218, and one of the cable access openings 64 defined in the base assembly 18. Once received through the cable access opening 64, the power connector 580 is connected to a power input connector 568 of the power supply 50 (see FIG. 3) thereby electrically coupling the power supply 50 to the 110 VAC power source 512. Thereafter, the intermediate power cable 52 is connected to both the power connector 26 of the core module assembly 12 and a power output connector 572 of the power supply 50 (see FIG. 3) thereby electrically coupling the core module assembly 12 to the power supply 50.

It should be appreciated that such a configuration enhances the cable management associated with the retail terminal 10 when the terminal 10 is secured to the tabletop 214. In particular, the stationary base 58, the shroud 62, the mounting brackets 116, and the core module assembly 12 collectively define a protective housing of the retail terminal 10 when the core module assembly 12 is secured to the pivoting base assembly 18. The segment of the data cable (e.g. the LAN cable 96) and the segment of the power cable (e.g. the source power cable 54) which extend out of the opening 562 in the tabletop 214 and the cable access opening 236 of the mounting plate 218 are "completely contained" within the protective housing of the base assembly 18. What is meant herein by the terms "completely contained" or "completely contains" is that no portion of the electrical cables (e.g. the LAN cable 96 or the source power cable 54) extends outside or otherwise beyond the internal space defined by the components of the protective housing (i.e. the stationary base 58, the shroud 62, the mounting brackets 116, and the core module assembly 12." Such a feature is desirable in that the electrical cables are prevented from being pulled or otherwise contacted by a user (e.g. a customer or a retail clerk) in a manner which may disconnect the cables from their respective connectors when the retail terminal 10 is secured to the tabletop 214.

Figure 26:
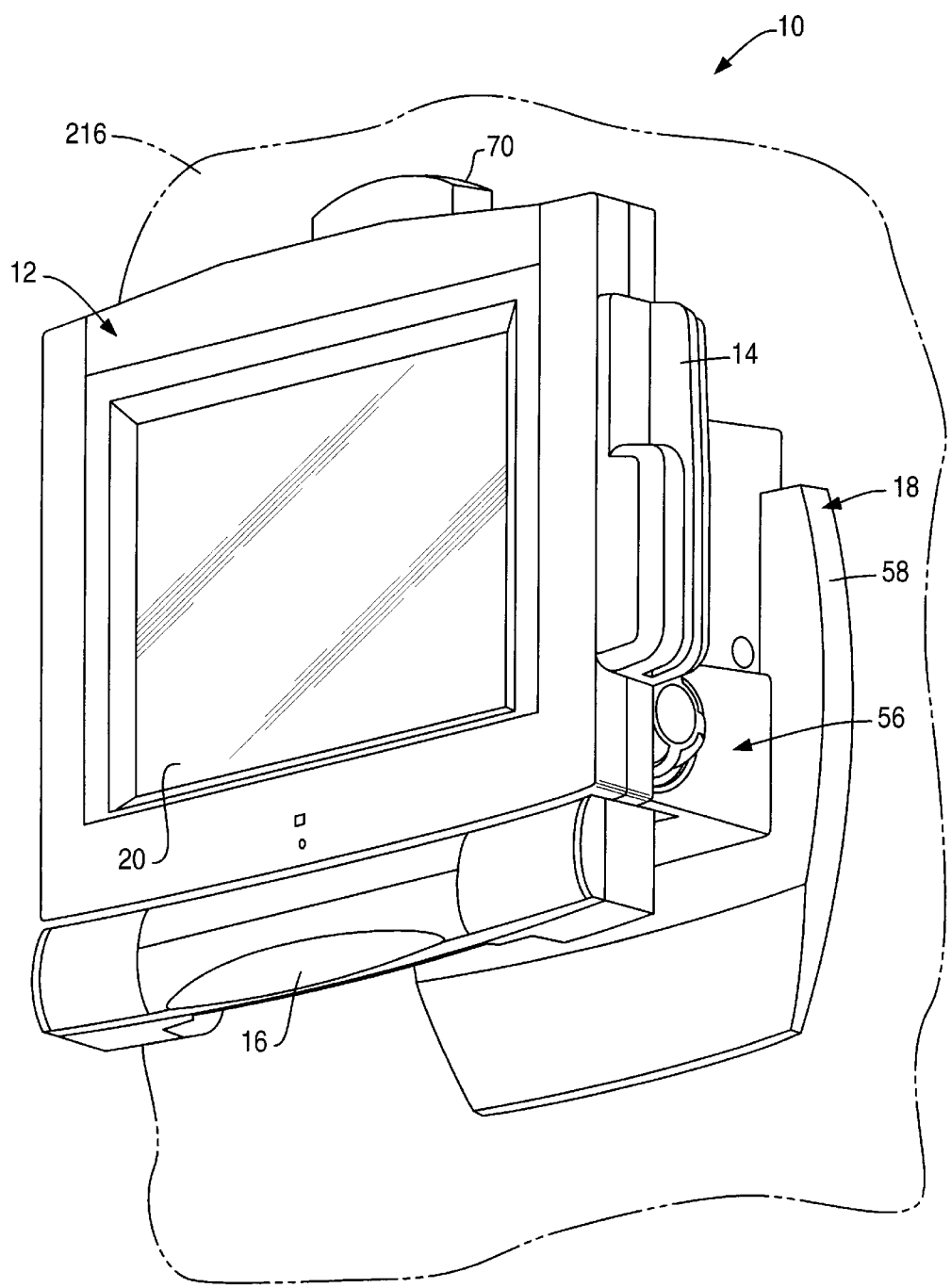
FIG. 26 is a fragmentary perspective view showing the retail terminal of FIG. 1 secured to the wall.

As shown in FIGS. 26 and 27, the retail terminal 10 may be secured to the wall 216 with the mounting plate 218. The fastening apertures 226 are provided to facilitate securing the mounting plate 218 to the wall 216. In particular, the bolts 408 are advanced through each of the fastening apertures 226 and thereafter threadingly engaged in a corresponding fastening aperture 404 defined in the wall 216 so as to secure the mounting plate 218 to the wall 216.

Thereafter, the mounting tabs 220 cooperate with the mounting slots 224 in order to secure the base plate 222 of the base assembly 18 to the mounting plate 218 and hence the wall 216. In particular, the base assembly 18 (with the core module assembly 12 secured thereto) is advanced in the general direction of arrow 240 of FIG. 27 toward the mounting plate 218 (which is bolted to the wall 216) such that the mounting tabs 220 are aligned with the mounting slots 224. Thereafter, the base assembly 18 is further advanced in the general direction of arrow 240 such that the mounting tabs 220 are received into the mounting slots 224. Once the mounting tabs 220 are received into the mounting slots 224, the base assembly 18 is urged or otherwise slid in the general direction of arrow 242 such that the mounting tabs 220 are advanced into the locking portions 232 of the mounting slots 224 so as to lock the mounting tabs 220 therein.

As discussed above, the locking lever 370 prevents the base assembly 18 from inadvertently moving relative to the mounting plate 218. In particular, the locking lever 370 is spring biased in the general direction of arrow 374 of FIG. 27 into its locked position. When the locking lever 370 is positioned in its locked position, the locking flange 244 is captured or otherwise retained in the locking notch 396 defined in the locking lever 370 so as to prevent the base assembly 18 from inadvertently being slid or otherwise moved in a manner that would allow the mounting tabs 220 to be inadvertently removed from the mounting slots 224. Conversely, when the locking lever 370 is moved by a user or the like in the general direction of arrow 400 of FIG. 27, the locking lever 370 assumes its unlocked position thereby allowing the locking flange 244 to be spaced apart or otherwise removed from the locking notch 396.

Moreover, numerous electrical cables associated with the retail terminal 10 (e.g. the source power cable 54 or the LAN cable 96) may be advanced through an opening 564 defined in the wall 216, and thereafter the cable access opening 236. Once received through the cable access opening 236 defined in the mounting plate 218, the electrical cables may be advanced through one of the cable access openings 64 associated with the base assembly 18 and thereafter coupled to one of the electrical connectors 24, 26, 28, 30, 32, 34, 36, 38, 412, 414 (see FIG. 4) associated with the core module assembly 12. For example, the LAN cable 96 may be advanced through the opening 564 defined in the wall 216, the cable access opening 236 defined in the mounting plate 218, and one of the cable access openings 64 defined in the base assembly 18. Once received through the cable access opening 64, the data connector 578 of the LAN cable 96 is connected to the LAN connector 24 thereby electrically coupling the core module assembly 12 to the LAN 94. The source power cable 54 may also be advanced through the opening 564 defined in the wall 216, the cable access opening 236 defined in the mounting plate 218, and one of the cable access openings 64 defined in the base assembly 18. Once received through the cable access opening 64, the power connector 580 of the source power cable 54 is connected to the power input connector 568 of the power supply 50 (see FIG. 3) thereby electrically coupling the power supply 50 to the 110 VAC power source 512. Thereafter, the intermediate power cable 52 is connected to both the power connector 26 of the core module assembly 12 and the power output connector 572 of the power supply 50 (see FIG. 3) thereby electrically coupling the core module assembly 12 to the power supply 50.

It should be appreciated that such a configuration enhances the cable management associated with the retail terminal 10 when the terminal 10 is secured to the wall 216. In particular, as discussed above, the stationary base 58, the shroud 62, the mounting brackets 116, and the core module assembly 12 collectively define the protective housing of the retail terminal 10 when the core module assembly 12 is secured to the pivoting base assembly 18. The segment of the data cable (e.g. the LAN cable 96) and the segment of the power cable (e.g. the source power cable 54) which extend out of the opening 564 in the wall 216 and the cable access opening 236 of the mounting plate 218 are completely contained within the protective housing of the base assembly 18. Such a feature is desirable in that the electrical cables are prevented from being pulled or otherwise contacted by a user (e.g. a customer or a retail clerk) in a manner which may disconnect the cables from their respective connectors when the retail terminal 10 is secured to the wall 216.

Figure 28:
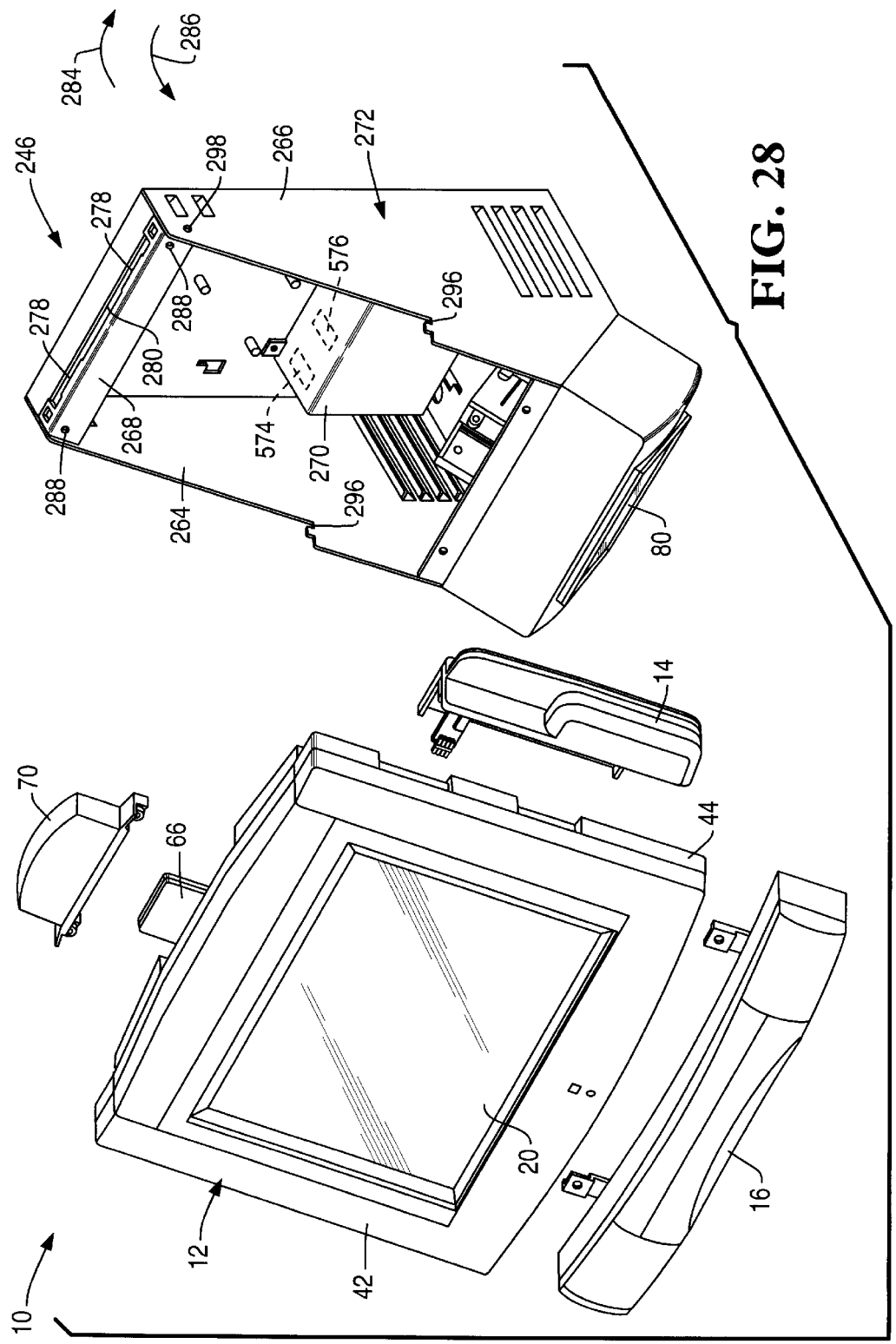
FIG. 28 is an exploded perspective view showing the retail terminal of FIG. 1 configured to include the fixed-angle base assembly in lieu of the pivoting base assembly.
Figure 29:
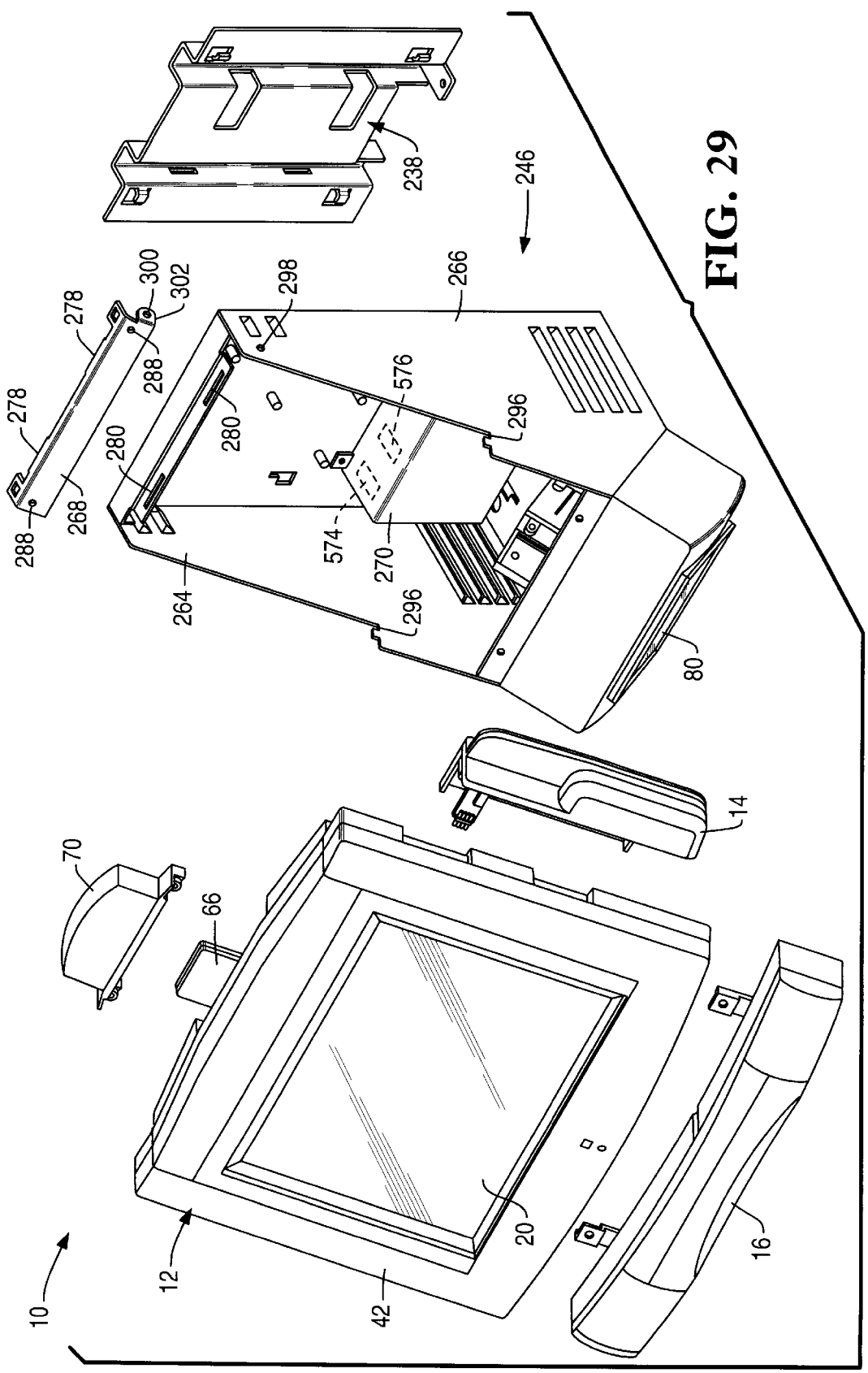
FIG. 29 is a view similar to FIG. 28, but showing the hinge member removed from the housing of the fixed-angle base assembly for clarity of description.
Figure 30:
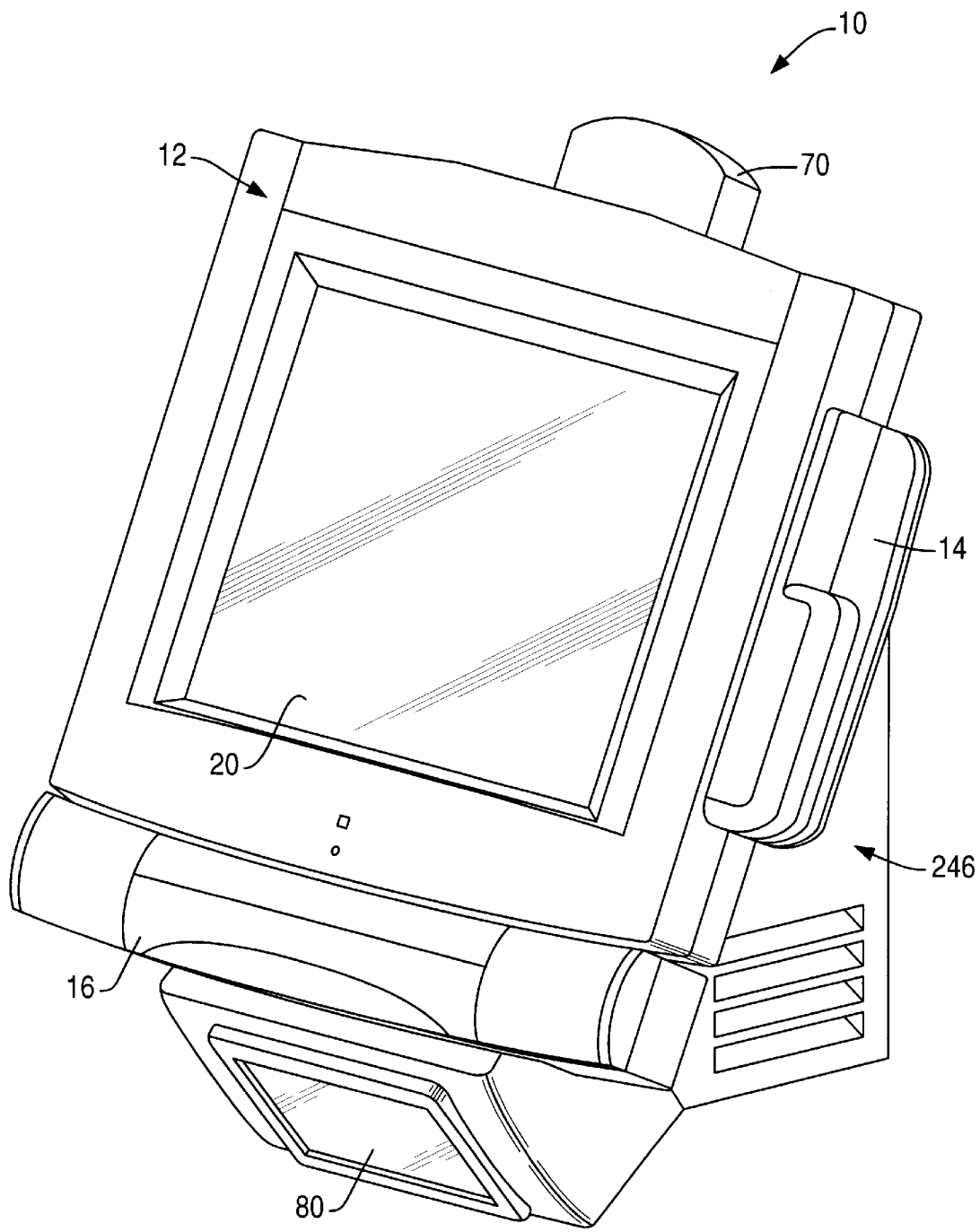
FIG. 30 is a perspective view of the retail terminal of FIG. 28 showing the retail terminal configured to include both the stereo speaker assembly and the scanner device.

As shown in FIGS. 28 and 29, the core module assembly 12 may be secured to a single-orientation or fixed-angle base assembly 246 in lieu of the pivoting base assembly 18. What is meant herein by the terms "single-orientation base assembly" or "fixed-angle base assembly" is a base assembly that is configured such that the core module assembly 12 is maintained at a fixed location or angle when secured thereto. In particular, unlike the pivoting base assembly 18, the fixed-angle base assembly 246 does not include a tilt mechanism for facilitating pivotal movement of the core module assembly 12. Hence, the core module assembly 12 is held stationary during operation thereof when secured to the fixed-angle base assembly 246. Such a configuration is particularly useful when the retail terminal 10 is operating as an unassisted retail terminal. In particular, by maintaining the core module assembly 12 in a fixed position, the number of occasions in which the core module assembly 12 is handled or otherwise contacted by the user (i.e. a customer in the case of an unassisted retail terminal) is reduced thereby potentially increasing the useful life of the retail terminal 10.

The fixed-angle base assembly 246 includes a housing 272 having a pair of side panels 264, 266, a hinge member 268, and a power supply 270. As with the power supply 50 of the pivoting base assembly 18, the power supply 270 is electrically coupled to the power connector 26 of the main controller board 22 via an intermediate power cable 556 (see FIG. 6). A source power cable 558 (see FIG. 6) couples the power supply 270 to a power source such as the standard 110 VAC outlet 512 so as to provide electrical power to the retail terminal 10.

The power supply 270 is housed in the housing 272 of the fixed-angle base assembly 246. In particular, the power supply 270 is secured to a base mounting structure or plate 274 (see FIG. 35) of the fixed-angle base assembly 246. It should be appreciated that such a configuration enhances the cable management associated with the retail terminal 10. In particular, the housing 272 has a number of cable access openings 276 (see FIG. 35) defined therein. With a first end of the source power cable 558 coupled to the standard 110 VAC outlet 512, a second end of the source power cable 558 may be advanced through any one of the access openings 276 and thereafter connected to the power supply 270. Moreover, such a configuration allows the intermediate power cable 556 to be advanced from the power supply 270 to the power connector 26 (see FIGS. 4 and 6) while being covered by the core module assembly 12 (when the core module assembly 12 is secured to the housing 272) thereby preventing a portion of the intermediate power cable 556 from dangling or otherwise hanging from the retail terminal 10. It should also be appreciated that such a configuration of the fixed-angle base assembly 246 also allows other cables associated with the retail terminal 10, such as a LAN cable or speaker cable, to be advanced through the access openings 276 and thereafter connected to a corresponding electrical connector 24, 28, 30, 32, 34, 36, 38, 412, or 414 without dangling or otherwise hanging from the retail terminal 10.

It should be further appreciated that use of the power supply 270 also facilitates quick and easy removal of the core module assembly 12 from the pivoting base assembly 18 and subsequent placement of the core module assembly 12 on the fixed-angle base assembly 246, and vice versa. In particular, by providing a separate power supply (i.e. the power supplies 50, 270) in each of the base assemblies (i.e. the pivoting base assembly 18 and the fixed-angle base assembly 246), the core module assembly 12 can be moved between the base assemblies 18, 246 without the need to also move the power supply between the base assemblies 18, 246 thereby reducing the amount of time and effort required to move the core module assembly 12 between the base assemblies 18, 246. For example, the core module assembly 12 may first be secured to the pivoting base assembly 18 in order to perform an assisted retail function such as a point-of-sale function. During such a time, power is supplied to the core module assembly 12 by the power supply 50 which is coupled to the power connector 26 of the main controller board 22 via the intermediate power cable 52. Thereafter, the intermediate power cable 52 may be disconnected from power connector 26 thereby allowing the core module assembly 12 to be detached from the pivoting base assembly 18 and attached to the fixed-angle base assembly 246. Once mechanically attached to the fixed angle base assembly 246 in the manner described below, power is supplied to the core module assembly 12 by the power supply 270 which is coupled to the power connector 26 of the main controller board 22 via the intermediate power cable 556. Once electrically coupled to the power supply 270, the core module assembly 12 may be used to perform an unassisted retail function such as a product demonstration retail function.

The hinge member 268 is provided to secure the core module 12 to the housing 272 of the fixed-angle base assembly 246. In particular, the hinge member 268 has a pair of retaining flanges 278 defined therein which cooperates with a pair of retaining grooves 280 (see FIG. 29) defined in a top plate 282 of the housing 272 in order to allow the hinge member 268 to move in either the general direction of arrow 284 or arrow 286 of FIG. 28.

The hinge member 268 also has a pair of apertures 288 defined therein. The apertures 288 are provided to secure the core module assembly 12 to the hinge member 268. In particular, the rear cover 46 of the core module assembly 12 has a pair of apertures 290 defined therein (see FIG. 5) which align with a pair of apertures 292 defined in the fastening surface 454 of the thermally conductive housing 430 (see FIG. 4) when the rear cover 46 is attached thereto. It should be appreciated that a pair of the bolts 464 are positioned in the apertures 290, 292 in order to secure the rear cover 46 to the rear enclosure 44. The same bolts 4664 are used to secure the core module assembly 12 to the hinge member 268. In particular, the fasteners are advanced through the apertures 288 from a backside of the hinge member 268, and thereafter threadingly engaged with the apertures 290, 292 defined in the rear cover 46 and the thermally conductive housing 430, respectively, in order to (1) secure the core module assembly 12 to the hinge member 268 and hence the base assembly 246, and (2) secure the top of the rear cover 46 to the housing 430. It should be appreciated that when the rear enclosure 44 is secured to the hinge member 268 in such a manner, the core module assembly 12 may pivot relative the housing 272 of the fixed-angle base assembly 246 in the general direction of either arrow 284 or arrow 286 of FIG. 28. Such pivoting of the core module assembly 12 facilitates access to a number of components housed within the housing 272 such as the power supply 270 or the scanner device 80.

The side panels 264, 266 each have a mounting tab 296 defined therein. The mounting tabs 296 and the hinge member 268 cooperate so as to define a mounting structure of the fixed-angle base assembly 246. Moreover, the mounting tabs 296 are used to secure the bottom portion of the core module assembly 12 to the housing 272 of the fixed-angle base assembly 246. In particular, the core module assembly 12 is pivoted in the general direction of arrow 286 of FIG. 28 and thereby positioned relative to the housing 272 such that the lip portion 252 of the sidewall 438 (see FIG. 4) rests on the mounting tabs 296. Thereafter, a fastener such as a bolt or screw (not shown) is advanced through an aperture 298 defined in the side panel 266 and thereafter threadingly engaged with a threaded aperture 300 defined in a flange 302 included in the hinge member 268 (see FIG. 29). It should be appreciated that the hinge member 268 is prevented from pivoting relative the housing 272 when the fastener is positioned in the apertures 298 and 300 thereby locking or otherwise securing the core module assembly 12 to the housing 272 and hence the fixed-angle base assembly 246.

As shown in FIGS. 30–33, the retail terminal 10 may be equipped in a number of different configurations in order to meet the requirements for performing a given retail function. For example, the retail terminal 10 may be configured with the scanner device 80 (see FIGS. 30 and 32). The scanner device 80 is particularly useful for entering product information when the retail terminal 10 is being used as a point-of-sale (POS) terminal. In particular, if a customer or clerk is using the retail terminal 10 to checkout items for purchase, the scanner device 80 may be used to scan or otherwise capture a product identification code included in a bar code associated with each of the items for purchase. Once the product identification code is obtained, the retail terminal 10 may communicate with the retailer's network system (i.e. the LAN 94) via either a wireless connection (i.e. the LAN card 66) or a wired connection (i.e. LAN cable 96 coupled to the LAN connector 24) in order to obtain the pricing information associated with the items for purchase. Moreover, the scanner device 80 is also useful when the retail terminal 10 is being utilized as a product information terminal. For example, the retail terminal 10 may be placed in a shopping area of the retail store such that customers may scan the bar code associated with an item with the scanner device 80 so as to obtain product information, such as price and model features, in order to assist the customer in his or her selection of an item.

Figure 31:
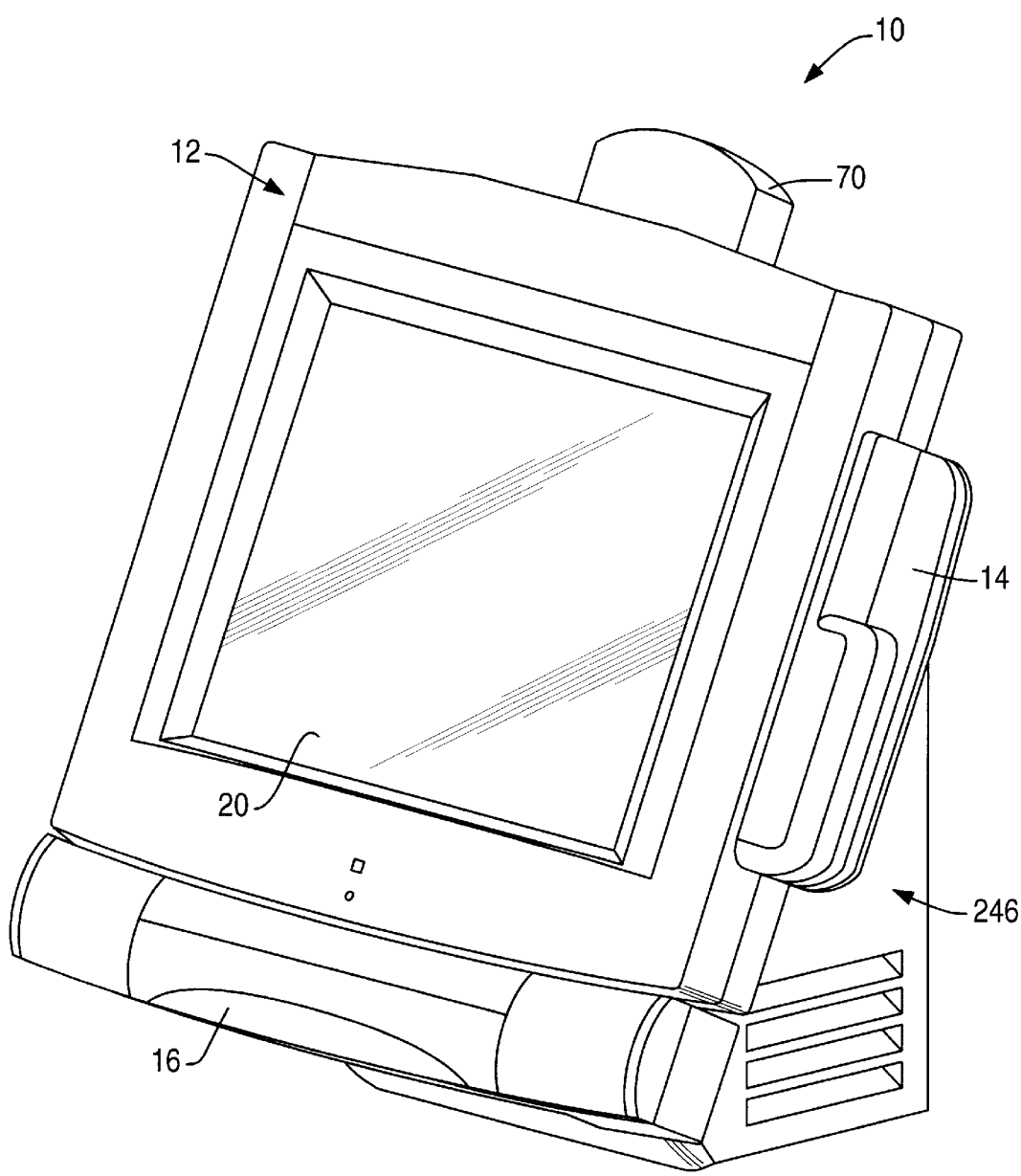
FIG. 31 is view similar to FIG. 30, but showing the retail terminal configured without the scanner device.

Alternatively, the retail terminal 10 may be configured without use of the scanner device 80 (see FIGS. 31 and 33). Such a configuration is desirable when the retail terminal 10 is being utilized in a configuration which does not require entry of product identification codes thereby reducing costs associated with the retail terminal 10. For example, if the retail terminal 10 is being utilized to display an audio visual (A/V) product demonstration.

Moreover, the retail terminal 10 may be configured without use of the stereo speaker assembly 16 (see FIGS. 32 and 33). Such a configuration is desirable when the retail terminal 10 is being utilized in a configuration which does not require stereo playback. For example, if the retail terminal 10 is being utilized to display a video product demonstration which does not include stereo sound.

Finally, the retail terminal 10 may be configured without use of either the scanner device 80 or the stereo speaker assembly 16 (see FIG. 33). Such a configuration is desirable when the retail terminal 10 is being utilized in a configuration which does not require product identification code entry or stereo playback.

Figure 34:
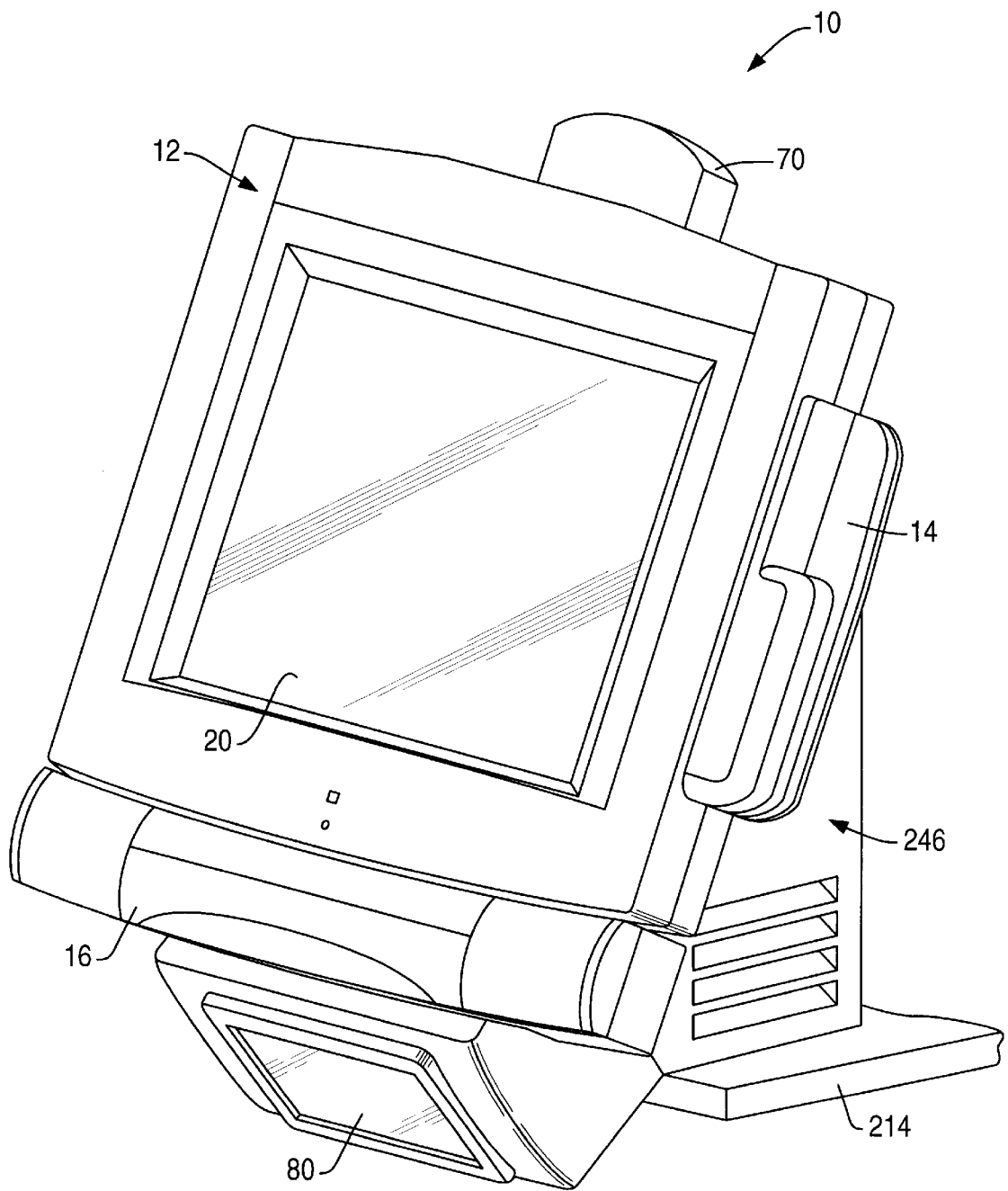
FIG. 34 is a perspective view of the retail terminal of FIG. 28 showing the retail terminal secured to a tabletop.
Figure 35:
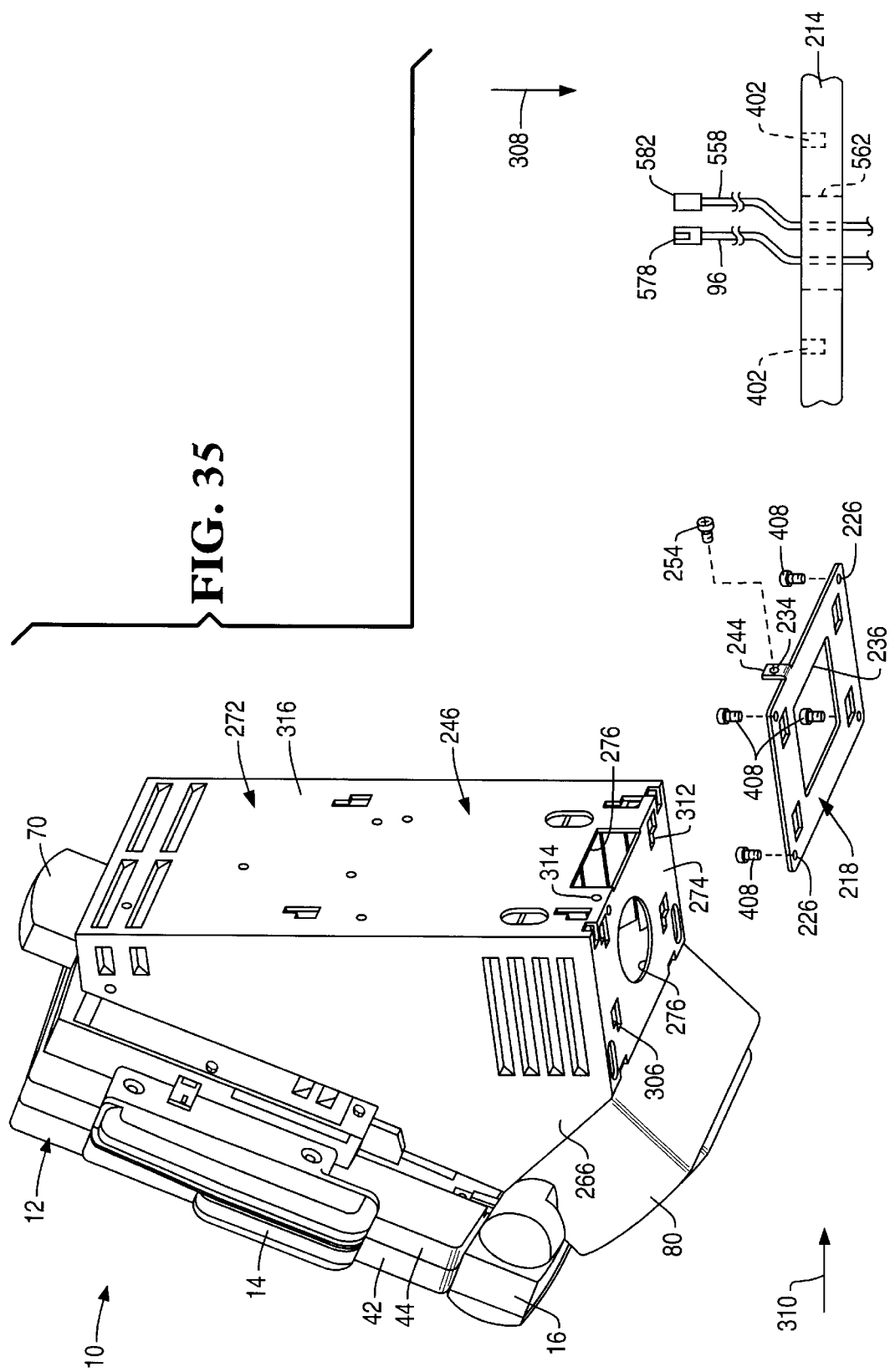
FIG. 35 is a rear perspective view of the retail terminal of FIG. 34 which shows the relationship between the retail terminal and the mounting bracket used to secure the retail terminal to the tabletop.
Figure 36:
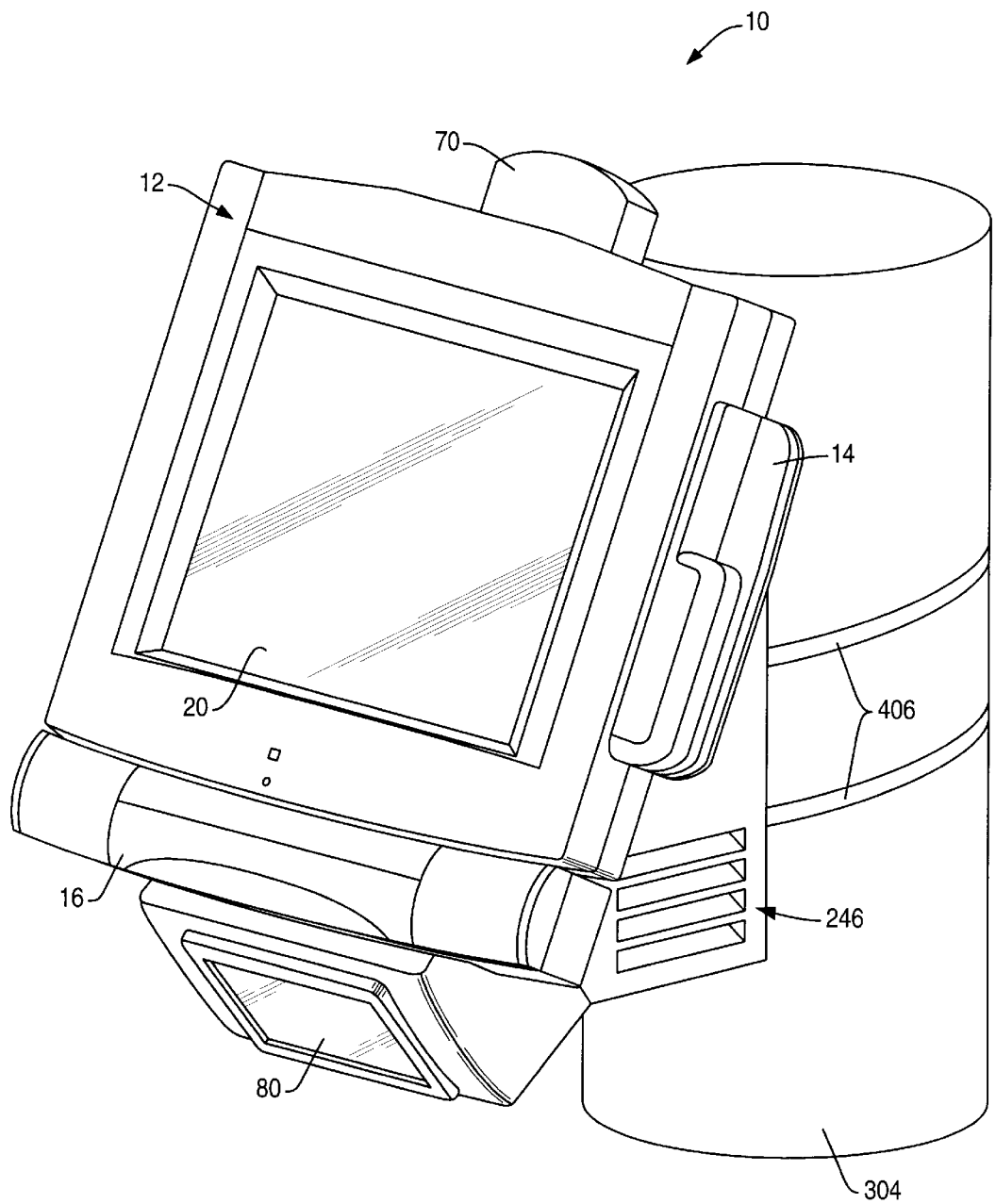
FIG. 36 is a perspective view of the retail terminal of FIG. 28 showing the retail terminal secured to a pole.
Figure 37:
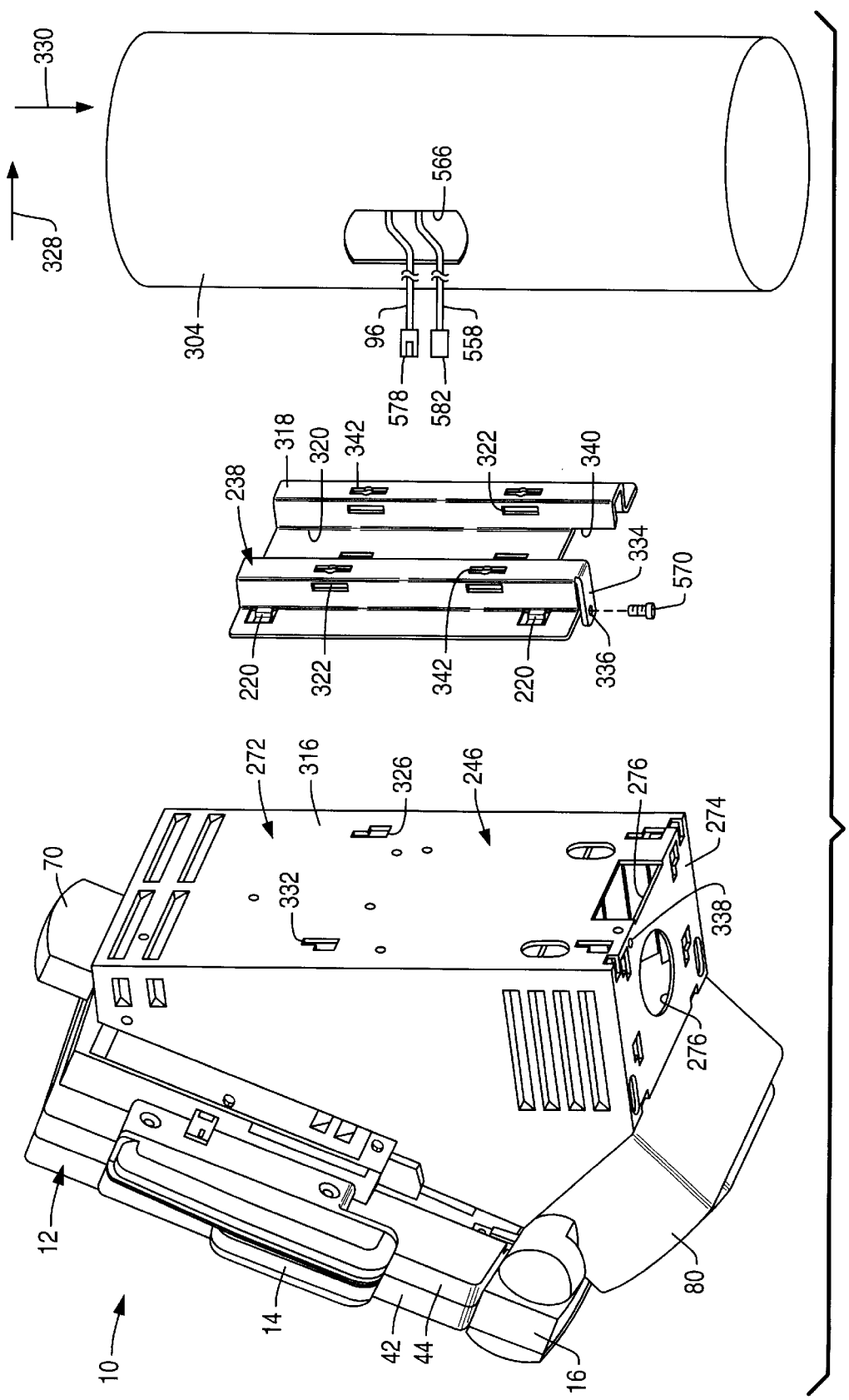
FIG. 37 is a rear perspective view of the retail terminal of FIG. 36 which shows the relationship between the retail terminal and the mounting bracket used to secure the retail terminal to the pole.

Referring now to FIGS. 34–35, the fixed-angle base assembly 246 may be used to secure the core module assembly 12 to either a substantially horizontal surface such as the tabletop 214 (see FIG. 34) or a substantially vertical surface such as the wall 216 or a pole 304 (see FIGS. 36–37). In particular, the retail terminal 10 may be secured to the tabletop 214 with the mounting plate 218. In particular, the base plate 274 of the base assembly 246 has a number of mounting slots 306 defined therein. One of the bolts 408 is advanced through each of the fastening apertures 226 defined in the mounting plate 218 and thereafter threadingly engaged in a corresponding fastening aperture 402 defined in the tabletop 214 so as to secure the mounting plate 218 to the tabletop 214.

Thereafter, the mounting tabs 220 cooperate with the mounting slots 306 in order to secure the base plate 274 of the base assembly 246 to the mounting plate 218. In particular, the base assembly 246 (with the core module assembly 12 secured thereto) is advanced in the general direction of arrow 308 of FIG. 35 toward the mounting plate 218 (which is bolted to the tabletop 214) such that the mounting tabs 220 are aligned with the mounting slots 306. Thereafter, the base assembly 246 is further advanced in the general direction of arrow 308 such that the mounting tabs 220 are received into the mounting slots 306. Once the mounting tabs 220 are received into the mounting slots 306, the base assembly 246 is urged or otherwise slid in the general direction of arrow 310 of FIG. 35 such that the mounting tabs 220 are advanced into a locking portion 312 of the mounting slots 224 so as to lock the mounting tabs 220 therein.

As discussed above, the mounting plate 218 further has a locking flange 244 defined therein. As shown in FIG. 35, a plate locking aperture 234 is defined in the locking flange 244. A fastener such as a bolt or screw 254 is advanced through the plate locking aperture 234 and thereafter into a corresponding base locking aperture 314 defined in a rear mounting structure or plate 316 of the housing 272 so as to prevent the base assembly 246 from inadvertently being slid or otherwise moved in a manner that would allow the mounting tabs 220 to be inadvertently removed from the mounting slots 306.

Moreover, numerous electrical cables associated with the retail terminal 10 (e.g. the source power cable 558 or the LAN cable 96) may be advanced through the opening 562 defined in the tabletop 214, and thereafter the cable access opening 236 of the mounting plate 218. Once received through the cable access opening 236 defined in the mounting plate 218, the electrical cables may be advanced through one of the cable access openings 276 associated with the base assembly 246 and thereafter coupled to one of the electrical connectors 24, 26, 28, 30, 32, 34, 36, 38, 412, 414 (see FIG. 4) associated with the core module assembly 12. For example, the LAN cable 96 may be advanced through the opening 562 defined in the tabletop 214, the cable access opening 236 defined in the mounting plate 218, and one of the cable access openings 276 defined in the base assembly 246. Once received through the cable access opening 276, the data connector 578 of the LAN cable 96 is connected to the LAN connector 24 thereby electrically coupling the core module assembly 12 to the LAN 94. The source power cable 558 includes a power connector 582, as shown in FIG. 35. The source power cable 558 may be advanced through the opening 562 defined in the tabletop 214, the cable access opening 236 defined in the mounting plate 218, and one of the cable access openings 276 defined in the base assembly 246. Once received through the cable access opening 276, the power connector 582 of the source power cable 558 is connected to a power input connector 574 of the power supply 270 (see FIGS. 28 and 29) thereby electrically coupling the power supply 270 to the 110 VAC power source 512. Thereafter, the intermediate power cable 556 is connected to both the power connector 26 of the core module assembly 12 and a power output connector 576 of the power supply 270 (see FIGS. 28 and 29) thereby electrically coupling the core module assembly 12 to the power supply 270.

It should be appreciated that such a configuration enhances the cable management associated with the retail terminal 10 when the terminal 10 is secured to the tabletop 246. In particular, the housing 272 of the fixed-angle base assembly 246 and the core module assembly 12 collectively define a protective housing of the retail terminal 10 when the core module assembly 12 is secured to the fixed-angle base assembly 246. The segment of the data cable (e.g. the LAN cable 96) and the segment of the power cable (e.g. the source power cable 558) which extend out of the opening 562 in the tabletop 214 and the cable access opening 236 of the mounting plate 218 are completely contained within the protective housing of the base assembly 246. Such a feature is desirable in that the electrical cables are prevented from being pulled or otherwise contacted by a user (e.g. a customer or a retail clerk) in a manner which may disconnect the cables from their respective connectors when the retail terminal 10 is secured to the tabletop 214.

As shown in FIGS. 36 and 37, the retail terminal 10 may be secured to the pole 304 with a mounting plate 238. The mounting plate 238 is somewhat similar to the mounting plate 218. Thus, the same reference numerals are used in FIGS. 36 and 37 to designate common components which were previously discussed in regard to FIGS. 1–35. The mounting plate 238 has a pair of outwardly extending U-shaped structural members 318 secured thereto. The structural members 318 cooperate to define a central cavity 320, as shown in FIG. 37. Moreover, the structural members 318 have a number of elongated slots 322 defined therein. The elongated slots 322 are provided to secure the mounting plate 238 to the pole 304. In particular, a number of metal bands such as strap clamps 406 may be advanced around the pole 304 and thereafter through the elongated slots 322. Once advanced through the elongated slots 322, the opposite ends of the strap clamp 406 are secured together thereby securing the mounting plate 238 to the pole 304. One type of strap clamp which may be used is a commonly known stainless-steel hose clamp which is of a sufficient length to be advanced around the pole 304 in the manner described above.

Once the mounting plate 238 is secured to the pole 304, the housing 272 of the base assembly 246 may be secured thereto. In particular, the rear plate 316 of the housing 272 has number of mounting slots 326 defined therein. The mounting tabs 220 of the mounting plate 238 cooperate with the mounting slots 326 in order to secure the rear plate 316 of the base assembly 246 to the mounting plate 238 and hence the pole 304. In particular, the base assembly 246 (with the core module assembly 12 secured thereto) is advanced in the general direction of arrow 328 of FIG. 37 toward the mounting plate 238 (which is secured to the pole 304) such that the mounting tabs 220 are aligned with the mounting slots 326. Thereafter, the base assembly 246 is further advanced in the general direction of arrow 328 such that the mounting tabs 220 are received into the mounting slots 326. Once the mounting tabs 220 are received into the mounting slots 326, the base assembly 246 is urged or otherwise slid in the general direction of arrow 330 of FIG. 37 such that the mounting tabs 220 are advanced into a locking portion 332 associated with each of the mounting slots 326 so as to lock the mounting tabs 220 therein.

The mounting plate 238 further has a locking flange 334 defined therein. A plate locking aperture 336 is defined in the locking flange 334. A fastener such as a bolt or screw 570 is advanced through the locking aperture 336 and thereafter into a corresponding base locking aperture 338 defined in the base plate 274 so as to prevent the base assembly 346 from inadvertently being slid or otherwise moved in a manner that would allow the mounting tabs 220 to be inadvertently removed from the mounting slots 326.

Moreover, the mounting plate 238 has a cable access opening 340 defined therein. Numerous electrical cables associated with the retail terminal 10 (e.g. the source power cable 558 or the LAN cable 96) may be advanced through an opening 566 defined in the pole 304, and thereafter the cable access opening 340 of the mounting plate 238. Once received through the cable access opening 340 defined in the mounting plate 238, the electrical cables may be advanced through one of the cable access openings 276 associated with the base assembly 246 and thereafter coupled to one of the electrical connectors 24, 26, 28, 30, 32, 34, 36, 38, 412, 414 (see FIG. 4) associated with the core module assembly 12. For example, the LAN cable 96 may be advanced through the opening 566 defined in the pole 304, the cable access opening 340 defined in the mounting plate 238, and one of the cable access openings 276 defined in the base assembly 246. Once received through the cable access opening 276, the data connector 578 of the LAN cable 96 is connected to the LAN connector 24 thereby electrically coupling the core module assembly 12 to the LAN 94. The source power cable 558 may also be advanced through the opening 566 defined in the pole 304, the cable access opening 340 defined in the mounting plate 238, and one of the cable access openings 276 defined in the base assembly 246. Once received through the cable access opening 276, the power connector 582 of the source power cable 558 is connected to the power input connector 574 of the power supply 270 (see FIGS. 28 and 29) thereby electrically coupling the power supply 270 to the 110 VAC power source 512. Thereafter, the intermediate power cable 556 is connected to both the power connector 26 of the core module assembly 12 and the power output connector 576 of the power supply 270 (see FIGS. 28 and 29) thereby electrically coupling the core module assembly 12 to the power supply 270.

It should be appreciated that such a configuration enhances the cable management associated with the retail terminal 10 when the terminal 10 is secured to the pole 304. In particular, as discussed above, the housing 272 of the fixed-angle base assembly 246 and the core module assembly 12 collectively define the protective housing of the retail terminal 10 when the core module assembly 12 is secured to the fixed-angle base assembly 246. The segment of the data cable (e.g. the LAN cable 96) and the segment of the power cable (e.g. the source power cable 558) which extend out of the opening 566 in the pole 304 and the cable access opening 340 of the mounting plate 238 are completely contained within the protective housing of the base assembly 246. Such a feature is desirable in that the electrical cables are prevented from being pulled or otherwise contacted by a user (e.g. a customer or a retail clerk) in a manner which may disconnect the cables from their respective connectors when the retail terminal 10 is secured to the pole 304.

It should be appreciated that the mounting plate 238 may also be used to secure the core module assembly 12 to a flat vertical surface such as the wall 216 (see FIG. 26). In particular, the mounting plate 238 has a number of wall mounting slots 342 defined in the structural members 318. A fastener such as a bolt or screw (not shown) is advanced through each of the wall mounting slots 342 and thereafter threadingly engaged in a corresponding fastening aperture 404 defined in the wall 216 (see FIG. 27) in order to secure the mounting plate 238 to the wall 216. Once the mounting plate 238 is secured to the wall 216, the core module assembly 12 may be secured to the mounting plate 238 in the manner previously discussed.

Figure 38:
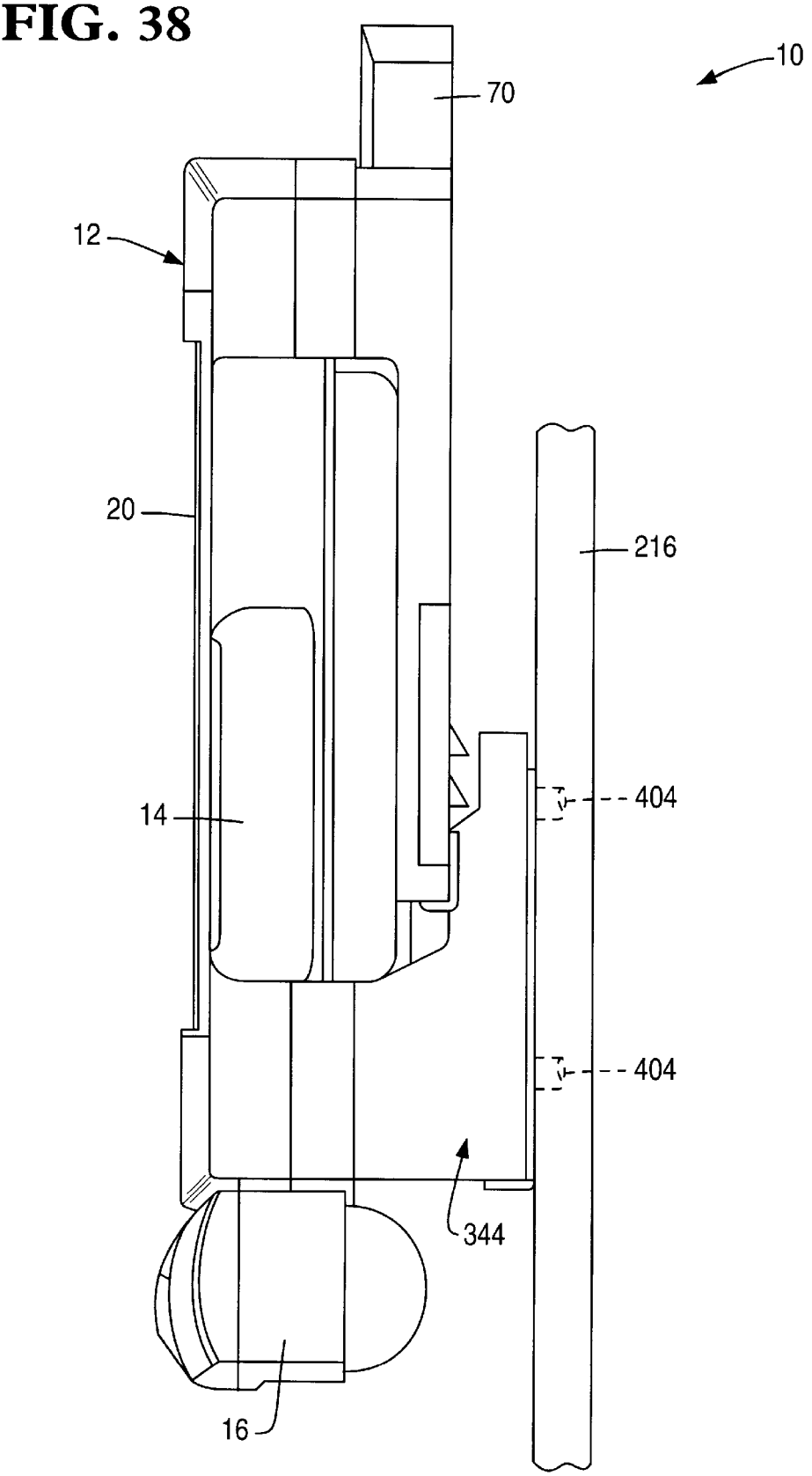
FIG. 38 is a side view showing the retail terminal of FIG. 1 configured to include the auxiliary plate in lieu of either the fixed-angle base assembly or the pivoting base assembly, note that the retail terminal is secured to the wall.
Figure 39:
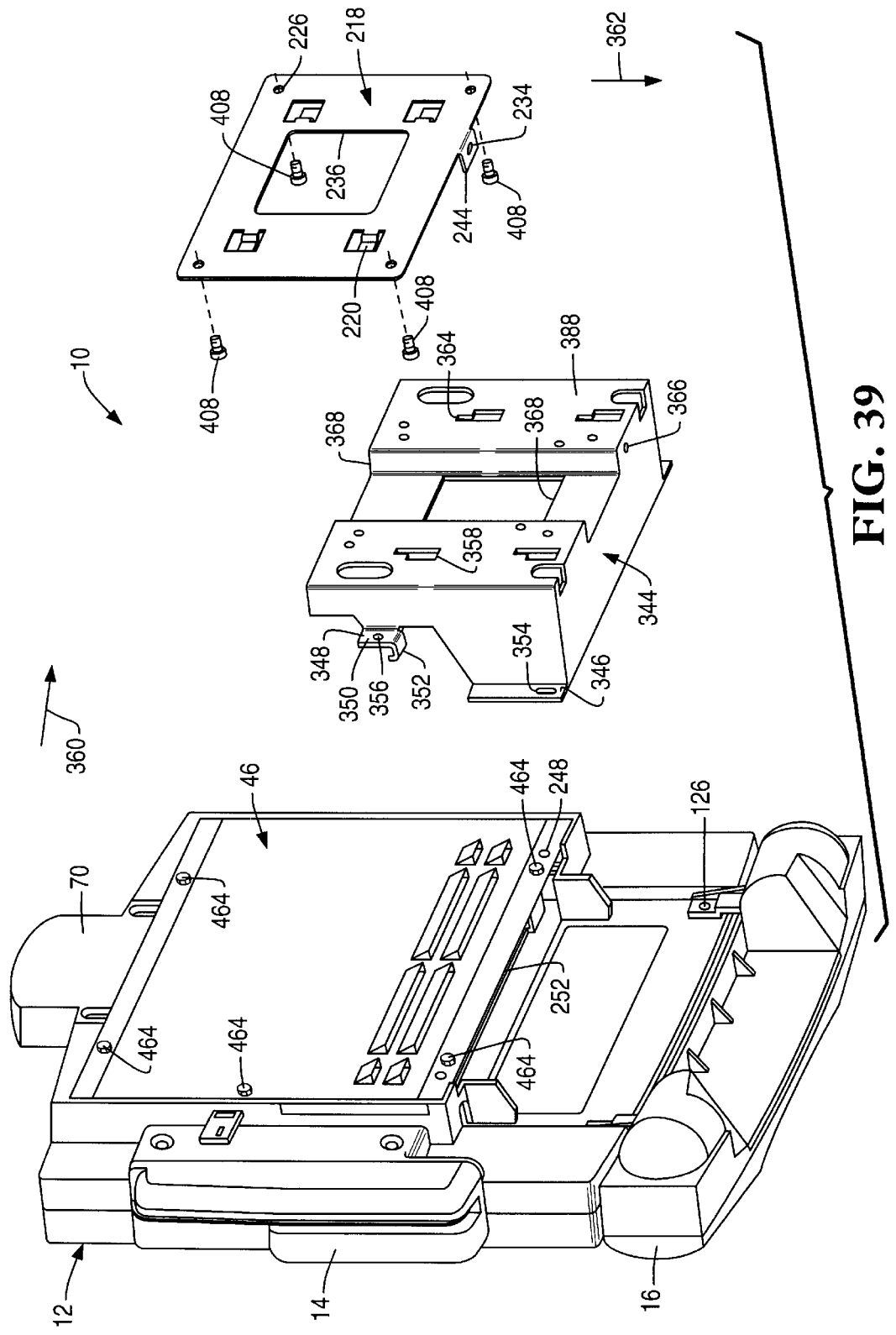
FIG. 39 is a rear perspective view of the retail terminal of FIG. 38 which shows the relationship between the retail terminal, the auxiliary plate, and the mounting bracket used to secure the retail terminal to the wall.

As shown in FIGS. 38 and 39, an auxiliary plate 344 may be used to couple the core module assembly 12 directly to the mounting plate 218 and hence the wall 216. The auxiliary plate 344 is secured to the core module assembly 12 in a similar manner as the mounting brackets 116 of the pivoting base assembly 18. In particular, auxiliary plate 344 has a pair of flanges 346, 348 defined therein. The flange 348 includes a relatively flat portion 350 and a hook portion 352. An elongated slot 354 is defined in each of the flanges 346, whereas an aperture 356 is defined in the flat portion 350 of each of the flanges 348. In order to secure the core module assembly 12 to the auxiliary plate 344, the core module assembly 12 is positioned relative to the auxiliary plate 344 such that the lip portion 252 of the sidewall 438 (see FIG. 4) rests on the hook portions 352 of the flanges 348 defined in the auxiliary plate 344. Thereafter, a first pair of fasteners such as bolts (not shown) are advanced through the elongated slots 354 and thereafter threadingly engaged with the threaded apertures 126 defined in the rear enclosure 44 of the core module assembly 12 (see FIG. 4). Moreover, a second pair of fasteners such as bolts (not shown) are then advanced through the apertures 356 and thereafter threadingly engaged with the apertures 248, 250 defined in the rear cover 46 and the fastening surface 450 (see FIGS. 4 and 5), respectively, so as to secure the core module assembly 12 to the auxiliary plate 344.

The mounting plate 218 is secured to the wall 216 in the manner previously discussed in regard to FIGS. 26 and 27. In particular, one of the bolts 408 is advanced through each of the fastening apertures 226 defined in the mounting plate 218 and thereafter threadingly engaged in a corresponding fastening aperture 404 defined in the wall 216 so as to secure the mounting plate 218 to the wall 216.

Thereafter, the mounting tabs 220 defined in the mounting plate 218 cooperate with a corresponding number of mounting slots 358 defined in a mounting structure 388 of the auxiliary plate 344 in order to secure the auxiliary plate 344 to the mounting plate 218 and hence the wall 216. In particular, the auxiliary plate 344 (with the core module assembly 12 secured thereto) is advanced in the general direction of arrow 360 of FIG. 39 toward the mounting plate 218 (which is bolted to the wall 216) such that the mounting tabs 220 of the auxiliary plate 344 are aligned with the mounting slots 358. Thereafter, the auxiliary plate 344 is further advanced in the general direction of arrow 360 such that the mounting tabs 220 are received into the mounting slots 358. Once the mounting tabs 220 are received into the mounting slots 358, the auxiliary plate 344 is urged or otherwise slid in the general direction of arrow 362 such that the mounting tabs 220 are advanced into a locking portion 364 of each of the mounting slots 358 so as to lock the mounting tabs 220 therein.

Thereafter, a fastener such as a bolt or screw (not shown) is advanced through the plate locking aperture 234 defined in the locking flange 244 of the mounting plate 218 and thereafter into a corresponding aperture 366 defined in the auxiliary plate 344 so as to prevent the auxiliary plate 344 from inadvertently being slid or otherwise moved in a manner that would allow the mounting tabs 220 to be inadvertently removed from the mounting slots 358.

Moreover, numerous cables associated with the retail terminal 10 may be advanced through an opening (not shown) defined in the wall 216, and thereafter advanced through the cable access opening 236 defined in the mounting plate 218. Once received through the cable access opening 236, the cables may then be advanced through one of a number of cable access openings 368 defined in the auxiliary plate 344, and thereafter coupled to one of the electrical connectors 24, 26, 28, 30, 32, 34, 36, 38, 412, 414 (see FIG. 4) associated with the core module assembly 12. It should be appreciated that such a configuration enhances the cable management associated with the retail terminal 10 when the terminal 10 is secured to the wall 216. For example, when mounted to the wall 216 using the auxiliary plate 344, an external power supply, such as a "brick-type" power supply, must be utilized to power the core module assembly 12. Hence, a power cable (not shown) which couples the external power supply to the power connector 26 (see FIGS. 4 and 6) may be advanced in the manner previously discussed.

Operation

In operation, the retail terminal 10 may be utilized to perform a number of different types of retail functions. For example, the retail terminal 10 may first be operated as an unassisted retail terminal which is performing a product demonstration retail function. In particular, the fixed-angle base assembly 246 may be secured to a vertical mounting surface such as the wall 216 or the pole 304 in the manner previously described. The core module assembly 12 may then be mechanically secured to the fixed-angle base assembly 246. Power is supplied to the core module assembly 12 from the power supply 270 which is electrically coupled to the power connector 26 of the core module assembly 12 via the intermediate power cable 52. Once mechanically coupled to the fixed-angle base assembly 246 and thereafter electrically coupled to the power supply 270, the core module assembly 12 may perform a product demonstration retail function. Such a function may include displaying video images, and a corresponding audio message, on the display monitor 20 and the stereo speaker assembly 16, respectively. Such video and audio messages are generally associated with the various products which are sold by the retailer. For example, the such a product demonstration retail function may include playing a product commercial on the display monitor 20 and the stereo speaker assembly 16.

Moreover, such a product demonstration function may also include allowing a customer to enter a request or other type of query by either touching a particular area of the touch screen associated with the display monitor 20 or touching a key associated with the keyboard 78 (if the given retail terminal is equipped with a keyboard). Thereafter, the retail terminal 10 may display information associated with the customer's request with the display monitor 20 and/or the stereo speaker assembly 16.

During a period of peak demand, the retail terminal 10 may be converted to cease performance of the product information retail function in order to perform a point-of-sale retail function. In particular, the fixed-angle base assembly 246 (with the core module assembly 12 secured thereto) may be removed from the vertical mounting surface (e.g. the wall 216 or the pole 304) and thereafter secured to a horizontal mounting surface such as the tabletop 214 in the manner previously discussed. Once secured to the tabletop 214, the retail terminal 10 may be used to perform an unassisted point-of-sale retail function. In particular, the retail terminal 10 may be operated as a self-service checkout terminal. In operation of a self-service checkout terminal, the customer himself or herself first scans items for purchase into the terminal 10 with the scanner device 80. The core module assembly 12 communicates with the LAN 94 (either via the LAN card 66 or the LAN cable 96) in order to obtain pricing information associated with each of the scanned items. Thereafter, the customer tenders payment for his or her items by either swiping a debit or credit card through the card reader 14 or placing cash into a cash acceptor (if the retail terminal 10 is equipped therewith).

It should be appreciated that the above discussion is intended to be exemplary in nature, with it being understood that the retail terminal 10 may be operated to perform a number of retail functions other than a product demonstration retail function when the core module assembly 12 and the fixed-angle base assembly 246 are secured to a vertical mounting surface (e.g. the wall 216 or the pole 304). For example, the retail terminal 10 may perform a point-of-sale retail function or a personnel training retail function when the core module assembly 12 and the fixed-angle base assembly 246 are secured to a vertical mounting surface.

Moreover, it should further be appreciated that the pivoting base assembly 18 (with the core module assembly 12 secured thereto) may also be moved between a vertical mounting surface (e.g. the wall 216 or the pole 304) and a horizontal mounting surface (e.g. the tabletop 214) in the manner discussed above in regard to the fixed-angle base assembly 246. Moreover, the retail terminal 10 may be used to perform various assisted and unassisted retail functions when the core module assembly 12 is attached to the pivoting base assembly 18 while the pivoting base assembly 18 is secured to either a vertical mounting surface or a horizontal mounting surface. For example, the retail terminal 10 may perform an assisted point-of-sale retail function when the core module assembly 12 is secured to the pivoting base assembly 18 which is in turn secured to a horizontal mounting surface (e.g. the tabletop 214). In such a configuration, retail peripherals such as a card reader (e.g.

the card reader 14), a scanner device (e.g. an external, hand-held scanner device), a cash drawer (e.g. the cash drawer 508), and a customer display (e.g. the customer display monitor 510) may be electrically coupled to the core module assembly 12 in order to facilitate operation of the retail terminal 10 as an assisted point-of-sale terminal.

In lieu of moving the base assemblies 18, 246 between a vertical mounting surface and a horizontal mounting surface, it should be appreciated that only the core module assembly 12 need be moved therebetween. For example, the fixed-angle base assembly 246 may be secured to a vertical mounting surface (e.g. the wall 216 or the pole 304), while the pivoting base assembly 18 is secured to a horizontal mounting surface (e.g. the tabletop 214). The core module assembly may be moved between the base assemblies 18, 246 in order to perform various retail functions. In particular, the core module assembly 12 may first be mechanically attached to the fixed-angle base assembly 246 while the fixed-angle base assembly 246 is secured to a vertical mounting surface. Once mechanically attached to the fixed-angle base assembly 246, the core module assembly 12 is then electrically coupled to the power supply 270 via the intermediate power cable 556. The retail terminal 10 may then be operated to perform a retail function such a product demonstration retail function.

When it is desirable to change the retail function being performed by the retail terminal 10, the core module assembly 12 may first be electrically decoupled from the power supply 270 by decoupling the intermediate power cable 556 from the power connector 26. The core module assembly 12 is then mechanically detached from the fixed angle base assembly 246 and thereafter mechanically attached to the pivoting base assembly 18. Once mechanically attached to the pivoting base assembly 18, the core module assembly 12 is electrically coupled to the power supply 50 via the intermediate power cable 52. The retail terminal 10 may then be operated to perform a retail function such an assisted point-of-sale retail function.

While the invention has been illustrated and described in detail in the drawings and foregoing description, such an illustration and description is to be considered as exemplary and not restrictive in character, it being understood that only the preferred embodiments have been shown and described and that all changes and modifications that come within the spirit of the invention are desired to be protected.

What is claimed is:

1. A retail terminal, comprising:
   a first base assembly secured to a first mounting surface, said first mounting surface having a first mounting opening defined therein out of which a first electrical cable segment extends;
   a second base assembly secured to a second mounting surface, said second mounting surface having a second mounting opening defined therein out of which a second electrical cable segment extends; and
   a core module assembly which operates to perform point-of-sale retail functions in a first mode of operation and product demonstration retail functions in a second mode of operation, wherein (i) said core module assembly is electrically coupled to said first electrical cable segment and attached to said first base assembly when said core module assembly is operating in said first mode of operation, and (ii) said core module assembly is electrically coupled to said second electrical cable segment and attached to said second base assembly when said core module assembly is operating in said second mode of operation, wherein said core module assembly and said first base assembly cooperate to define a first protective housing which completely contains said first cable segment when said core module assembly is (i) attached to said first base assembly, and (ii) operating in said first mode of operation, wherein said core module assembly and said second base assembly cooperate to define a second protective housing which completely contains said second cable segment when said core module assembly is (i) attached to said second base assembly, and (ii) operating in said second mode of operation, wherein the core module assembly includes (i) a housing, (ii) a main controller board positioned within the housing, (iii) a hard drive device positioned within the housing and electrically coupled to the main controller board, (iv) a data input device, electrically coupled to the main controller board, which is configured to allow a user to input data signals to the main controller board, (v) a plurality of electrical connectors, supported by the housing, which are configured to electrically couple the main controller board to a number of external devices, wherein the plurality of electrical connectors includes (i) a cash drawer connector configured to electrically couple a cash drawer to the main controller board, (ii) a LAN connector configured to electrically couple a LAN to the main controller board, (iii) a scanner connector configured to electrically couple a scanner to the main controller board, (iv) a module power connector configured to electrically couple a power supply to the main controller board, (v) an external speaker connector configured to electrically couple an external speaker to the main controller board, and (vi) a printer connector configured to electrically couple a printer to the main controller board.

2. The retail terminal of claim 1, wherein:
   said first base assembly is secured to said first mounting surface with a first mounting plate, said first mounting plate having a first plate opening defined therein,
   said second base assembly is secured to said second mounting surface with a second mounting plate, said second mounting plate having a second plate opening defined therein,
   said first plate opening is aligned with said first mounting opening,
   said second plate opening is aligned with said second mounting opening,
   said first electrical cable segment extends out of both said first plate opening and said first mounting opening, and
   said second electrical cable segment extends out of both said second plate opening and said second mounting opening.

3. The retail terminal of claim 2, wherein:
   said first base assembly has a first access opening defined therein,
   said second base assembly has a second access opening defined therein,
   said first access opening is aligned with both said first mounting opening and said first plate opening,
   said second access opening is aligned with both said second mounting opening and said second plate opening,
   said first electrical cable segment extends out of both said first plate opening and said first mounting opening and through said first access opening so as to be received into said first protective housing, and said second electrical cable segment extends out of both said second plate opening and said second mounting opening and through said second access opening so as to be received into said first protective housing.

4. The retail terminal of claim 1, wherein:

said first electrical cable segment includes a first data cable segment which extends out of said first mounting opening, said first data cable segment having a first data cable connector secured thereto, said second electrical cable segment includes a second data cable segment which extends out of said second mounting opening, said second data cable segment having a second data cable connector secured thereto, said first data cable connector is coupled to said LAN connector when said core module assembly is (i) attached to said first base assembly, and (ii) operating in said first mode of operation, and said second data cable connector is coupled to said LAN connector when said core module assembly is (i) attached to said second base assembly, and (ii) operating in said second mode of operation.

5. The retail terminal of claim 1, wherein:

said first electrical cable segment includes a first power cable segment which extends out of said first mounting opening, said first power cable segment having a first power cable connector secured thereto, said second electrical cable segment includes a second power cable segment which extends out of said second mounting opening, said second power cable segment having a second power cable connector secured thereto, said first base assembly includes a first power supply which has a first power input connector, said second base assembly includes a second power supply which has a second power input connector, said first power cable connector is coupled to said first power input connector when said core module assembly is (i) attached to said first base assembly, and (ii) operating in said first mode of operation, and said second power cable connector is coupled to said second power input connector when said core module assembly is (i) attached to said second base assembly, and (ii) operating in said second mode of operation.

6. The retail terminal of claim 5, further comprising a first intermediate cable and a second intermediate cable, wherein:

said first power supply includes a first power output connector, said second power supply includes a second power output connector, said first power output connector is electrically coupled to said module power connector via said first intermediate cable when said core module assembly is (i) attached to said first base assembly, and (ii) operating in said first mode of operation, said second power output connector is electrically coupled to said module power connector via said second intermediate cable when said core module assembly is (i) attached to said second base assembly, and (ii) operating in said second mode of operation, said first protective housing completely contains said first intermediate cable when said core module assembly is (i) attached to said first base assembly, and (ii) operating in said first mode of operation, and said second protective housing completely contains said second intermediate cable when said core module assembly is (i) attached to said second base assembly, and (ii) operating in said second mode of operation.

7. A method of operating a retail terminal having a core module assembly, a first base assembly, and a second base assembly, wherein (i) the first base assembly is secured to a first mounting surface, the first mounting surface having a first mounting opening defined therein out of which a first electrical cable segment extends, and (ii) the second base assembly is secured to a second mounting surface, the second mounting surface having a second mounting opening defined therein out of which a second electrical cable segment extends, comprising the steps of:

attaching the core module assembly to the first base assembly so that the core module assembly and the first base assembly cooperate to define a first protective housing which completely contains the first cable segment;

operating the core module assembly for a first time period so as to perform point-of-sale retail functions while the first cable segment is completely contained by the first protective housing;

detaching the core module assembly from the first base assembly after the first time period operating step;

attaching the core module assembly to the second base assembly, after the detaching step, so that the core module assembly and the second base assembly cooperate to define a second protective housing which completely contains the second cable segment; and operating the core module assembly for a second time period so as to perform product demonstration retail functions while the second cable segment is completely contained by the second protective housing, wherein the core module assembly includes (i) a housing, (ii) a main controller board positioned within the housing, (iii) a hard drive device positioned within the housing and electrically coupled to the main controller board, (iv) a data input device, electrically coupled to the main controller board, which is configured to allow a user to input data signals to the main controller board, (v) a plurality of electrical connectors, supported by the housing, which are configured to electrically couple the main controller board to a number of external devices, wherein the plurality of electrical connectors includes (i) a cash drawer connector configured to electrically couple a cash drawer to the main controller board, (ii) a LAN connector configured to electrically couple a LAN to the main controller board, (iii) a scanner connector configured to electrically couple a scanner to the main controller board, (iv) a module power connector configured to electrically couple a power supply to the main controller board, (v) an external speaker connector configured to electrically couple an external speaker to the main controller board, and (vi) a printer connector configured to electrically couple a printer to the main controller board.

8. The method of claim 7, wherein:

the first base assembly is secured to the first mounting surface with a first mounting plate, the first mounting plate having a first plate opening defined therein, the second base assembly is secured to the second mounting surface with a second mounting plate, the second mounting plate having a second plate opening defined therein, the first plate opening is aligned with the first mounting opening, the second plate opening is aligned with the second mounting opening, the first electrical cable segment extends out of both the first plate opening and the first mounting opening, and the second electrical cable segment extends out of both the second plate opening and the second mounting opening.

9. The method of claim 8, wherein:

the first base assembly has a first access opening defined therein, the second base assembly has a second access opening defined therein, the first access opening is aligned with both the first mounting opening and the first plate opening, the second access opening is aligned with both the second mounting opening and the second plate opening, the first electrical cable segment extends out of both the first plate opening and the first mounting opening and through the first access opening so as to be received into the first protective housing, and the second electrical cable segment extends out of both the second plate opening and the second mounting opening and through the second access opening so as to be received into the first protective housing.

10. The method of claim 7, wherein:

the first electrical cable segment includes a first data cable segment which extends out of the first mounting opening, the first data cable segment having a first data cable connector secured thereto, the second electrical cable segment includes a second data cable segment which extends out of the second mounting opening, the second data cable segment having a second data cable connector secured thereto, the step of attaching the core module assembly to the first base assembly includes tie step of connecting the first data cable connector to the LAN connector, and the step of attaching the core module assembly to the second base assembly includes the step of connecting the second data cable connector to the LAN connector.

11. The method of claim 7, wherein:

the first electrical cable segment includes a first power cable segment which extends out of the first mounting opening, the first power cable segment having a first power cable connector secured thereto, the second electrical cable segment includes a second power cable segment which extends out of the second mounting opening, the second power cable segment having a second power cable connector secured thereto, the first base assembly includes a first power supply which has a first power input connector, the second base assembly includes a second power supply which has a second power input connector, the step of attaching the core module assembly to the first base assembly includes the step of connecting the first power cable connector to the first power input connector, and the step of attaching the core module assembly to the second base assembly includes the step of connecting the second power cable connector to the second power input connector.

12. The method of claim 11, wherein:

the first power supply includes a first power output connector, the second power supply includes a second power output connector, the step of attaching the core module assembly to the first base assembly includes the step of connecting the first power output connector to the module power connector with a first intermediate cable, the step of attaching the core module assembly to the second base assembly includes the step of connecting the second power output connector to the module power connector with a second intermediate cable, the first protective housing completely contains the first intermediate cable during the step of connecting the first power output connector to the module power connector, and the second protective housing completely contains the second intermediate cable during the step of connecting the second power output connector to the module power connector.

13. A retail terminal, comprising:

a first base assembly secured to a first mounting surface, said first mounting surface having a first mounting opening defined therein out of which a first electrical cable segment extends;

a second base assembly secured to a second mounting surface, said second mounting surface having a second mounting opening defined therein out of which a second electrical cable segment extends; and a core module assembly which operates to perform point-of-sale retail functions in a first mode of operation and product demonstration retail functions in a second mode of operation, wherein (i) said core module assembly is electrically coupled to said first electrical cable segment and attached to said first base assembly when said core module assembly is operating in said first mode of operation, and (ii) said core module assembly is electrically coupled to said second electrical cable segment and attached to said second base assembly when said core module assembly is operating in said second mode of operation, wherein said core module assembly and said first base assembly cooperate to define a first protective housing which completely contains said first cable segment when said core module assembly is (i) attached to said first base assembly, and (ii) operating in said first mode of operation, wherein said core module assembly and said second base assembly cooperate to define a second protective housing which completely contains said second cable segment when said core module assembly is (i) attached to said second base assembly, and (ii) operating in said second mode of operation, wherein the core module assembly includes (i) a housing, (ii) a main controller board positioned within the housing, (iii) a data input device, electrically coupled to the main controller board, which is configured to allow a user to input data signals to the main controller board, (iv) a plurality of electrical connectors, supported by the housing, which are configured to electrically couple the main controller board to a number of external devices, and wherein the plurality of electrical connectors include (i) a LAN connector configured to electrically couple a LAN to the main controller board, (ii) a scanner connector configured to electrically couple a scanner to the main controller board, and (iii) a module power connector configured to electrically couple a power supply to the main controller board.

14. The retail terminal of claim 13, wherein:
said first electrical cable segment includes a first data cable segment which extends out of said first mounting opening, said first data cable segment having a first data cable connector secured thereto,
said second electrical cable segment includes a second data cable segment which extends out of said second mounting opening, said second data cable segment having a second data cable connector secured thereto,
said first data cable connector is coupled to said LAN connector when said core module assembly is (i) attached to said first base assembly, and (ii) operating in said first mode of operation, and
said second data cable connector is coupled to said LAN connector when said core module assembly is (i) attached to said second base assembly, and (ii) operating in said second mode of operation.

15. The retail terminal of claim 13, wherein:
said first electrical cable segment includes a first power cable segment which extends out of said first mounting opening, said first power cable segment having a first power cable connector secured thereto,
said second electrical cable segment includes a second power cable segment which extends out of said second mounting opening, said second power cable segment having a second power cable connector secured thereto,
said first base assembly includes a first power supply which has a first power input connector,
said second base assembly includes a second power supply which has a second power input connector,
said first power cable connector is coupled to said first power input connector when said core module assembly is (i) attached to said first base assembly, and (ii) operating in said first mode of operation, and
said second power cable connector is coupled to said second power input connector when said core module assembly is (i) attached to said second base assembly, and (ii) operating in said second mode of operation.

16. The retail terminal of claim 15, further comprising a first intermediate cable and a second intermediate cable, wherein:
said first power supply includes a first power output connector,
said second power supply includes a second power output connector,
said first power output connector is electrically coupled to said module power connector via said first intermediate cable when said core module assembly is (i) attached to said first base assembly, and (ii) operating in said first mode of operation,
said second power output connector is electrically coupled to said module power connector via said second intermediate cable when said core module assembly is (i) attached to said second base assembly, and (ii) operating in said second mode of operation,
said first protective housing completely contains said first intermediate cable when said core module assembly is (i) attached to said first base assembly, and (ii) operating in said first mode of operation, and
said second protective housing completely contains said second intermediate cable when said core module assembly is (i) attached to said second base assembly, and (ii) operating in said second mode of operation.

17. A method of operating a retail terminal having a core module assembly, a first base assembly, and a second base assembly, wherein (i) the first base assembly is secured to a first mounting surface, the first mounting surface having a first mounting opening defined therein out of which a first electrical cable segment extends, and (ii) the second base assembly is secured to a second mounting surface, the second mounting surface having a second mounting opening defined therein out of which a second electrical cable segment extends, comprising the steps of:
attaching the core module assembly to the first base assembly so that the core module assembly and the first base assembly cooperate to define a first protective housing which completely contains the first cable segment;
operating the core module assembly for a first time period so as to perform point-of-sale retail functions while the first cable segment is completely contained by the first protective housing;
detaching the core module assembly from the first base assembly after the first time period operating step;
attaching the core module assembly to the second base assembly, after the detaching step, so that the core module assembly and the second base assembly cooperate to define a second protective housing which completely contains the second cable segment; and
operating the core module assembly for a second time period so as to perform product demonstration retail functions while the second cable segment is completely contained by the second protective housing,
wherein the core module assembly includes (i) a housing, (ii) a main controller board positioned within the housing, (iii) a data input device, electrically coupled to the main controller board, which is configured to allow a user to input data signals to the main controller board, (iv) a plurality of electrical connectors, supported by the housing, which are configured to electrically couple the main controller board to a number of external devices, and
wherein the plurality of electrical connectors include (i) a LAN connector configured to electrically couple a LAN to the main controller board, (ii) a scanner connector configured to electrically couple a scanner to the main controller board, and (iii) a module power connector configured to electrically couple a power supply to the main controller board.

18. The method of claim 17, wherein:
the first electrical cable segment includes a first data cable segment which extends out of the first mounting opening, the first data cable segment having a first data cable connector secured thereto,
the second electrical cable segment includes a second data cable segment which extends out of the second mounting opening, the second data cable segment having a second data cable connector secured thereto,
the step of attaching the core module assembly to the first base assembly includes the step of connecting the first data cable connector to the LAN connector, and
the step of attaching the core module assembly to the second base assembly includes the step of connecting the second data cable connector to the LAN connector.

19. The method of claim 17, wherein:
the first electrical cable segment includes a first power cable segment which extends out of the first mounting opening, the first power cable segment having a first power cable connector secured thereto,
the second electrical cable segment includes a second power cable segment which extends out of the second mounting opening, the second power cable segment having a second power cable connector secured thereto, the first base assembly includes a first power supply which has a first power input connector, the second base assembly includes a second power supply which has a second power input connector, the step of attaching the core module assembly to the first base assembly includes the step of connecting the first power cable connector to the first power input connector, and the step of attaching the core module assembly to the second base assembly includes the step of connecting the second power cable connector to the second power input connector.

20. The method of claim 19, wherein:

the first power supply includes a first power output connector, the second power supply includes a second power output connector, the step of attaching the core module assembly to the first base assembly includes the step of connecting the first power output connector to the module power connector with a first intermediate cable, the step of attaching the core module assembly to the second base assembly includes the step of connecting the second power output connector to the module power connector with a second intermediate cable, the first protective housing completely contains the first intermediate cable during the step of connecting the first power output connector to the module power connector, and the second protective housing completely contains the second intermediate cable during the step of connecting the second power output connector to the module power connector.

* * * * *